(12) United States Patent
Furuichi

(10) Patent No.: US 11,330,593 B2
(45) Date of Patent: May 10, 2022

(54) MANAGEMENT DEVICE, COMMUNICATION CONTROL DEVICE, CONTROL METHOD, THAT GENERATE IDENTIFICATION INFORMATION FROM OTHER COMBINED IDENTIFICATION INFORMATION

(71) Applicant: Sony Corporation, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 124 days.

(21) Appl. No.: 16/960,908

(22) PCT Filed: Oct. 30, 2018

(86) PCT No.: PCT/JP2018/040340
§ 371 (c)(1),
(2) Date: Jul. 9, 2020

(87) PCT Pub. No.: WO2019/142440
PCT Pub. Date: Jul. 25, 2019

(65) Prior Publication Data
US 2020/0351882 A1    Nov. 5, 2020

(30) Foreign Application Priority Data
Jan. 16, 2018  (JP) .............................. JP2018-004696

(51) Int. Cl.
| H04W 72/04 | (2009.01) |
| H04W 4/08 | (2009.01) |
| H04W 16/14 | (2009.01) |

(52) U.S. Cl.
CPC ......... *H04W 72/0453* (2013.01); *H04W 4/08* (2013.01); *H04W 16/14* (2013.01); *H04W 72/046* (2013.01)

(58) Field of Classification Search
CPC ... H04W 72/0453; H04W 4/08; H04W 16/14; H04W 72/046; H04W 16/28;
(Continued)

(56) References Cited

U.S. PATENT DOCUMENTS

2007/0274276 A1* 11/2007 Laroia .................. H04W 16/14
370/338
2010/0246506 A1* 9/2010 Krishnaswamy ... H04W 72/085
370/329
(Continued)

FOREIGN PATENT DOCUMENTS

| JP | 2012-521729 A | 9/2012 |
| JP | 5679033 B2 | 3/2015 |

OTHER PUBLICATIONS

International Search Report and Written Opinion dated Dec. 11, 2018 for PCT/JP2018/040340 filed on Oct. 30, 2018, 6 pages including English Translation of the International Search Report.

*Primary Examiner* — Mewale A Ambaye
(74) *Attorney, Agent, or Firm* — Xsensus LLP

(57) ABSTRACT

A management device includes an obtaining unit that obtains, from a communication control device, first-type identification information which is specific to each communication device that performs wireless communication with one or more terminal devices, and second-type identification information which is specific to a user who is the target for allocation of a frequency band that is available for secondary use in the wireless communication; a generating unit that generates third-type identification information which is specific to the combination of the obtained first-type identification information and the obtained second-type identification information and which is meant for allocating the frequency band to at least either the communication device or the user; and a notifying unit that notifies the communi- (Continued)

cation control device about the generated third-type identification information.

26 Claims, 30 Drawing Sheets

(58) Field of Classification Search
CPC ... H04W 72/04; H04W 72/12; H04W 72/044; H04L 27/0006
See application file for complete search history.

(56) References Cited

U.S. PATENT DOCUMENTS

| | | | |
|---|---|---|---|
| 2011/0237268 A1* | 9/2011 | Tsuda | H04W 72/0433 455/450 |
| 2021/0135733 A1* | 5/2021 | Huang | H04B 7/0452 |
| 2021/0194652 A1* | 6/2021 | Khoryaev | H04L 27/2602 |
| 2021/0298048 A1* | 9/2021 | Sosnin | H04W 72/1268 |

* cited by examiner

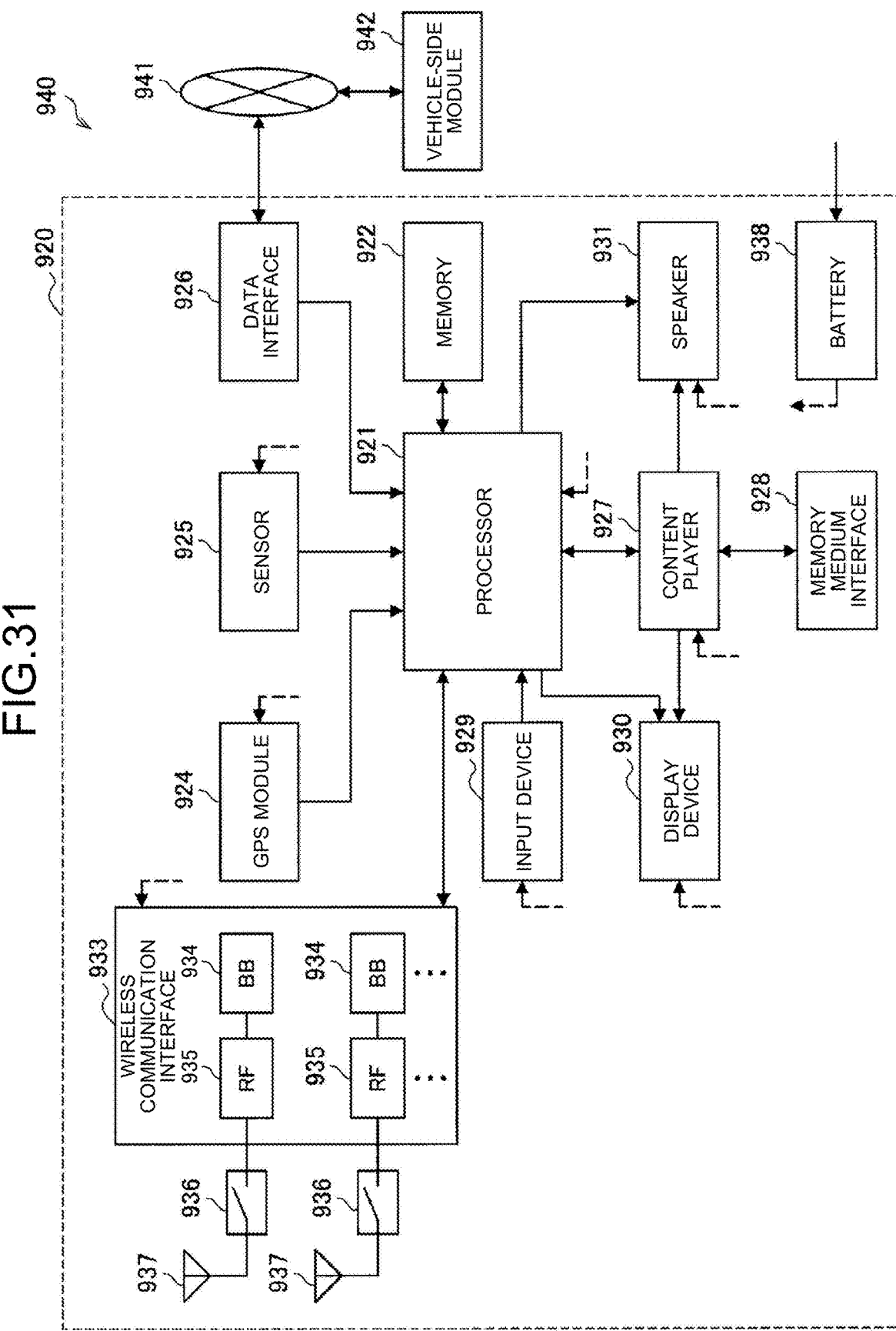

MANAGEMENT DEVICE, COMMUNICATION CONTROL DEVICE, CONTROL METHOD, THAT GENERATE IDENTIFICATION INFORMATION FROM OTHER COMBINED IDENTIFICATION INFORMATION

CROSS-REFERENCE TO RELATED APPLICATIONS

The present application is based on PCT filing PCT/JP2018/040340, filed Oct. 30, 2018, which claims priority to JP 2018-004696, filed Jan. 16, 2018, the entire contents of each are incorporated herein by reference.

FIELD

The application concerned is related to a management device, a communication control device, a control method, and a program.

BACKGROUND

In recent years, with the advancement in software defined networks (SDNs), network function virtualization (NFV) is being increasingly carried out. Hence, as compared to the past, it has become possible to configure networks with more flexibility. With such a background, introduction of technologies such as infrastructure sharing and RAN (Radio Access Network) sharing is being studied for the purpose of enabling sharing of physical infrastructural resources such as base stations, antennas, and optical networks among a plurality of network business operators.

Moreover, in order to enable frequency band sharing in the CBRS (Citizens Broadband Radio Service), the standard-setting organization WinnForum (Wireless Innovation Forum) has set protocols to be followed among frequency management databases and the infrastructure (base stations and networks). As a result of communicating messages based on such protocols, for example, it also becomes possible for the wireless communication devices such as base stations to use the shared radio waves for wireless communication. Meanwhile, examples of the technology for enabling frequency band sharing include the technology disclosed in Patent Literature 1.

CITATION LIST

Patent Literature

Patent Literature 1: Japanese Patent No. 5679033

SUMMARY

Technical Problem

On the other hand, in the new communication standards, such as 5G, that have arrived after the LTE, the use of high-frequency bands such as millimeter waves is also being studied. Hence, for example, it is believed to have a situation in which a large number of physical infrastructure resources such as antenna devices are installed, and thus it is believed not only to have an increase in the investment cost for setting up the system but also to have an increase in the operational cost of that system. Moreover, in recent years, with the increase and diversification in the wireless environments having a mix of various types of wireless systems and with the increase and diversification in the amount of contents that are wirelessly communicated, the problem of exhaustion of the radio wave resources (frequency bands), which are allocable to wireless systems, has come to the fore. With such a background, there has been a demand for introduction of a technology (hereinafter, simply called "RAN sharing") that enables sharing of physical infrastructural resources among a plurality of network business operators and for introduction of a technology (hereinafter, simply called "frequency sharing") that enables sharing of frequency bands among a plurality of network business operators.

In that regard, in the application concerned, a technology is proposed that enables implementation of RAN sharing as well as frequency sharing in a more preferred form.

Solution to Problem

According to the present disclosure, a management device is provided that includes: an obtaining unit that obtains, from a communication control device, first-type identification information which is specific to each communication device that performs wireless communication with one or more terminal devices, and second-type identification information which is specific to user who is target for allocation of frequency band that is available for secondary use in the wireless communication; a generating unit that generates third-type identification information which is specific to combination of the obtained first-type identification information and the obtained second-type identification information and which is meant for allocating the frequency band to at least either the communication device or the user; and a notifying unit that notifies the communication control device about the generated third-type identification information.

Moreover, according to the present disclosure, a communication control device comprising: a notifying unit that notifies a management device about first-type identification information which is specific to each communication device that performs wireless communication with one or more terminal devices, and second-type identification information which is specific to user who is target for allocation of frequency band that is available for secondary use in the wireless communication; an obtaining unit that obtains, from the management device, third-type identification information which is specific to combination of the first-type identification information and the second-type identification information and which is meant for allocating the frequency band to at least either the communication device or the user; and a control unit that, based on the obtained third-type identification information, controls setting related to the wireless communication between the communication device corresponding to the third-type identification information and the one or more of terminal devices.

Moreover, according to the present disclosure, a control method implemented by a computer is provided that includes: obtaining, from a communication control device, first-type identification information which is specific to each communication device that performs wireless communication with one or more terminal devices, and second-type identification information which is specific to user who is target for allocation of frequency band that is available for secondary use in the wireless communication; generating third-type identification information which is specific to combination of the obtained first-type identification information and the obtained second-type identification information and which is meant for allocating the frequency band to at least either the communication device or the user; and notifying the communication control device about the generated third-type identification information.

Moreover, according to the present disclosure, a control method implemented by a computer, is provided that includes: notifying a management device about first-type identification information which is specific to each communication device that performs wireless communication with one or more terminal devices, and second-type identification information which is specific to user who is target for allocation of frequency band that is available for secondary use in the wireless communication; obtaining, from the management device, third-type identification information which is specific to combination of the first-type identification information and the second-type identification information and which is meant for allocating the frequency band to at least either the communication device or the user; and controlling, based on the obtained third-type identification information, setting related to the wireless communication between the communication device corresponding to the third-type identification information and the one or more of terminal devices.

Moreover, according to the present disclosure, a program is provided that causes a computer to execute: obtaining, from a communication control device, first-type identification information which is specific to each communication device that performs wireless communication with one or more terminal devices, and second-type identification information which is specific to user who is target for allocation of frequency band that is available for secondary use in the wireless communication; generating third-type identification information which is specific to combination of the obtained first-type identification information and the obtained second-type identification information and which is meant for allocating the frequency band to at least either the communication device or the user; and notifying the communication control device about the generated third-type identification information.

Moreover, according to the present disclosure, a program is provided that causes a computer to execute: notifying a management device about first-type identification information which is specific to each communication device that performs wireless communication with one or more terminal devices, and second-type identification information which is specific to user who is target for allocation of frequency band that is available for secondary use in the wireless communication; obtaining, from the management device, third-type identification information which is specific to combination of the first-type identification information and the second-type identification information and which is meant for allocating the frequency band to at least either the communication device or the user; and controlling, based on the obtained third-type identification information, setting related to the wireless communication between the communication device corresponding to the third-type identification information and the one or more of terminal devices.

Advantageous Effects of Invention

As described above, according to the application concerned, a technology is provided that enables implementation of RAN sharing as well as frequency sharing in a more preferred form.

The abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 31 is a block diagram illustrating an example of a schematic configuration of a car navigation device.

DESCRIPTION OF EMBODIMENTS

Figure 1:
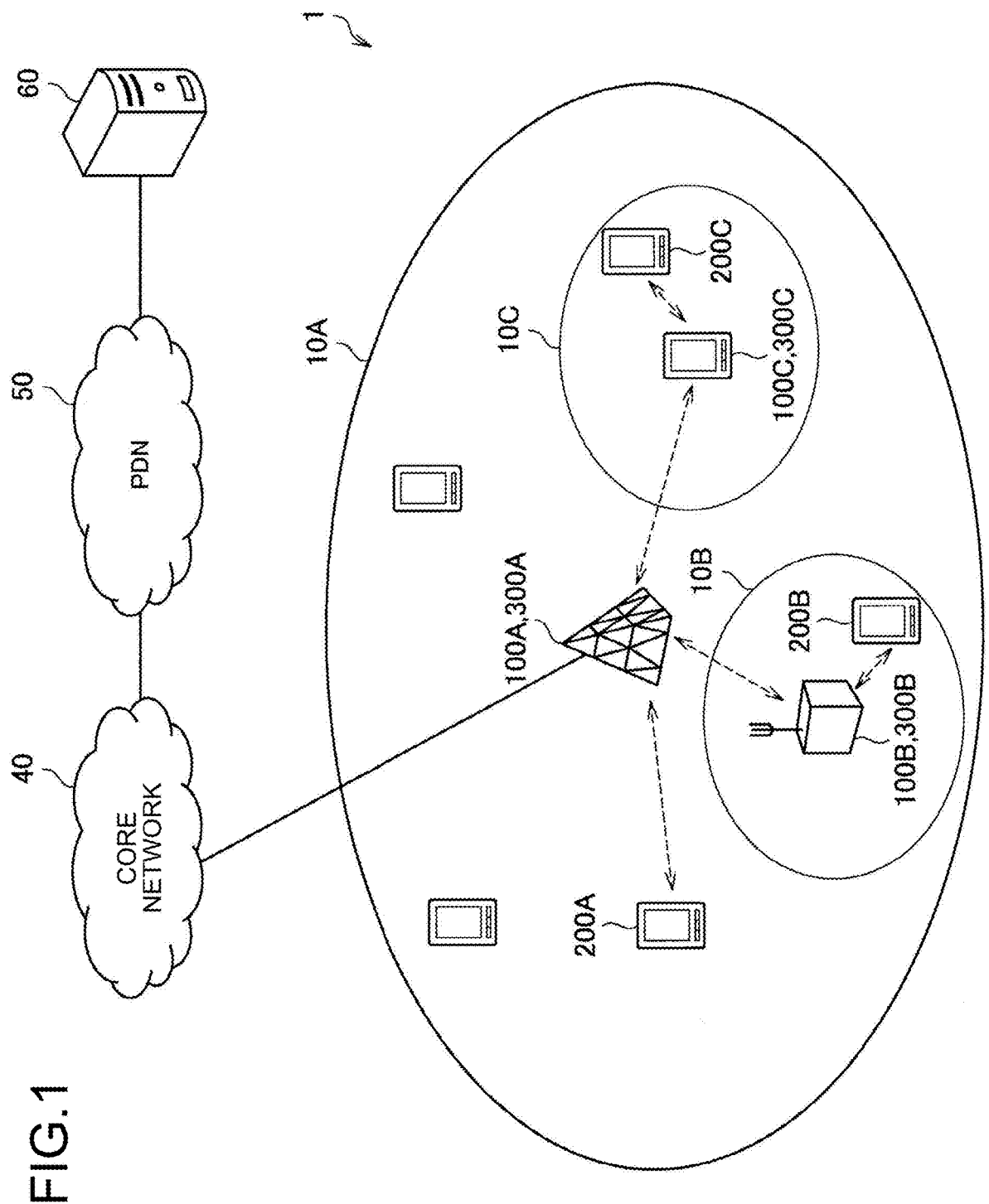
FIG. 1 is an explanatory diagram for explaining an exemplary schematic configuration of a system according to an embodiment of the application concerned.

A preferred embodiment of the application concerned is described below in detail with reference to the accompanying drawings. In the present written description and the drawings, the constituent elements having practically identical functional configuration are referred to by the same reference numerals, and the explanation is not given repeatedly.

The explanation is given in the following sequence.
1. Schematic configuration
1.1. Configuration example of system
1.2. Configuration example of base station
1.3. Configuration example of terminal device
2. Network resources
3. Study related to sharing of network resources
4. Technical features
4.1. Simulated scenarios
4.2. Functional configuration
4.3. Operations
   4.3.1. Procedure for registration of device
   4.3.2. Procedure for reregistration of device
4.4. Modification examples
   4.4.1. First modification example: Group of device registration IDs
   4.4.2. Second modification example: Collaboration among frequency management databases
   4.4.3. Third modification example: Example of control using device registration IDs
4.5. Supplementary information
5. Application examples
5.1. Application example related to server
5.2. Application examples related to base station
5.3. Application examples related to terminal device
6. Summary 1. Schematic Configuration <1.1. Configuration Example of System>

Firstly, explained with reference to FIG. 1 is an exemplary schematic configuration of a system 1 according to the embodiment of the application concerned. FIG. 1 is an explanatory diagram for explaining an exemplary schematic configuration of the system 1 according to the embodiment of the application concerned. As illustrated in FIG. 1, the system 1 includes wireless communication devices 100 and terminal devices 200. Moreover, the system 1 can also include MEC servers 300. Herein, each terminal device 200 is also called a user; and the user can also be called a UE. That is, UEs 200 can be equivalent to the terminal devices 200 illustrated in FIG. 1. A wireless communication device 100C is also called a UE-Relay. Herein, a UE can imply a UE defined in the LTE or the LTE-A; and a UE-Relay can imply the "Prose UE to Network Relay" that is in discussion in 3GPP, or can imply a communication device in broader terms.

(1) Wireless Communication Device 100

Each wireless communication device 100 is a device that provides wireless communication service to its subordinate devices. For example, a wireless communication device 100A is a base station of a cellular system (or a mobile communication system). The base station 100A performs wireless communication with the devices (such as a terminal device 200A) positioned inside a cell 10A of the base station 100A. For example, the base station 100A sends downlink signals to the terminal device 200A and receives uplink signals from the terminal device 200A.

The base station 100A is logically connected to other base stations by, for example, the X2 interface, and is capable of sending and receiving control information. Moreover, the base station 100A is logically connected to a core network 40 by, for example, the S1 interface, and is capable of sending and receiving control information. Meanwhile, as far as the physical relay is concerned, the communication among those devices can be physically relayed using various devices.

Herein, the wireless communication device 100A illustrated in FIG. 1 is a macro cell base station, and the cell 10A is a macro cell. On the other hand, wireless communication devices 100B and 100C are master devices that operate small cells 10B and 10C, respectively. As an example, the master device 100B is a small cell base station installed in a fixed manner. The small cell base station 100B establishes a wireless backhaul link with the macro cell base station 100A, and establishes an access link with one or more terminal devices (for example, a terminal device 200B) positioned inside the small cell 10B. The wireless communication device 100B can be a relay node defined in 3GPP. The master device 100C is a dynamic AP (access point). The dynamic AP 100C is a mobile device that dynamically operates the small cell 10C. Moreover, the dynamic AP 100C establishes a wireless backhaul link with the macro cell base station 100A, and establishes an access link with one or more terminal devices (for example, a terminal device 200C) positioned inside the small cell 10C. The dynamic AP 100C can be, for example, a terminal device installed with hardware or software capable of operating as a base station or a wireless access point. In that case, the small cell 10C represents a dynamically-formed localized network (Localized Network/Virtual cell).

The cells 10 can be operated using an arbitrary wireless communication method such as LTE, LTE-A (LTE-Advanced), GSM (registered trademark), UMTS, 5G NR (New Radio), W-CDMA, CDMA 2000, WiMAX, WiMAX2, or IEEE 802.16.

Herein, small cells is a concept that can include various types of cells (such as femto cells, nano cells, pico cells, and micro cells) which are smaller than macro cells and which are installed in an overlapping or non-overlapping manner with macro cells. As an example, a small cell is operated by a dedicated base station. As another example, a small cell is operated when a terminal representing a master device temporarily operates as a small cell base station. Moreover, what is called a relay node can also be treated as a form of a small cell base station. The wireless communication device that functions as the parent station of a relay node is also referred to as a donor base station. A donor base station can imply DeNB in LTE, or can imply the parent station of a relay node in broader terms.

(2) Terminal Device 200

Each terminal device 200 is capable of performing communication in a cellular system (or a mobile communication system). The terminal device 200 performs wireless communication with wireless communication devices in the concerned cellular system (for example, with the base station 100A, or the master device 100B, or the master device 100C). For example, the terminal device 200A receives downlink signals from the base station 100A and sends uplink signals to the base station 100A.

(3) Application Server 60

An application server 60 is a device that provides services to the users. The application server 60 is connected to a packet data network (PDN) 50. Meanwhile, the base stations 100 are connected to the core network 40. Moreover, the core network 40 is connected to the PDN 50 via a gateway device. Thus, regarding the services provided by the application server 60, the wireless communication devices 100 provide those services to the MEC servers 300 and the users via the packet data network 50, the core network 40, and the wireless communication paths.

(4) MEC Server 300

Each MEC server 300 is a service provider device that provides services (applications or contents) to the users. The MEC servers 300 can be installed inside the wireless communication devices 100. In that case, the wireless communication devices 100 provide the services, which are provided by the respective MEC servers 300, to the users via wireless communication paths. The MEC servers 300 can be implemented as functional entities of logical type, or can be formed in an integrated manner with the wireless communication devices 100 as illustrated in FIG. 1.

For example, the base station 100A provides the services, which are provided by an MEC server 300A, to the terminal device 200A that is connected to the macro cell 10. Moreover, the base station 100A provides the services, which are provided by the MEC server 300A, to the terminal device 200B, which is connected to the small cell 10B, via the master device 100B.

Furthermore, the master device 100B provides the services, which are provided by an MEC server 300B, to the terminal device 200B that is connected to the small cell 10B. In an identical manner, the master device 100C provides the services, which are provided by an MEC server 300C, to the terminal device 200C that is connected to the small cell 10C.

(5) Supplementary Explanation

Till now, the explanation was given about the schematic configuration of the system 1. However, the concerned technology is not limited to the example illustrated in FIG. 1. For example, as far as the configuration of the system 1 is concerned, it is possible to have a configuration not including master devices, such as SCE (Small Cell Enhancement), HetNet (Heterogeneous Network), and MTC (Machine Type Communication) network.

<1.2. Configuration Example of Base Station>

Figure 2:
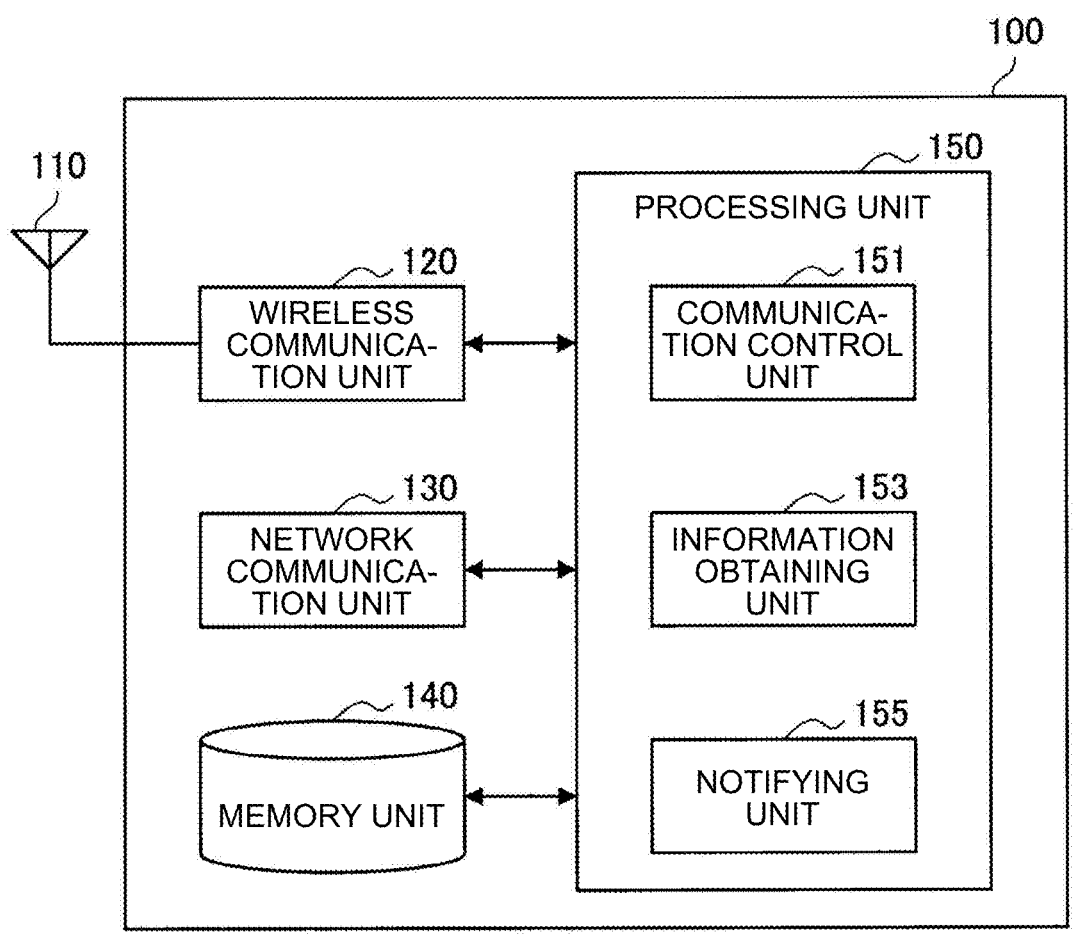
FIG. 2 is a block diagram illustrating an exemplary configuration of a base station according to the embodiment.

Explained below with reference to FIG. 2 is a configuration of the base station 100 according to the embodiment of the application concerned. FIG. 2 is a block diagram illustrating an exemplary configuration of the base station 100 according to the embodiment of the application concerned. With reference to FIG. 2, the base station 100 includes an antenna unit 110, a wireless communication unit 120, a network communication unit 130, a memory unit 140, and a processing unit 150.

(1) Antenna Unit 110

The antenna unit 110 emits, as radio waves into the space, the signals output by the wireless communication unit 120. Moreover, the antenna unit 110 converts the radio waves present in the space into signals, and outputs the signals to the wireless communication unit 120.

(2) Wireless Communication Unit 120

The wireless communication unit 120 sends and receives signals. For example, the wireless communication unit 120 sends downlink signals to terminal devices, and receives uplink signals from terminal devices.

(3) Network Communication Unit 130

The network communication unit 130 sends and receives information. For example, the network communication unit 130 sends information to other nodes, and receives information from other nodes. For example, the other nodes include other base stations and core network nodes.

Meanwhile, as described earlier, in the system 1 according to the present embodiment, there are times when the terminal devices operate as relay terminals and relay the communication between remote terminals and base stations. In such a case, for example, the wireless communication device 100C that is equivalent to a relay terminal need not include the network communication unit 130.

(4) Memory Unit 140

The memory unit 140 is used to store, temporarily or permanently, programs and a variety of data to be used in the operations of the base station 100.

(5) Processing Unit 150

The processing unit 150 provides various functions of the base station 100. The processing unit 150 includes a communication control unit 151, an information obtaining unit 153, and a notifying unit 155. Moreover, the processing unit 150 can also include other constituent elements other than the constituent elements mentioned herein. That is, the processing unit 150 can also perform operations other than the operations of the constituent elements mentioned herein.

Regarding the operations of the communication control unit 151, the information obtaining unit 153, and the notifying unit 155; the detailed explanation is given later.

<1.3. Configuration Example of Terminal Device>

Figure 3:
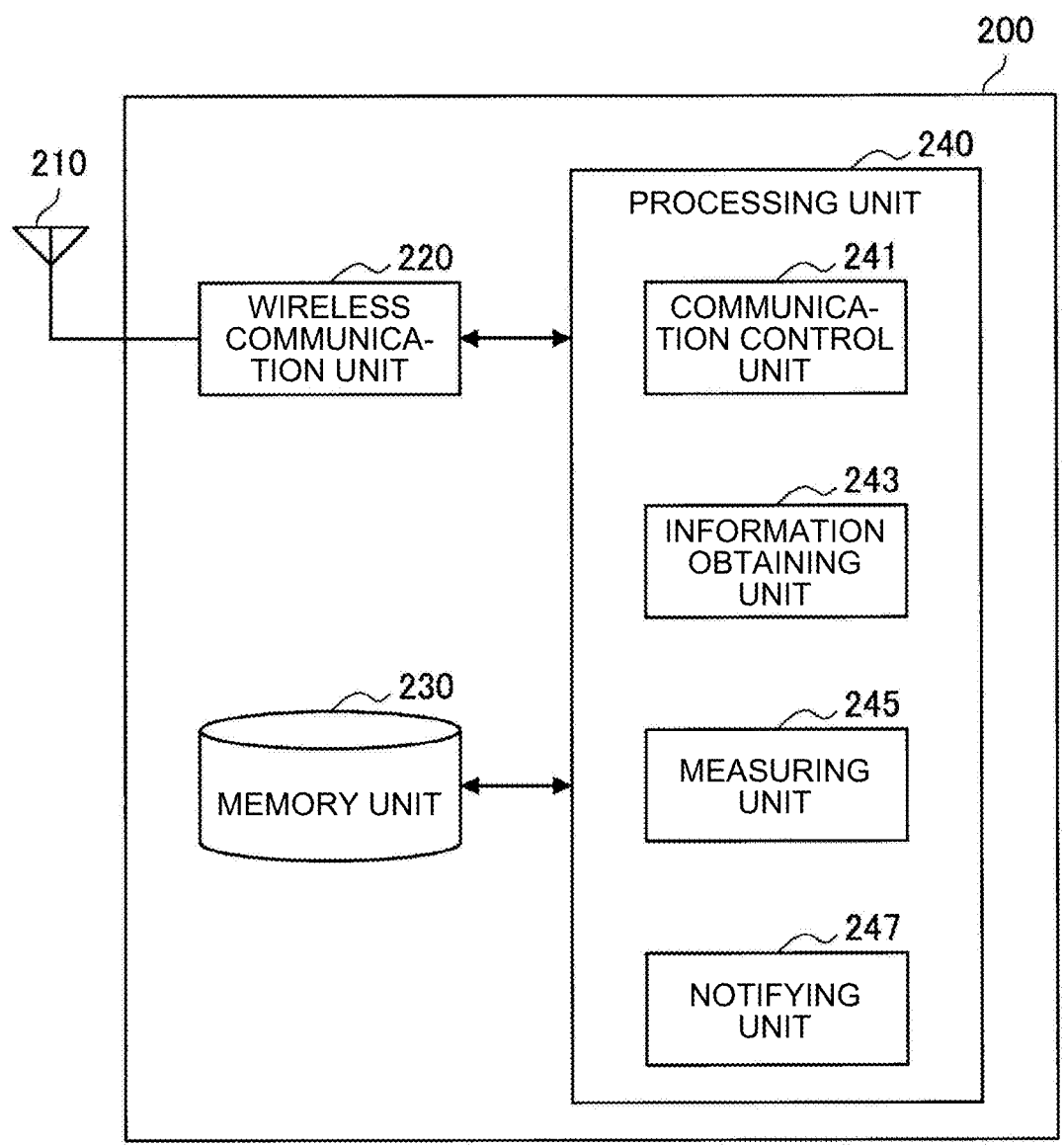
FIG. 3 is a block diagram illustrating an exemplary configuration of a terminal device according to the embodiment.

Explained below with reference to FIG. 3 is an exemplary configuration of the terminal device 200 according to the embodiment of the application concerned. FIG. 3 is a block diagram illustrating an exemplary configuration of the terminal device 200 according to the embodiment of the application concerned. As illustrated in FIG. 3, the terminal device 200 includes an antenna unit 210, a wireless communication unit 220, a memory unit 230, and a processing unit 240.

(1) Antenna Unit 210

The antenna unit 210 emits, as radio waves into the space, the signals output by the wireless communication unit 220. Moreover, the antenna unit 210 converts the signals present in the space into signals, and outputs those signals to the wireless communication unit 220.

(2) Wireless Communication Unit 220

The wireless communication unit 220 sends and receives signals. For example, the wireless communication unit 220 receives downlink signals from the base station, and sends uplink signals to the base station.

Meanwhile, as described earlier, in the system 1 according to the present embodiment, the terminal devices can operate as relay terminals and relay the communication between remote terminals and base stations. In such a case, for example, in the terminal device 200 operating as a relay terminal, the wireless communication unit 220 can send side-link signals to and receive side-link signals from the relay terminals.

(3) Memory Unit 230

The memory unit 230 is used to store, temporarily or permanently, programs and a variety of data to be used in the operations of the terminal device 200.

(4) Processing Unit 240

The processing unit 240 provides various functions of the terminal device 200. For example, the processing unit 240 includes a communication control unit 241, an information obtaining unit 243, a measuring unit 245, and a notifying unit 247. Moreover, the processing unit 240 can also include other constituent elements other than the constituent elements mentioned herein. That is, the processing unit 240 can also perform operations other than the operations of the constituent elements mentioned herein.

The communication control unit 241 controls various operations related to the wireless communication performed with the base station 100. For example, the communication control unit 241 can perform control in such a way that the resources allocated from the base station 100 (for example, frequency resources and time resources) are used to send a variety of information to the base station 100. Moreover, based on an instruction from the base station 100, the communication control unit 241 can control the configuration (for example, the transmission power) of the wireless communication performed with the base station 100.

The information obtaining unit 243 obtains a variety of information from the base station 100 using wireless communication.

The measuring unit 245 measures the communication quality of the wireless communication performed with the base station 100. As a specific example, the measuring unit 245 can measure the received power of a predetermined reference signal sent from the base station 100, and accordingly measure the communication quality of the wireless communication performed with the base station 100. Of course, as long as the measuring unit 245 can measure the communication quality of the wireless communication performed with the base station 100, there is no particular restriction on the measurement method.

The notifying unit 247 notifies the base station 100 about a variety of information. For example, the notifying unit 247 can notify the base station 100 about the information corresponding to the measurement result of the communication quality of the wireless communication performed with the base station 100.

2. Network Resources

The following explanation is given about an overview of the network resources. As explained earlier, in recent years, with the advancement in software defined networks (SDNs), virtualization of the network functions has enabled building networks with more flexibility. On the other hand, in order to configure a network with more flexibility, it is required to be able to dynamically secure the necessary network resources and to be able to dynamically adjust the network parameters based on the secured network resources. In that regard, given below is the explanation of an example of the network resources that should be taken into account for achieving a flexible network configuration.

(1) Physical Infrastructure Resources

The physical infrastructure resources include base stations, antennas, and optical networks. Moreover, in the new communication standards, such as 5G, that have arrived after the LTE, the use of high-frequency bands such as millimeter waves is also being studied. Hence, for example, it is believed to have a situation in which a large number of physical infrastructure resources such as antenna devices are installed, and thus it is believed not only to have an increase in the investment cost for setting up the system but also to have an increase in the operational cost of that system. With such a background, the use of technologies enabling infrastructure sharing and RAN sharing is being studied.

(2) Virtual Core Network Resources

In recent years, the study of NR (New Radio) is underway as the next-generation wireless access method with respect to the LTE. In the NR and the next-generation core networks, the study is underway regarding the slicing technology (Network Slicing) meant for accommodating, in a single network, the communication in a plurality of forms under the assumption of various use cases including eMBB (Enhanced Mobile Broadband), mMTC (Massive Machine Type Communications), and URLLC (Ultra Reliable and Low Latency Communications). According to the slicing technology, a logical network called a slice or a network slice can be made to exist in a single physical network. As a result, it becomes possible to efficiently provide a network in accordance with the requirements of the services used by the user.

(3) Wireless Frequency Resources

In recent years, with the increase and diversification in the wireless environments having a mix of various types of wireless systems and with the increase and diversification in the amount of contents that are wirelessly communicated, the problem of exhaustion of the radio wave resources (frequency bands), which are allocable to wireless systems, has come to the fore. However, since any radio wave band is already in use in some existing wireless system, it is a known fact that allocation of new radio wave resources is a difficult task. In that regard, in order to squeeze out the necessary radio wave resources, there is now a demand for the utilization of the temporally/spatially available radio waves (White Space) of the existing wireless systems (i.e., the utilization of Dynamic Spectrum Access (DSA)) by utilizing the cognitive radio technology. In recent years, in the United States of America, with the aim of enabling public access to 3.55-3.70 GHz by means of public-private common use, there is momentum in legislating/standardizing the CBRS (Citizens Broadband Radio Service) in which the frequency sharing technology is utilized.

Moreover, the cognitive radio technology not only contributes in the dynamic frequency sharing but also in achieving enhancement in the frequency usage efficiency for wireless systems. For example, in ETSI EN 303 387 or IEEE 802.19.1-2014, the coexistence technology among wireless systems using the white space is defined.

(4) Computing Resources

In order to configure a network with flexibility based on various resources as explained above, it is necessary that the resources of the computing equipment installed in the network are also appropriately secured.

Examples of the technology that can contribute in computing resources include MEC (Multimedia Edge Computing). In MEC, as a result of installing a local server on the edge side of the core network of a base station; for example, applications can be provided to the user with low delay. Moreover, since the application services with respect to a large number of devices can be accommodated in the local server, it also becomes possible to disperse the load related to computing. Meanwhile, in recent years, a concept called fog computing that covers edge computing is proposed, and can be useful as the technology for optimizing the computing resources.

3. Study Related to Sharing of Network Resources

The technical problems faced in the system according to the application concerned are summarized by doing a study related to the sharing of the network resources.

In order to enable frequency sharing in the CBRS, the standard-setting organization by the name Wireless Innovation Forum (WinnForum) has set protocols to be followed among frequency management databases and the infrastructure (base stations and networks). As a result of communicating messages based on such protocols, it becomes possible for the base stations to use the shared radio waves.

In the protocols, sets of identifier information are linked in order to enable unique identification of devices or to enable unique identification of the information related to the frequency bands used by the devices (hereinafter, also called "frequency information"). For example, FIG. 4 is a diagram illustrating an example of the linking of sets of identifier information defined in the protocols set among frequency management databases and the infrastructure with the aim of enabling frequency sharing.

Figure 4:
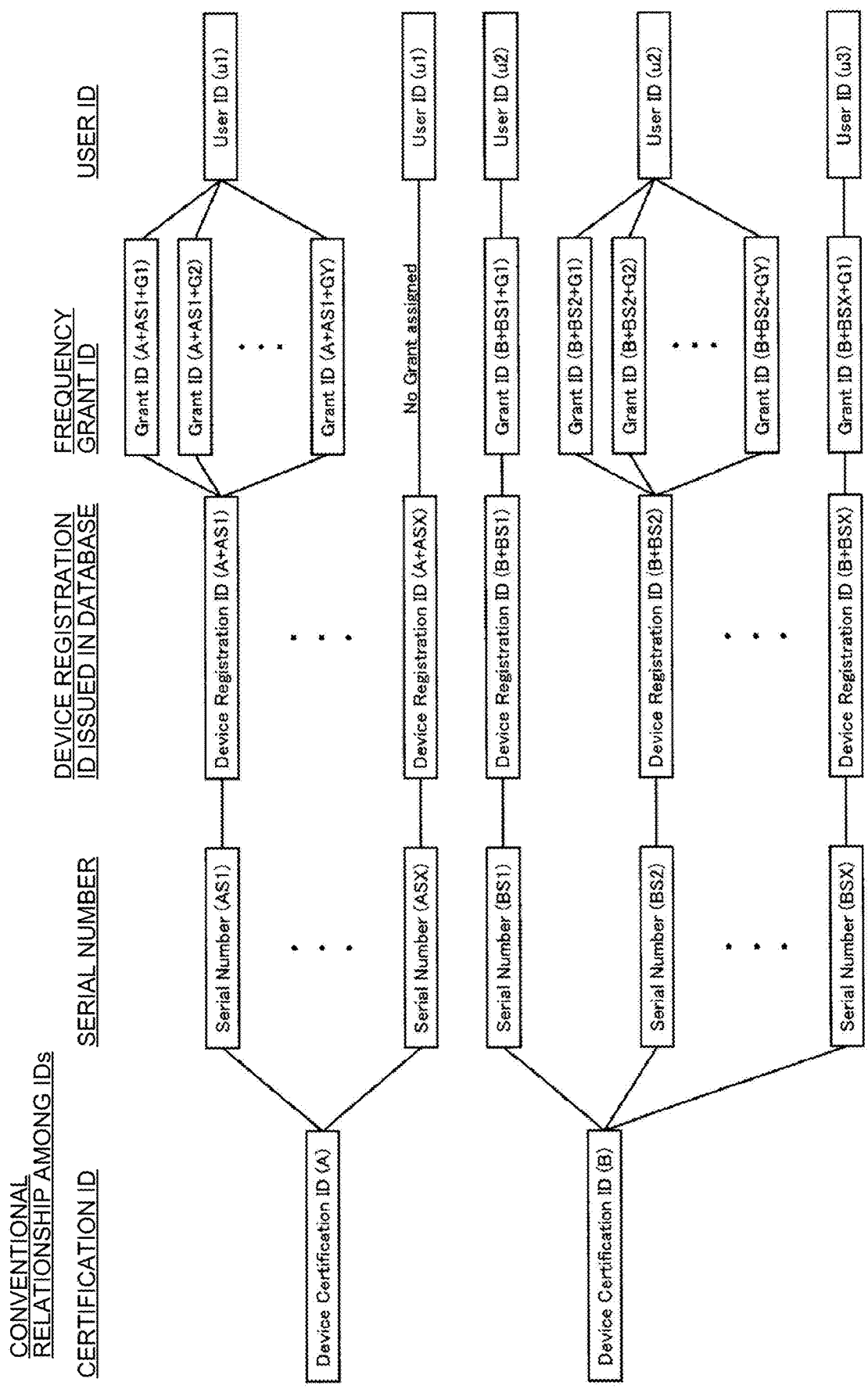
FIG. 4 is a diagram illustrating an example of the linking of sets of identifier information defined in the protocols set among frequency management databases and the infrastructure with the aim of enabling frequency sharing.

In the example illustrated in FIG. 4, a certification ID represents an ID issued by a certification authority. In the CBRS, FCC ID represents the certification ID. As far as other countries are concerned, in Japan, the certification number of conformance to technical standards, or the certificate number of construction type, or the notification number for self-validation of conformance to technical standards can represent the certification ID.

A serial number is the number allotted by the manufacturer to an individual device. Examples of the device include a base station and an access point.

A device registration ID is an ID that is uniquely allotted in a database for device management purposes. In the WinnForum protocols, the device registration IDs are called CBSD IDs. The registration of a device registration ID requires a certification ID, a serial number, and a user ID; and it is stipulated that the device registration ID is so decided that it has one-to-one correspondence with the certification ID and the serial number. The device registration ID is then notified to the device. Thus, during various procedures such as accessing a database, the device notifies that database about the device registration ID.

A frequency grant ID represents an ID allocated to the information of the frequency used by a device. The frequency grant ID is allocated to the information of a frequency by a database.

A user ID represents an ID enabling identification of an individual person or a business operator. For example, prior to the use of a database, the user IDs can be issued as a result of registration of user information in advance in the database (for example, user account IDs). Alternatively, the user IDs can be Call signs. In the example illustrated in FIG. 4, a scenario is assumed in which a single device is used by a single user. In the application concerned, a "user" implies a user who is a target for sharing the devices such as base stations and access points (wireless communication devices) and, for example, represents a telecommunications carrier. In the following explanation, unless particularly specified otherwise, a "user" implies a user who is a target for sharing the devices.

Meanwhile, as far as the use by conventional telecommunications carriers is concerned, there is no problem to implement the ID linking method as illustrated in FIG. 4. However, judging from the nature of the abovementioned protocols, problems may arise in the case in which RAN sharing is performed.

In the abovementioned protocols, when there is a change in the installation position information of a device or when the measured value exceeds the FCC-defined precision, it is mandatory to reregister the position information. In the protocols, in the case of reregistering the position information, with respect to the database as well as the device, it is mandatory to disable all frequency information being used by that device.

In the application concerned, "the installation position information of a device" represents the information related to the installation conditions of that device such as the installation position of the device. Moreover, the installation position information of a device is not limited to, for example, the installation position of the device, and can also contain information relatable to the communicable area or the communicable range for the device. As a specific example, when the device forms a directional beam based on the beam forming technology and uses that beam in communication, the installation position information of the device can contain the height, the gain, and the orientation of the antennas used in wireless communication (hereinafter, also called "antenna information").

Given below is the explanation of an example of the linking of sets of identifier information conceivable in RAN sharing in which a plurality of device users share the same device. For example, FIG. 5 is an explanatory diagram for explaining an example of the linking of sets of identifier information defined in the protocols among frequency management databases and the infrastructure, as simulated in RAN sharing.

Figure 5:
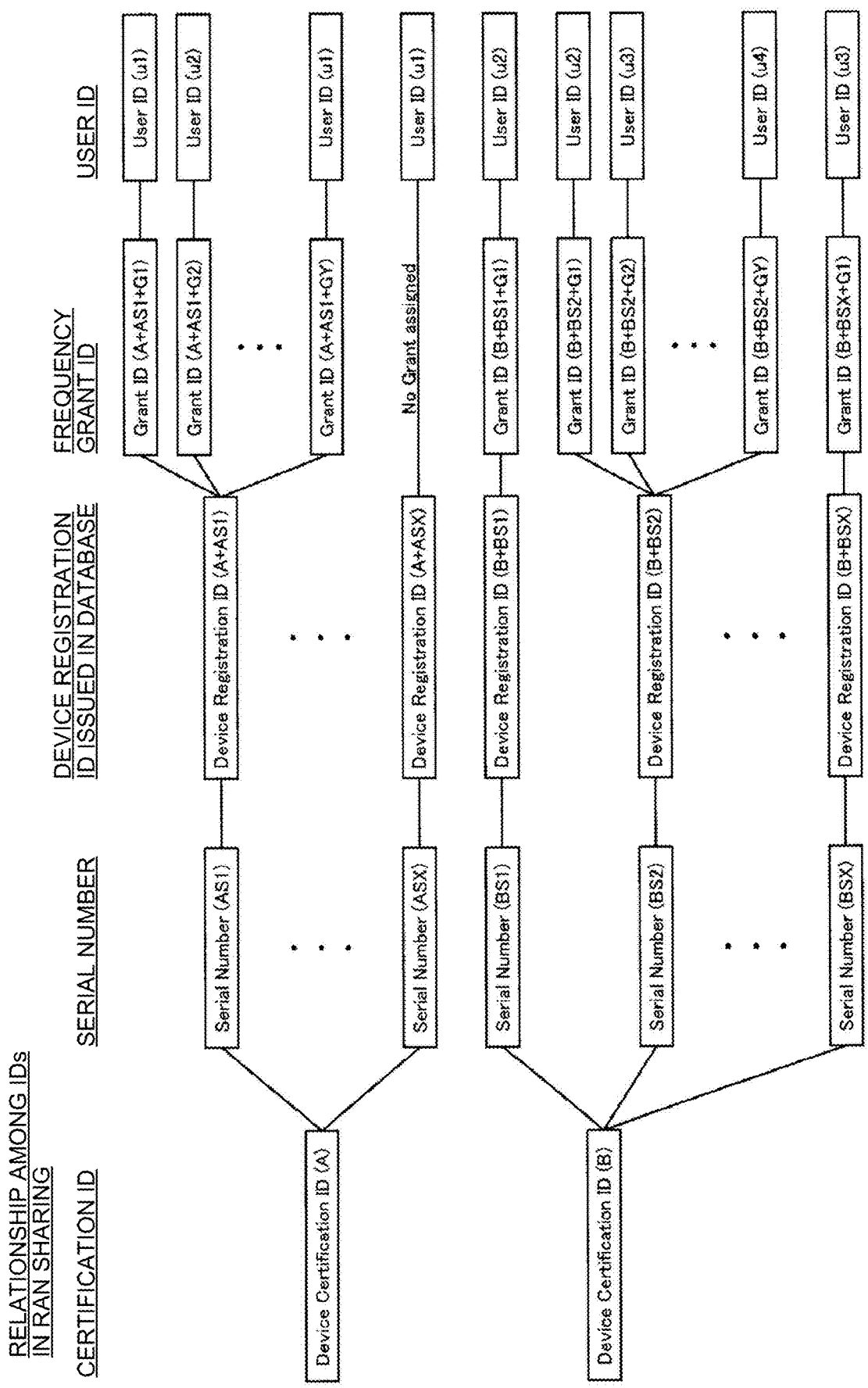
FIG. 5 is an explanatory diagram for explaining an example of the linking of sets of identifier information defined in the protocols among frequency management databases and the infrastructure, as simulated in RAN sharing.

In the example illustrated in FIG. 5, regarding a device used by a plurality of users, device sharing is achieved because the users use mutually different frequency bands. In the LTE, for example, it is as if a single user is allocated with a single component carrier.

On the other hand, as explained earlier, the installation position information of a device can contain the antenna information (the height, the gain, and the orientation) too. Hence, for example, if the orientation of a particular beam related to the component carrier of a particular user is varied, then it becomes necessary to reregister the corresponding device. At that time, since a plurality of users is associated to that device, if reregistration is performed for some of the users, then the use of the component carriers gets disabled for the remaining users too.

Figure 6:
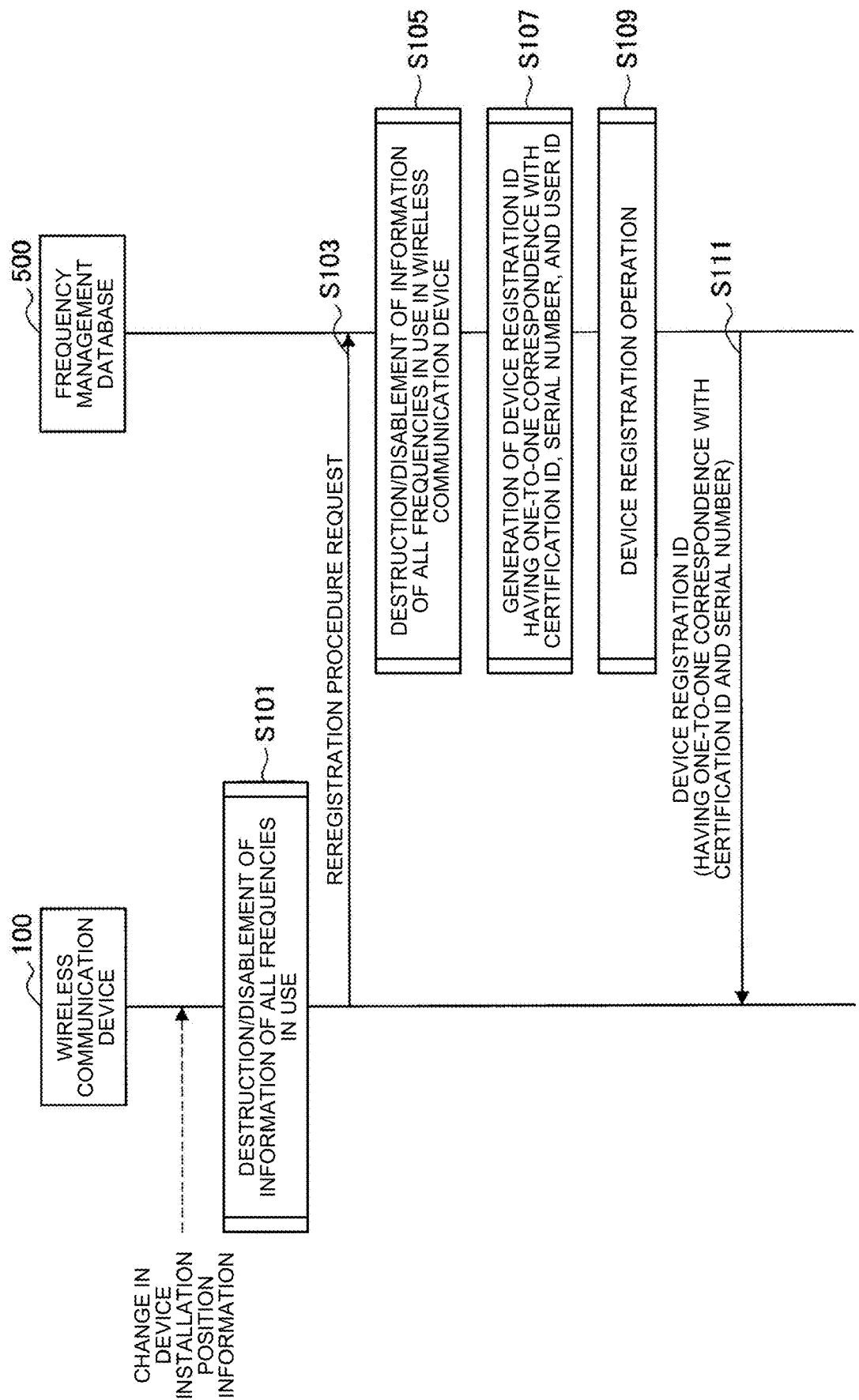
FIG. 6 is a sequence diagram for explaining an example of the procedure of reregistration of a device in a database accompanying a change in the installation position of the device.

Explained below with reference to FIG. 6 is an example of the procedure related to the reregistration of a device in the database, with the focus on the case in which RAN sharing is performed. FIG. 6 is a sequence diagram for explaining an example of the procedure of reregistration of a device in a database accompanying a change in the installation position of the device. With reference to FIG. 6, the wireless communication device 100 represents a base station (for example, the base station 100 illustrated in FIG. 1) or an access point. Moreover, a frequency management database 500 represents the abovementioned database, and is used to manage the allocation of frequency bands to devices such as base stations and access points.

As illustrated in FIG. 6, for example, when there is a change in the installation position information, such as the antenna information, of a device; the wireless communication device 100 destroys and disables the information regarding all frequencies in use (S101). Then, the wireless communication device 100 sends, to the frequency management database 500, a request related to the procedure of reregistration of the device based on the changed installation position information (S103).

When a request related to the procedure for reregistration of the device is received from the wireless communication device 100, the information about all frequency bands registered regarding the device (in this case, the wireless communication device 100), for which reregistration is requested, is destroyed and disabled in the frequency management database 500 (S105). Then, in the frequency management database 500, a device registration ID is generated that has one-to-one correspondence with a certification ID, a serial number, and a user ID (S107); and again registers the device based on the generated device registration ID (S109). Subsequently, according to the result of the registration operation, the wireless communication device 100, which represents the source of the request, is notified about the device registration ID from the frequency management database 500 (S111).

As described above, when there is a change in the installation position information of a device, the information regarding all frequency bands in use in the wireless communication device 100 gets destroyed and disabled in the wireless communication device 100 and in the frequency management database 500 (S101, S105). At that time, if the wireless communication device 100 is being shared by a plurality of users, even when the installation position information of the device changes for only some of the users, the information gets destroyed and disabled not only for those users but also for the remaining users.

With such a background, at present, it can be said that the WinnForum protocols have poor compatibility with RAN sharing. The abovementioned phenomenon is not limited to the CBRS, and can occur for the protocols related to the sharing of other frequency bands. In view of such a situation, in the application concerned, a technology is proposed that enables implementation of RAN sharing as well as frequency sharing in a more preferred form (for example, with more user-friendliness), and enables the use of network resources with more flexibility.

4. Technical Features

Given below is the explanation of the technical features of the system according to the embodiment of the application concerned.

4.1. Simulated Scenarios

Figure 7:
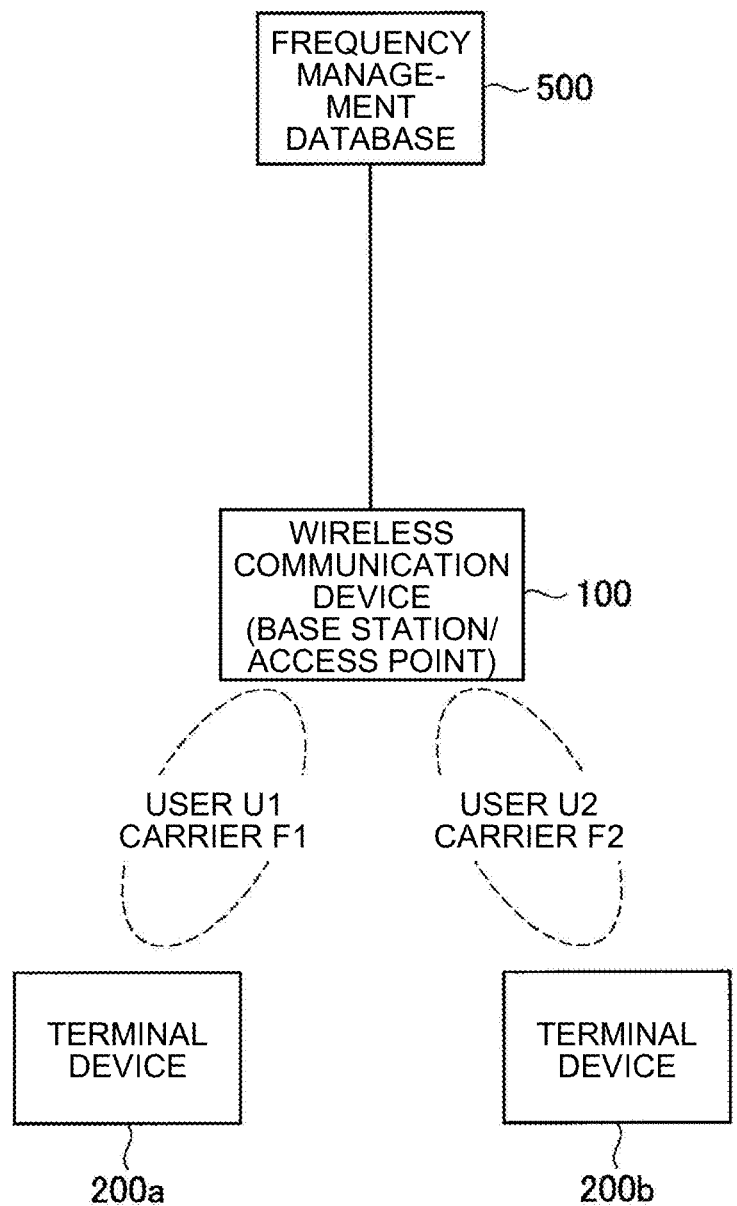
FIG. 7 is an explanatory diagram for explaining an example of a simulated scenario in the system according to the embodiment.
Figure 8:
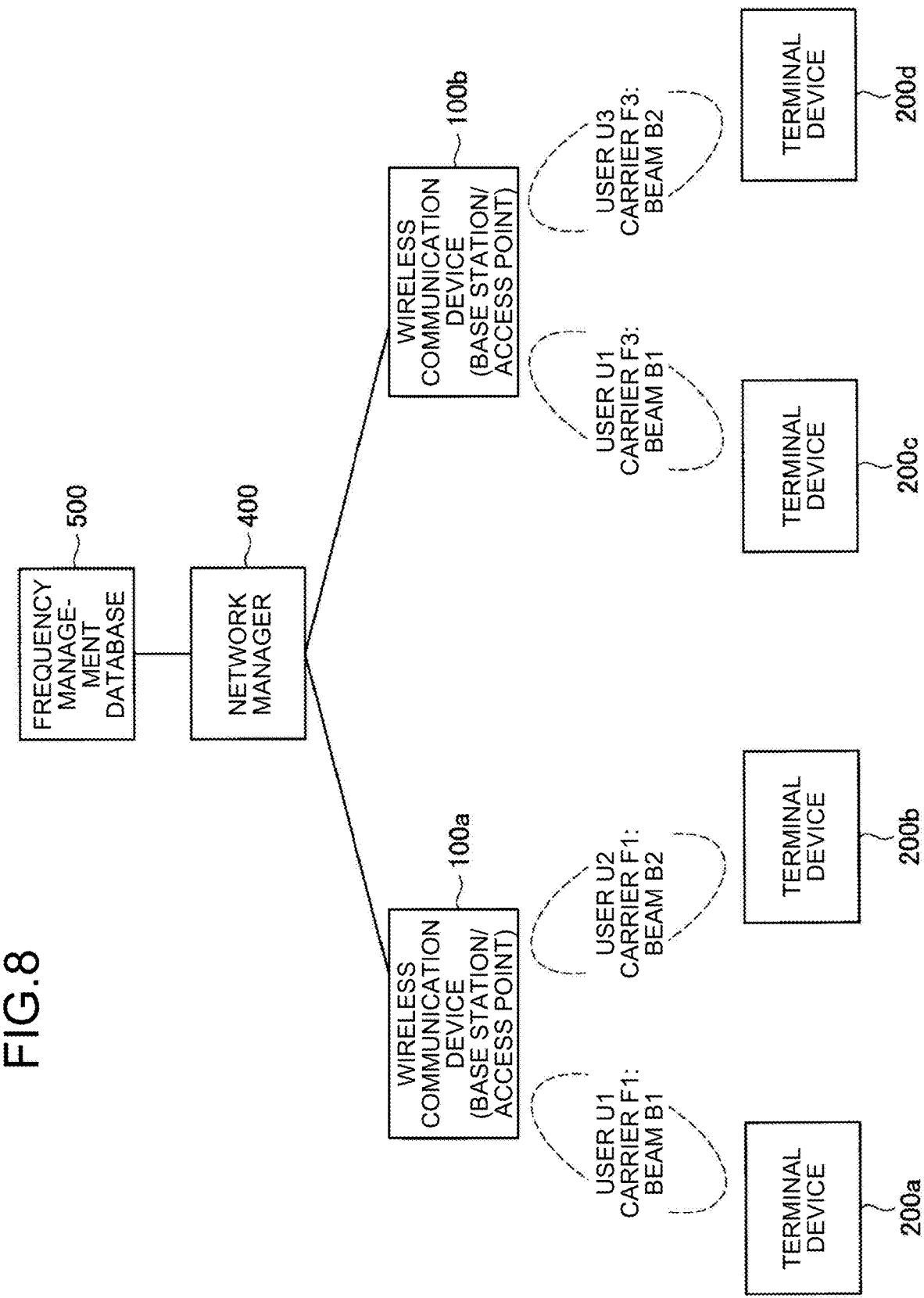
FIG. 8 is an explanatory diagram for explaining an example of a simulated scenario in the system according to the embodiment.

Firstly, explained below with reference to FIGS. 7 and 8 are examples of simulated scenarios in the system according to the embodiment of the application concerned. FIGS. 7 and 8 are explanatory diagrams for explaining examples of simulated scenarios in the system according to the embodiment of the application concerned.

In the examples illustrated in FIGS. 7 and 8, the wireless communication device 100 represents a base station or an access point, and performs wireless communication with the terminal devices 200. Moreover, the wireless communication device 100 includes a plurality of RF units; is capable of simultaneously using a plurality of component carriers based on the configuration that enables formation of a plurality of beams; and has each component carrier allocated to a user (RAN sharing). Each component carrier becomes available for use based on the permission and allocation from the frequency management database 500 (frequency sharing).

For example, in FIG. 7 is illustrated an example in which the wireless communication device 100 directly issues a request to the frequency management database 500 about the use of frequencies (for example, a request related to the registration of users and the allocation of frequencies to the users). More particularly, in the example illustrated in FIG. 7, mutually different carriers F1 and F2 are allocated to users U1 and U2, respectively. That is, in the example illustrated in FIG. 7, a terminal device 200a that uses the services from the user U1 uses the carrier F1 for communicating with the wireless communication device 100. Moreover, a terminal device 200b that uses the services from the user U2 uses the carrier F2 for communicating with the wireless communication device 100.

In FIG. 8 is illustrated an example in which a network manager 400 is installed that manages one or more wireless communication devices 100. In that case, the network manager 400 issues a request to the frequency management database 500 about the use of frequencies by the wireless communication devices 100 representing the management targets. Moreover, it is also possible to think of a situation in which the wireless communication devices 100 form directional beams by converging wireless radio waves, which are emitted from antennas, into predetermined directions based on the beam forming technology, and spatially separate the communication with each of a plurality of terminal devices 200. In such a situation, even if the same frequency band is used, different users can be allocated with mutually different beams. For example, in the example illustrated in FIG. 8, regarding the carrier F1 used by a wireless communication device 100a for communicating with the terminal devices 200a and 200b, of mutually different beams B1 and B2, the beam B1 is allocated to the user U1 and the beam B2 is allocated to the user U2. In an identical manner, regarding a carrier F3 that is used by a wireless communication device 100b for communicating with terminal devices 200c and 200d, of the mutually different beams B1 and B2, the beam B1 is allocated to the user U1 and the beam B2 is allocated to a user U3.

Till now, with reference to FIGS. 7 and 8, the explanation was given about the exemplary scenarios simulated in the system according to the embodiment of the application concerned.

4.2. Functional Configuration

As an example of the functional configuration of the system according to the embodiment of the application concerned, the following explanation is given about the frequency management database 500 and the network manager 400. Regarding the base stations 100 and the terminal devices 200, the functional configuration is as explained earlier with reference to FIGS. 2 and 3. Hence, that detailed explanation is not repeated.

4.2.1. Configuration Example of Frequency Management Database

Figure 9:
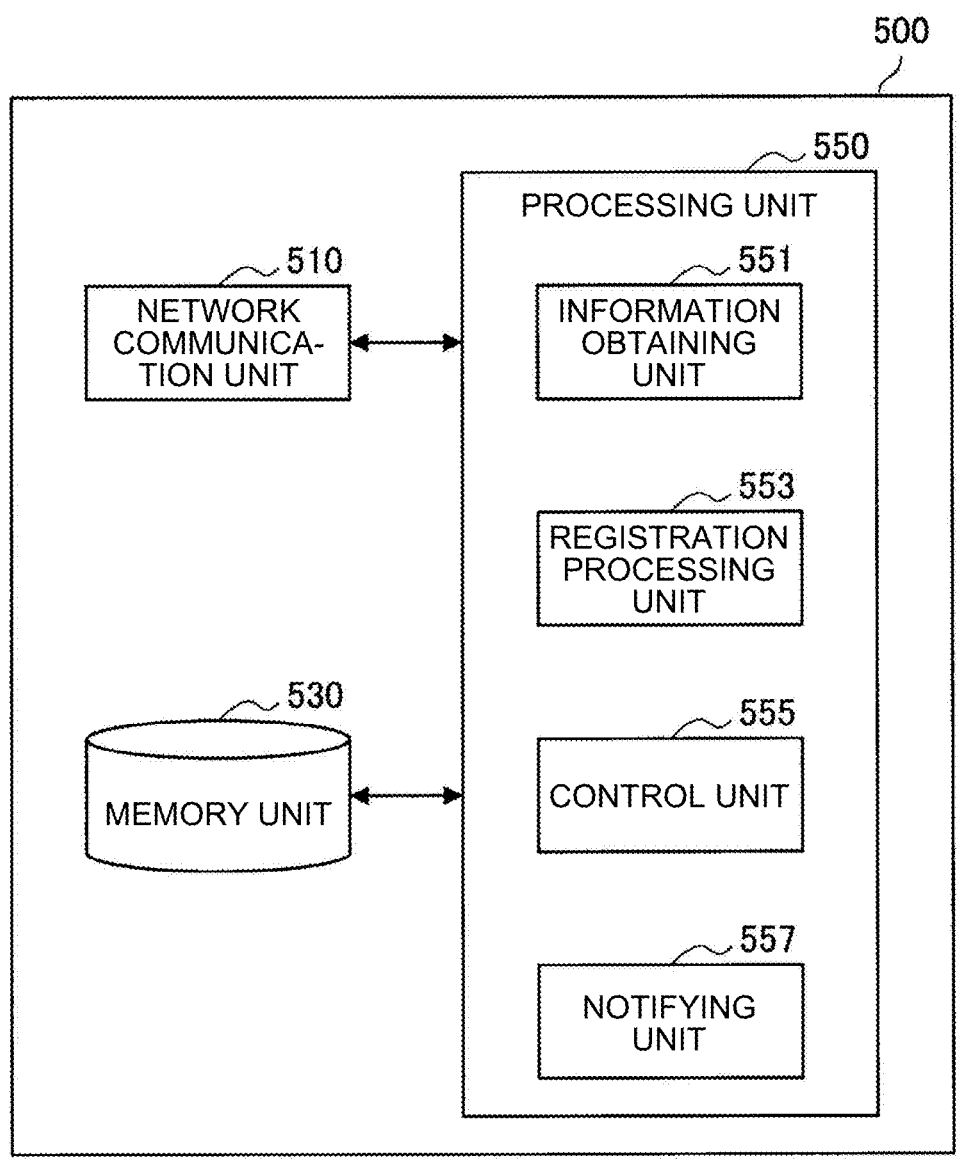
FIG. 9 is a block diagram illustrating an exemplary functional configuration of a frequency management database according to the embodiment.

Firstly, Explained Below with Reference to FIG. 9 is an exemplary functional configuration of the frequency management database 500 according to the embodiment of the application concerned. FIG. 9 is a block diagram illustrating an exemplary functional configuration of the frequency management database 500 according to the embodiment of the application concerned. As illustrated in FIG. 9, the frequency management database 500 includes a network communication unit 510, a memory unit 530, and a processing unit 550.

(1) Network Communication Unit 510

The network communication unit 510 sends and receives information. For example, the network communication unit 510 sends information to other nodes, and receives information from other nodes. For example, the other nodes include the wireless communication devices 100, such as base stations and access points, and include core network nodes such as the network manager 400.

(2) Memory Unit 530

The memory unit 530 is used to store, temporarily or permanently, programs and a variety of data to be used in the operations of the frequency management database 500. Moreover, the memory unit 530 can be used to store a variety of information managed in the frequency management database 500 (for example, device registration IDs and information related to the allocation of frequency bands to the wireless communication devices 100).

(5) Processing Unit 550

The processing unit 550 provides various functions of the frequency management database 500. The processing unit 550 includes an information obtaining unit 551, a registration processing unit 553, a control unit 555, and a notifying unit 557. Moreover, the processing unit 550 can also include other constituent elements other than the constituent elements mentioned herein. That is, the processing unit 550 can also perform operations other than the operations of the constituent elements mentioned herein.

Regarding the information obtaining unit 551, the registration processing unit 553, the control unit 555, and the notifying unit 557; the detailed explanation is given later.

4.2.2. Configuration Example of Network Manager

Figure 10:
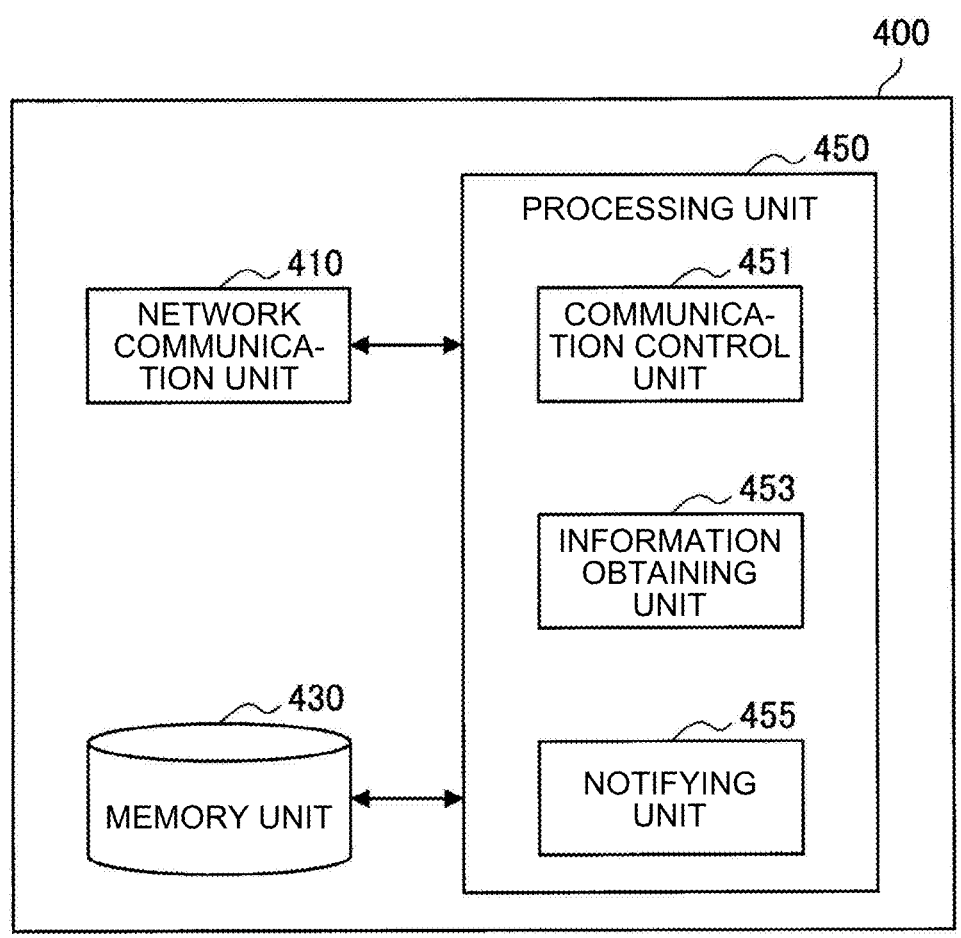
FIG. 10 is a block diagram illustrating an exemplary functional configuration of a network manager according to the embodiment.

Explained below with reference to FIG. 10 is an exemplary functional configuration of the network manager 400 according to the embodiment of the application concerned. FIG. 10 is a block diagram illustrating an exemplary functional configuration of the network manager 400 according to the embodiment of the application concerned. As illustrated in FIG. 10, the network manager 400 includes a network communication unit 410, a memory unit 430, and a processing unit 450.

(1) Network Communication Unit 410

The network communication unit 410 sends and receives information. For example, the network communication unit 410 sends information to other nodes, and receives information from other nodes. For example, the other nodes include the wireless communication devices 100 such as base stations and access points, include core network nodes such as other network managers, and include the frequency management database 500.

(2) Memory Unit 430

The memory unit 430 is used to store, temporarily or permanently, programs and a variety of data to be used in the operations of the network manager 400.

(5) Processing Unit 450

The processing unit 450 provides various functions of the network manager 400. The processing unit 450 includes a communication control unit 451, an information obtaining unit 453, and a notifying unit 455. Moreover, the processing unit 450 can also include other constituent elements other than the constituent elements mentioned herein. That is, the processing unit 450 can also perform operations other than the operations of the constituent elements mentioned herein.

Regarding the communication control unit 451, the information obtaining unit 453, and the notifying unit 455; the detailed explanation is given later.

Till now, with reference to FIGS. 9 and 10, the explanation was given about the frequency management database 500 and the network manager 400 as part of the exemplary functional configuration of the system according to the embodiment of the application concerned.

4.3. Operations

Given below is the explanation of the examples of the operations performed in the system according to the embodiment of the application concerned.

4.3.1. Procedure for Registration of Device

Figure 11:
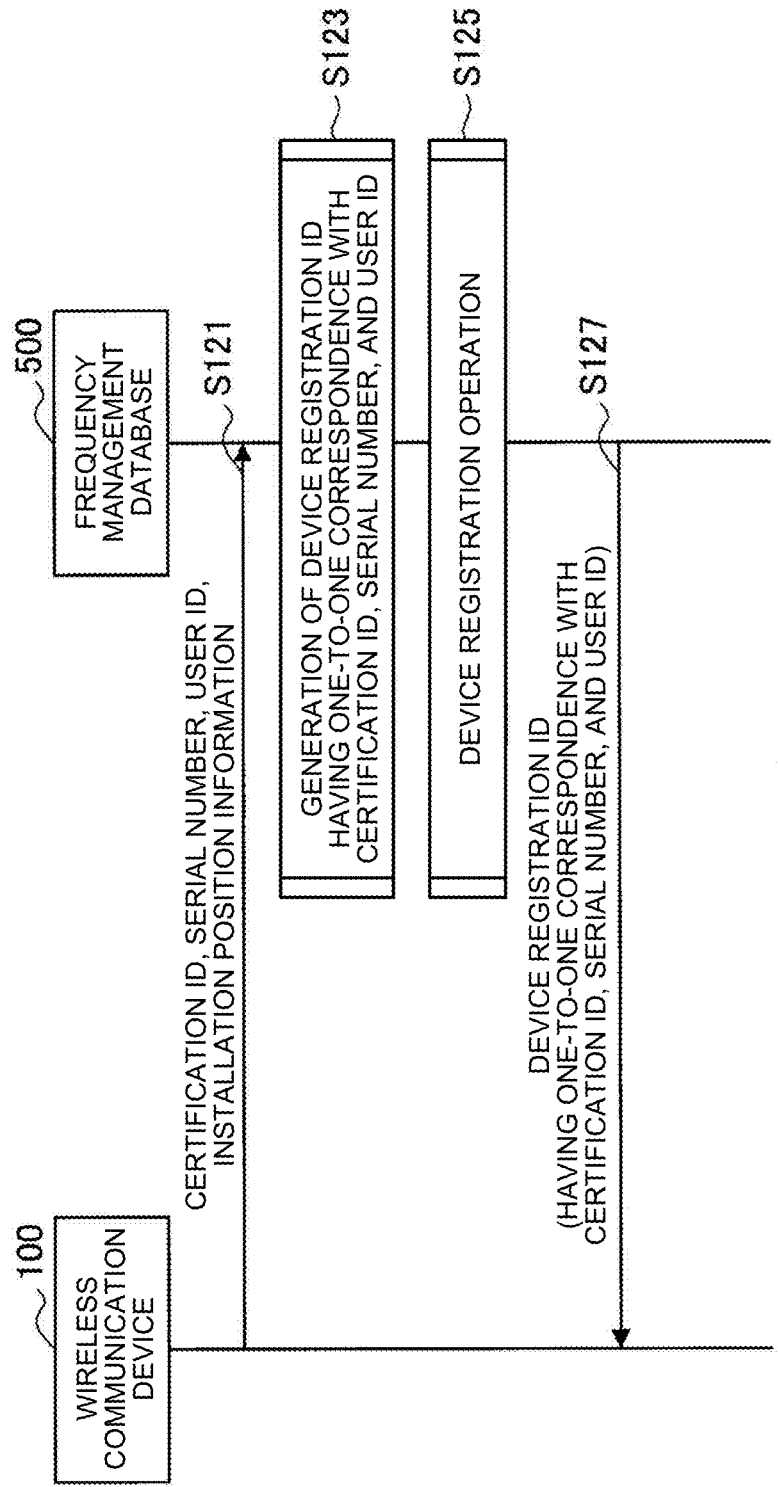
FIG. 11 is a sequence diagram for explaining an exemplary flow of operations performed in the system according to the embodiment.
Figure 12:
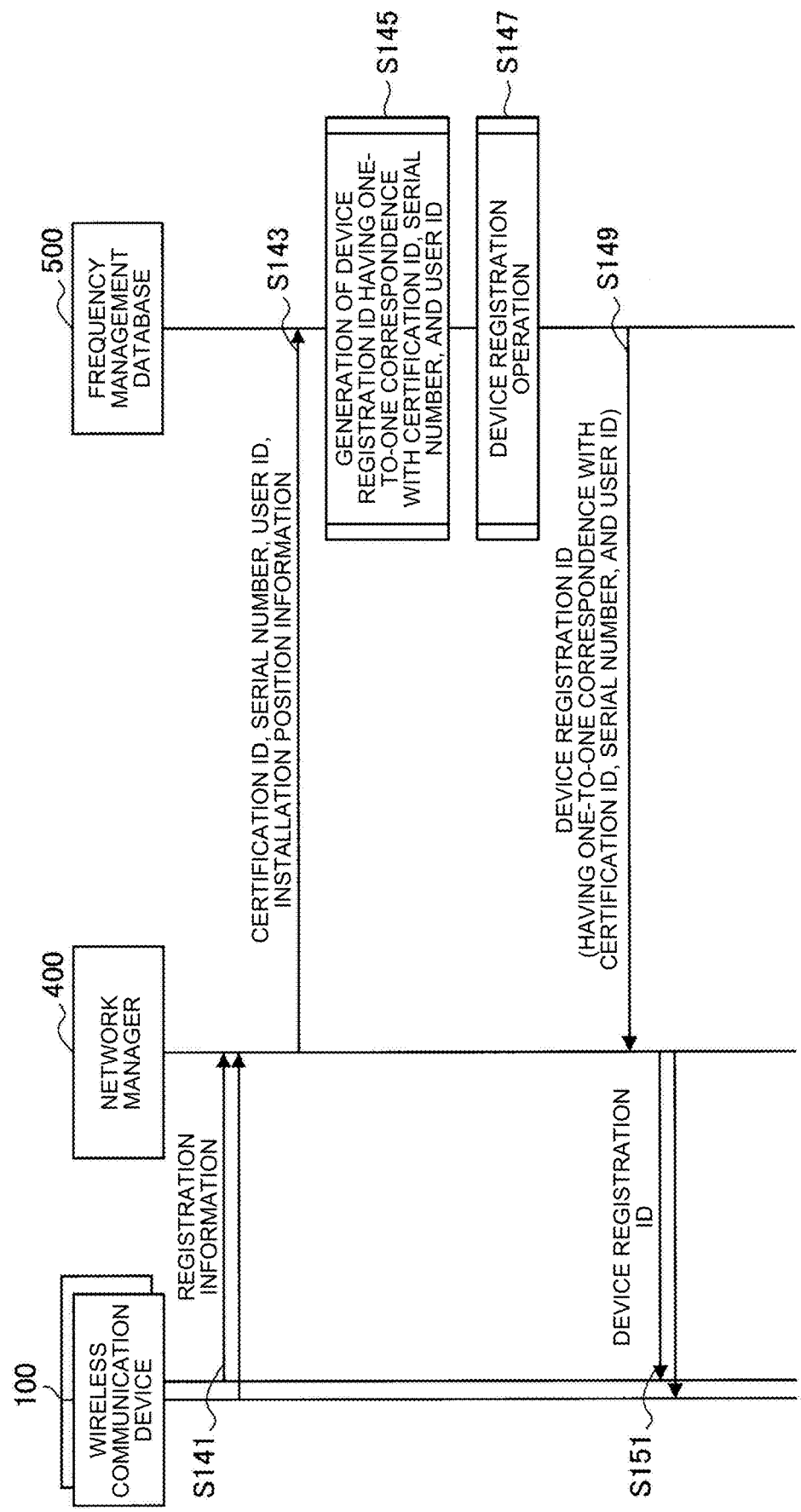
FIG. 12 is a sequence diagram for explaining another exemplary flow of operations performed in the system according to the embodiment.

Firstly, explained below with reference to FIGS. 11 and 12 are exemplary flows of the procedures related to the registration of a device, such as a base station or an access point (i.e., the wireless communication device 100), in the frequency management database 500. In the following explanation, unless particularly specified otherwise, the wireless communication device 100 is configured as the base station 100 explained with reference to FIG. 2. Alternatively, the wireless communication device 100 can be configured as what is called an access point. Even if the wireless communication device 100 is configured as an access point, the procedures with respect to the frequency management database 500 are practically identical to the case in which the wireless communication device 100 is configured as a base station.

Firstly, the explanation is given for the example illustrated in FIG. 11. FIG. 11 is a sequence diagram for explaining an exemplary flow of operations performed in the system according to the embodiment of the application concerned. In FIG. 11 is illustrated an exemplary flow of the procedure related to device registration in the frequency management database 500. In the example illustrated in FIG. 11, the wireless communication device 100 directly issues a request to the frequency management database 500 about device registration, as explained earlier about the scenario with reference to FIG. 7.

As illustrated in FIG. 11, the wireless communication device 100 (the notifying unit 155) sends a certification ID, a serial number, a user ID, and installation position information to the frequency management database 500 as the information to be registered in the frequency management database 500 (S121). Herein, either only the serial number or the certification ID and the serial number represent an example of "first-type identification information" that is specific to the communication device performing wireless communication (i.e., a base station or an access point). Moreover, the serial number itself can represent an example of the "first-type identification information". Furthermore, the user ID represents an example of "second-type identification information" that is specific to the user who is the target for allocating a frequency band which is available for secondary use in wireless communication.

The frequency management database 500 (the information obtaining unit 551) obtains the certification ID, the serial number, the user ID, and the installation position information corresponding to the wireless communication device 100 as the information related to device registration from the wireless communication device 100 (S121). Then, as the identification information having one-to-one correspondence with the certification ID, the serial number, and the user ID obtained from the wireless communication device 100 (i.e., as the identification specific to that combination of information), the frequency management database 500 (the registration processing unit 553) generates a device registration ID corresponding to the wireless communication device 100 (S123). The device registration ID represents an example of "third-type identification information". Thus, in the configuration of the frequency management database 500, the constituent element related to the generation of device registration IDs (for example, the registration processing unit 553) represents an example of a "generating unit".

The frequency management database 500 registers, as the information related to the wireless communication device 100, the generated device registration ID in a corresponding manner to the installation position information that is obtained from the wireless communication device 100 (S125). Moreover, the frequency management database 500 (the notifying unit 557) notifies the wireless communication device 100 about the device registration ID (S127). As a result, thereafter, by notifying the frequency management database 500 about the device registration ID, the wireless communication device 100 can request the frequency management database 500 to perform various operations related to the device corresponding to the device registration ID (i.e., related to the wireless communication device 100 itself).

As illustrated in the example in FIG. 11, when the wireless communication device 100 directly issues a request related to device registration to the frequency management database 500, the wireless communication device 100 represents an example of a "communication control device" and can also represent an example of a "communication device" representing the registration target. Moreover, the frequency management database 500 represents an example of a "management device".

Given below is the explanation about the example illustrated in FIG. 12. FIG. 12 is a sequence diagram for explaining another exemplary flow of operations performed in the system according to the embodiment of the application concerned. In FIG. 12 is illustrated an exemplary flow of the procedure related to device registration in the frequency management database 500. In the example illustrated in FIG. 12, the network manager 400 is installed that manages a plurality of wireless communication devices 100, as explained earlier about the scenario with reference to FIG. 8. Moreover, in the example illustrated in FIG. 12, the network manager 400 issues requests to the frequency management database 500 related to device registration of the wireless communication devices 100 representing the management targets.

As illustrated in FIG. 12, each wireless communication device 100 (the notifying unit 155), which represents the target for registration in the frequency management database 500, sends a variety of information related to itself (for example, the certification ID, the serial number, the user ID, and the installation position information) as registration information to the network manager 400. That is, the network manager 400 (the information obtaining unit 453) obtains, from each wireless communication device 100 representing the management target, the registration information related to that wireless communication device 100 also representing the target for registration in the frequency management database 500 (S141). After the registration information is obtained from the wireless communication device 100, the network manager 400 (the notifying unit 455) sends the registration information (i.e., the certification ID, the serial number, the user ID, and the installation position information) to the frequency management database 500 (S143).

The frequency management database 500 (the information obtaining unit 551) obtains, as the information related to device registration from the network manager 400, the registration information (i.e., the certification ID, the serial number, the user ID, and the installation position information) corresponding to the wireless communication device 100 representing the management target for the network manager 400 (S143). Then, the frequency management database 500 (the registration processing unit 553) generates a device registration ID, which corresponds to the wireless communication device 100 to be registered, as the identification information having one-to-one correspondence with the combination of the certification ID, the serial number, and the user ID obtained from the network manager 400 (S145).

The frequency management database 500 (the registration processing unit 553) registers, as the information related to the wireless communication device 100, the generated device registration ID in a corresponding manner to the installation position information of the wireless communication device 100 that represents the registration target as obtained from the network manager 400 (S147). Moreover, the frequency management database 500 (the notifying unit 557) notifies the network manager 400 about the device registration ID (S149).

After the device registration ID is obtained from the frequency management database 500 as a response to the sent registration information, the network manager 400 (the notifying unit 455) notifies the wireless communication device 100, from which the registration information was obtained, about the device registration ID (S151). As a result, thereafter, by notifying the frequency management database 500 about the device registration ID via the network manager 400, the wireless communication device 100 can request the frequency management database 500 to perform various operations related to the device corresponding to the device registration ID (i.e., related to the wireless communication device 100 itself).

As illustrated in the example in FIG. 12, when the network manager 400 issues a request to the frequency management database 500 related to device registration of each wireless communication device 100 representing the management target, the network manager 400 represents an example of the "communication control device". Moreover, the wireless communication device 100 that is the management target for the network manager 400 also represents an example of the "communication device" that is to be registered. Furthermore, the frequency management database 500 represents an example of the "management device".

Till now, with reference to FIGS. 11 and 12, the explanation was given about the exemplary flows of the procedures related to the registration of a device, such as a base station or an access point (i.e., the wireless communication device 100), in the frequency management database 500.

Meanwhile, as explained earlier, it is also possible to consider a situation in which the wireless communication device 100 performs spatial multiplexing by forming a plurality of beams that use the same frequency band. In such a case, as the antenna information included as part of the installation position information, beam pattern information and the identifier of the beam pattern (hereinafter, also referred to as "beam identifier") can be notified to the frequency management database 500. In that case, the frequency management database can generate a device registration ID that has one-to-one correspondence with the combination of the certification ID, the serial number, the user ID, and the beam identifier. Herein, the beam identifier represents an example of "fourth-type identification information".

Figure 13:
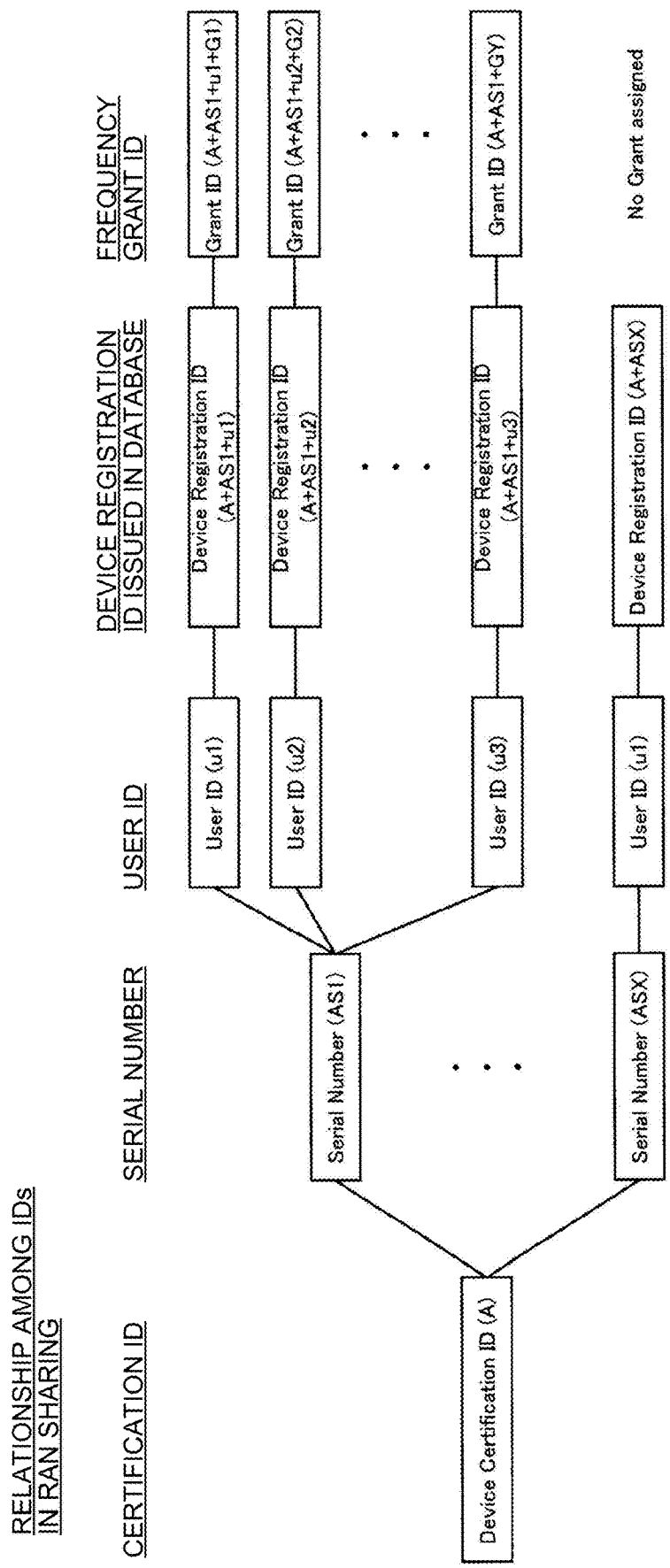
FIG. 13 is an explanatory diagram for explaining an example of the linking of sets of identification information defined in the protocols among frequency management databases and the infrastructure in the system according to the embodiment.

In the system according to the present embodiment, the allocation of a frequency band to each user or each device is performed in the units of device registration IDs that are generated as described above. On that basis, in FIG. 13 is illustrated an example of the linking of sets of identification information defined in the protocols among frequency management databases and the infrastructure in the system according to the embodiment of the application concerned. In FIG. 13, a frequency grant ID represents an ID enabling identification of a frequency band allocated to a user. That is, in the example illustrated in FIG. 13, each device registration ID has frequency grant IDs associated thereto. From that too, it can be understood that the allocation of frequency bands is performed in the units of device registration IDs.

As described above, in the system according to the embodiment of the application concerned, even in the case of RAN sharing in which the wireless communication device 100 is shared by a plurality of users, a different device registration ID is generated for each user. Hence, for example, even if there is a change in the installation position information of some users thereby making it necessary to update the information registered in the frequency management database 500, it becomes possible to update the frequency information associated to the device registration IDs corresponding only to the concerned users. That is, when the information regarding some users is to be updated, destruction and disablement of the information can be limited only to those users, and the services to the other users can be continued with.

Particularly, in a situation in which directional beams are formed based on the beam forming technology, it is also possible to think of a situation in which, of the installation position information, the information related to the beam formation is updated relatively more frequently (for example, a situation in which beams are controlled dynamically or quasi-statically according to the state at that point of time). In such a case too, in the system according to the present embodiment, every time the updating is performed, the information about the frequencies used by the devices (base stations and access points) need not be disabled, thereby making it possible to use the network resources with more flexibility.

4.3.2. Procedure for Reregistration of Device

Figure 14:
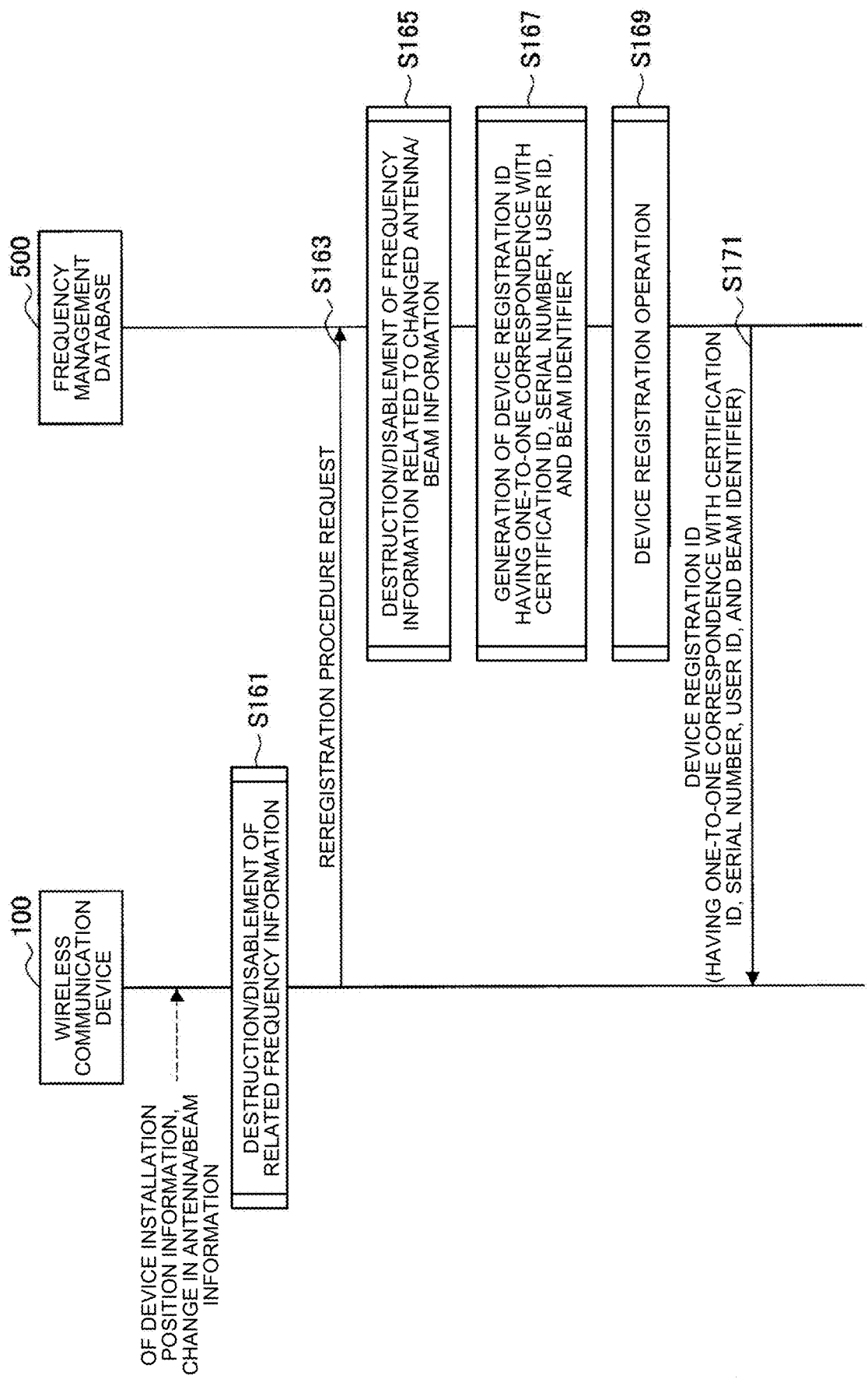
FIG. 14 is a sequence diagram for explaining another example of the flow of operations performed in the system according to the embodiment.

Explained below with reference to FIG. 14 is an exemplary flow of the procedure related to reregistration of a device, such as a base station or an access point (i.e., the wireless communication device 100), in the frequency management database 500.

FIG. 14 is a sequence diagram for explaining another example of the flow of operations performed in the system according to the embodiment of the application concerned. In FIG. 14 is illustrated an exemplary flow of the procedure related to device reregistration in the frequency management database 500. In the example illustrated in FIG. 14, the wireless communication device 100 directly issues a request to the frequency management database 500 about device registration, as explained earlier about the scenario with reference to FIG. 7. Moreover, in the example illustrated in FIG. 14, the wireless communication device 100 performs spatial multiplexing by forming a plurality of beams that use the same frequency band, and the information related to the antennas involved in beam formation and the information related to the beams (hereinafter, also called "antenna/beam information") undergoes a change.

As illustrated in FIG. 14, of the device installation position information, when the antenna/beam information undergoes a change, the wireless communication device 100 (the communication control unit 151) destroys and disables the related frequency information (S161). At that time, the wireless communication device 100 destroys and disables only such frequency information which is associated to the device registration ID corresponding to the changed antenna/beam information. Then, the wireless communication device 100 (the notifying unit 155) sends, to the frequency management database 500, the device registration ID corresponding to the beam for which the antenna/beam information has changed and the device installation position information containing the changed antenna/beam information; and issues a request regarding the procedure of device reregistration (S163).

Upon receiving the request related to the procedure of device reregistration from the wireless communication device 100 (S163), the frequency management database 500 (the registration processing unit 553) destroys and disables the frequency information associated to the device registration ID notified from the wireless communication device 100 (S165). As a result, from among the frequency bands allocated to the wireless communication device 100, the allocation of only that frequency band is disabled which corresponds to the frequency information associated to the device registration ID.

Then, the frequency management database 500 (the registration processing unit 553) generates a device registration ID having one-to-one correspondence with such a combination of the certification ID, the serial number, the user ID, and the beam identifier which represents the reregistration target. At that time, the frequency management database (the information obtaining unit 551) can again obtain, from the wireless communication device 100, the certification ID, the serial number, the user ID, and the beam identifier that represent the reregistration targets. Subsequently, the frequency management database 500 (the registration processing unit 553) registers, as the information related to the wireless communication device 100, the generated device registration ID in a corresponding manner to the installation position information obtained from the wireless communication device 100 (S169). Then, the frequency management database 500 (the notifying unit 557) notifies the wireless communication device 100 about the device registration ID (S171). The notified device registration ID has one-to-one correspondence with the combination of the following: the beam identifier of the beam for which the antenna/beam information had changed; the user ID of the user of that beam; and the serial number and the certification ID corresponding to the wireless communication device 100.

Meanwhile, as far as the updating of the registration information is concerned, as explained about the scenario with reference to FIG. 8, the updating can be performed in an identical manner even when the network manager 400 is installed that manages one or more wireless communication devices 100. In that case, the difference with the example illustrated in FIG. 14 is that the network manager 400 is responsible for issuing a request to the frequency management database 500 about device reregistration. However, the flow of the procedure between the network manager 400 and the frequency management database 500 is practically identical to the flow of the procedure between the wireless communication device 100 and the frequency management database 500 as illustrated in the example in FIG. 14. Hence, regarding the case in which the network manager 400 is installed, the detailed explanation is not repeated.

Till now, with reference to FIG. 14, the explanation was given about an exemplary flow of the procedure related to the reregistration of a device, such as a base station or an access point, in the frequency management database 500.

4.4. Modification Examples

Given below is the explanation of modification examples of the system according to the embodiment of the application concerned.

4.4.1. First Modification Example: Group of Device Registration IDs

Firstly, as a first modification example, the explanation is given about an example of a technology for implementing various procedures with respect to the frequency management database 500 (procedures such as registration of information, updating of information, and allocation of frequency bands) by treating a plurality of device registration IDs as a single group based on predetermined conditions.

In the examples explained with reference to FIGS. 4 and 5, the procedure related to the registration of devices in the frequency management database 500 is performed in the units of devices. Hence, in RAN sharing, as illustrated in FIGS. 4 and 5, a plurality of users share a single device registration ID.

In contrast, in the system according to the embodiment of the application concerned, when a plurality of users is sharing a single device, the procedure related to device registration is performed for each user. That is, for a single device, device registration IDs are generated that are equal in number to or greater in number than the number of users.

On the other hand, in the system according to the present embodiment, in the frequency management database 500, determination can be performed about which device registration IDs are related to a shared device, and the determination result can be utilized in the allocation of frequency bands to the users of that device. However, by taking into account the degree of freedom in the implementation or the operation form, it is a better option to have the network side (for example, the communication device 100 or the network manager 400) group a plurality of device registration IDs according to the units of management, and then report the group of device registration IDs to the frequency management database 500. In that regard, in the first modification example, the explanation is given about an example of a method for incorporating the procedure for generation of information related to the group of device registration IDs (hereinafter, also called "group information of device registration IDs" or simply called "group information") and the procedure for registration of the group information of device registration IDs in the procedure related to device registration in the frequency management database 500.

Figure 15:
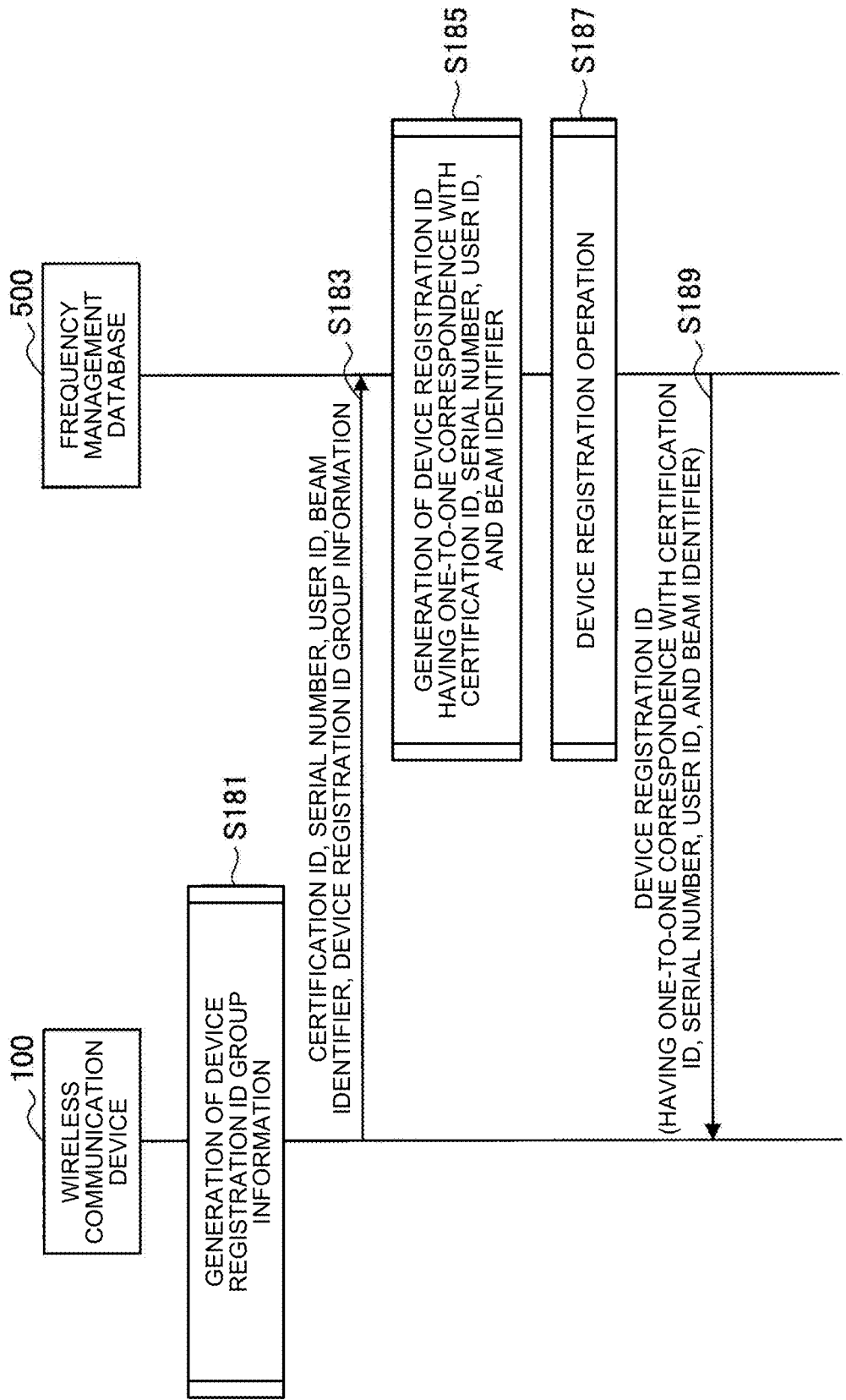
FIG. 15 is a sequence diagram for explaining about an exemplary flow of operations performed in the system according to a first modification example.
Figure 16:
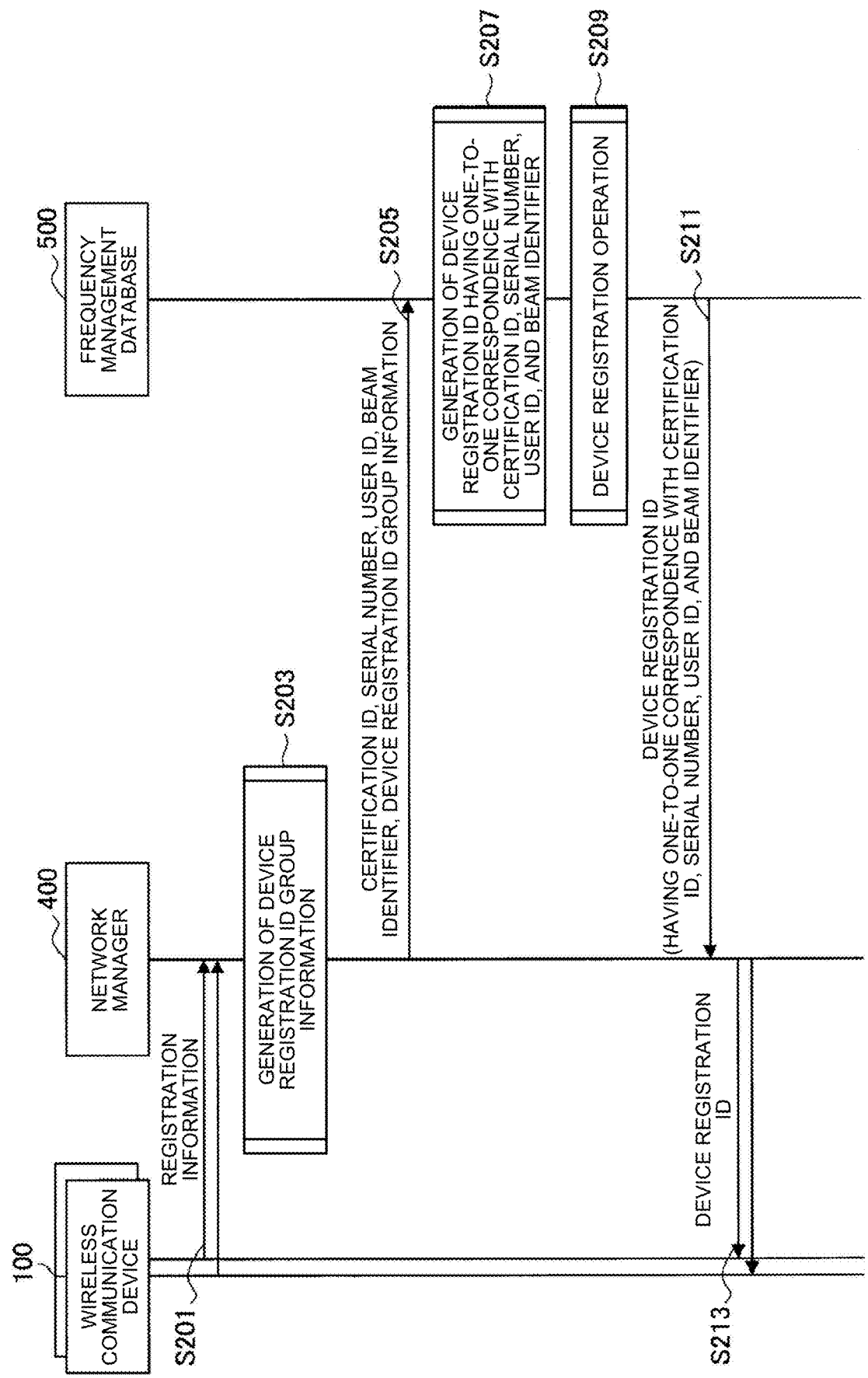
FIG. 16 is a sequence diagram for explaining about another exemplary flow of operations performed in the system according to the first modification example.

Firstly, explained below with reference to FIGS. 15 and 16 are explained exemplary flows of the procedures related to the registration of a device, such as a base station or an access point (i.e., the wireless communication device 100), in the frequency management database 500.

For example, FIG. 15 is a sequence diagram for explaining about an exemplary flow of operations performed in the system according to the first modification example. In FIG. 15 is illustrated an exemplary flow of the procedure related to device registration in the frequency management database 500. In the example illustrated in FIG. 15, the wireless communication device 100 directly issues a request to the frequency management database 500 about device registration, as explained earlier about the scenario with reference to FIG. 7. Moreover, in the example illustrated in FIG. 15, the wireless communication device 100 performs spatial multiplexing by forming a plurality of beams that use the same frequency band.

As illustrated in FIG. 15, the wireless communication device 100 (the communication control unit 151) generates group information of the device registration IDs as the information meant for grouping a plurality of device registration IDs based on predetermined conditions (S181). As a specific example, the group information of device registration IDs can contain, for example, device registration IDs that are newly issued as a result of registering devices in the frequency management database 500, and information related to other device registration IDs allocated to the common group (for example, already-issued device registration IDs).

As the conditions for defining the group information of device registration IDs, for example, it is possible to set "device registration IDs linking the users who share the same device", and "device registration IDs related to the users who share the same device and share the same frequency". As described later with reference to the example illustrated in FIG. 16, in the scenario in which the network manager 400 manages one or more wireless communication devices 100, as a condition for defining the group information of device registration IDs, for example, it is possible to set "device registration IDs related to the same user across different devices". Moreover, it is also possible to think of a case in which the information of a single device (i.e., the wireless communication device 100 such as a base station or an access point) is registered in a plurality of frequency management databases 500. In such a case, as a condition for defining the group information of device registration IDs, it is possible to set "device registration IDs obtained by a single device from other frequency management databases". Of course, such conditions are only exemplary. In the case of enabling RAN sharing as well as frequency sharing, as long the conditions are conceivable from the operational perspective, the conditions are not necessarily limited to the examples given above.

Then, the wireless communication device 100 (the notifying unit 155) sends, to the frequency management database 500 as the information to be registered in the frequency management database 500, the information such as the certification ID, the serial number, the user ID, and the beam identifier that is related to the generation of device registration ID, and the group information of the generated device registration ID (S183).

The frequency management database 500 (the registration processing unit 553) generates a device registration ID based on the information such as the certification ID, the serial number, the user ID, and the beam identifier obtained from the wireless communication device 100 (S123). The generated device registration ID represents the identification information having one-to-one correspondence with the combination of the information such as the certification ID, the serial number, the user ID, and the beam identifier obtained from the wireless communication device 100.

Based on the generated device registration ID, the frequency management database 500 (the registration processing unit 553) registers the corresponding device (i.e., the wireless communication device 100) (S187). Moreover, based on the group information of the device registration ID as obtained from the wireless communication device 100, the frequency management database 500 manages, as a group, the generated device registration ID and the other device registration IDs specified in the group information.

Then, the frequency management database 500 (the notifying unit 557) notifies the wireless communication device 100 about the generated device registration ID (S189).

Given below is the explanation of the example illustrated in FIG. 16. FIG. 16 is a sequence diagram for explaining about another exemplary flow of operations performed in the system according to the first modification example. In FIG. 16 is illustrated an exemplary flow of the procedure related to device registration in the frequency management database 500. In the example illustrated in FIG. 16, the network manager 400 is installed that manages a plurality of wireless communication devices 100, as explained earlier about the scenario with reference to FIG. 8. That is, in the example illustrated in FIG. 16, the network manager 400 issues a request to the frequency management database 500 related to device registration of each wireless communication device 100 representing the management target.

As illustrated in FIG. 16, the wireless communication device 100 (the notifying unit 155) sends, as registration information to the network manager 400, a variety of information (for example, the authentication ID, the serial number, the user ID, and the beam identifier) that is related to itself and that is to be registered in the frequency management database 500. That is, the network manager 400 (the information obtaining unit 453) obtains, from each wireless communication device 100 representing the management target, the registration information which is related to that wireless communication device 100 and which is to be registered in the frequency management database 500 (S201).

Then, the network manager 400 (the communication control unit 451) generates group information of the device registration ID as the information for grouping a plurality of device registration IDs based on the predetermined conditions (S203). Since the detailed explanation on the group information of the device registration ID is given earlier, it is not repeated herein. Subsequently, the network manager 400 (the notifying unit 455) sends, to the frequency management database 500, the registration information (i.e., the certification ID, the serial number, the user ID, and the beam identifier) obtained from the wireless communication device 100 obtained from the wireless communication device 100, along with the group information of the generated device registration ID (S205).

The frequency management database 500 (the information obtaining unit 551) generates a device registration ID based on the information such as the certification ID, the serial number, the user ID, and the beam identifier as obtained from the network manager 400 (S207). The generated device registration ID represents identification information having one-to-one correspondence with the combination of the information such as the certification ID, the serial number, the user ID, and the beam identifier as obtained from the wireless communication device 100.

Based on the generated device registration ID, the frequency management database 500 (the registration processing unit 553) registers the corresponding device (i.e., the wireless communication device 100 being managed by the network manager 400) (S209). Moreover, based on the group information of the device registration ID as obtained from the network manager 400, the frequency management database 500 manages, as a group, the generated device registration ID and the other device registration IDs specified in the group information. Then, the frequency management database 500 (the notifying unit 557) notifies the network manager 400 about the generated device registration ID (S211).

After the device registration ID is obtained from the frequency management database 500 as a response to the sent registration information, the network manager 400 (the notifying unit 455) notifies the wireless communication device 100, from which the registration information was obtained, about the device registration ID (S213).

Till now, with reference to FIGS. 15 and 16, the explanation was given about the exemplary flows of the procedures related to the registration of a device, such as a base station or an access point (i.e., the wireless communication device 100), in the frequency management database 500.

Figure 17:
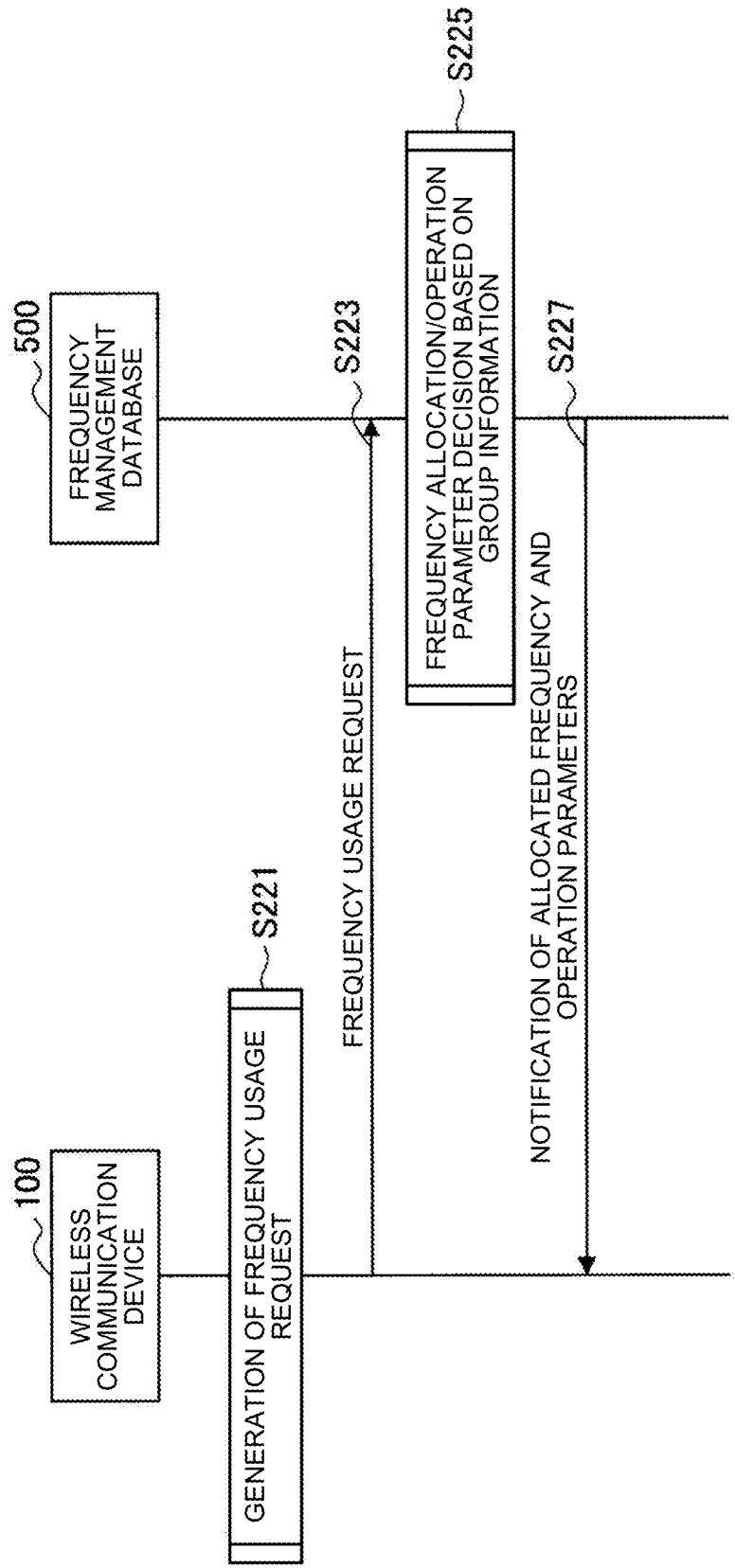
FIG. 17 is a sequence diagram for explaining about another exemplary flow of operations performed in the system according to the first modification example.
Figure 18:
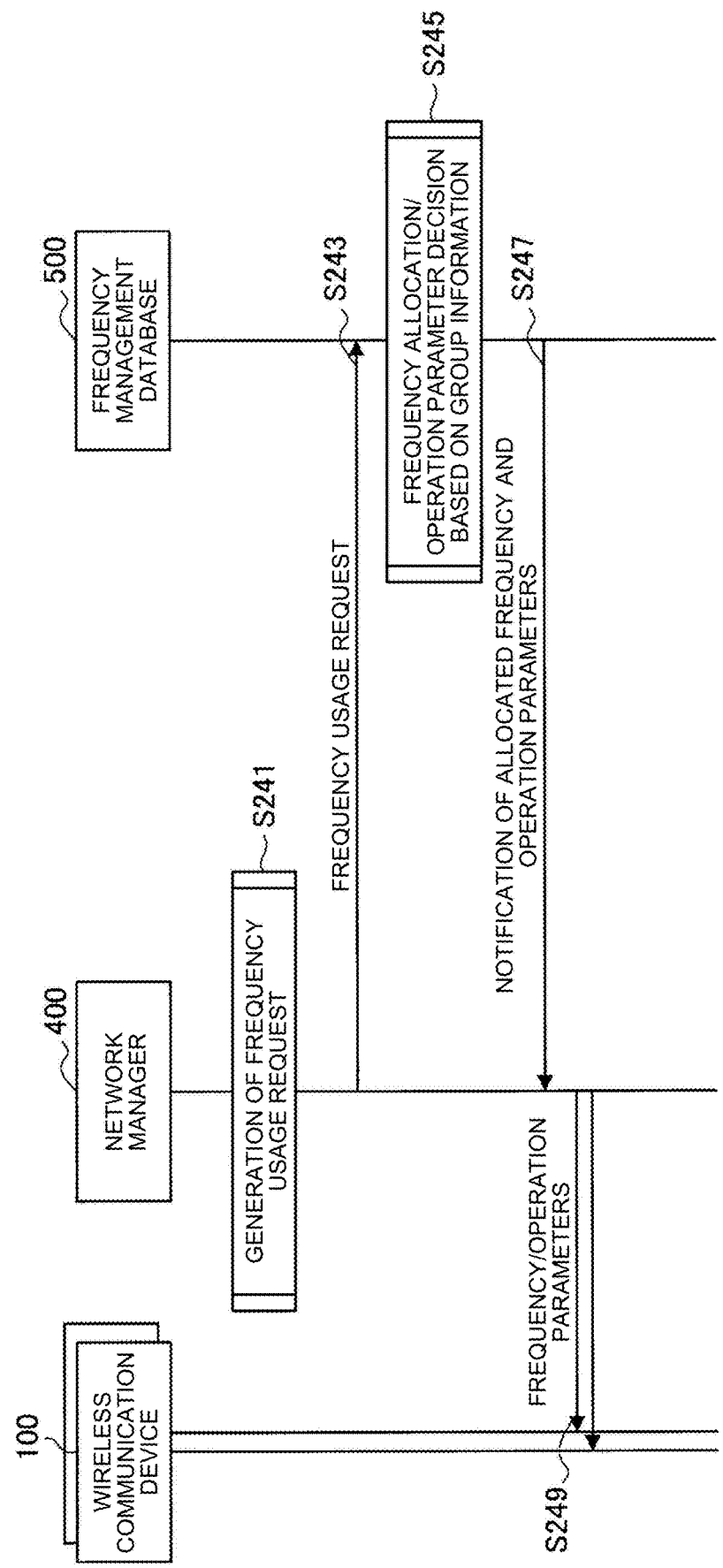
FIG. 18 is a sequence diagram for explaining about another exemplary flow of operations performed in the system according to the first modification example.

Explained below with reference to FIGS. 17 and 18 are exemplary flows of the procedures related to the allocation of frequency bands to devices or users by the frequency management database 500 using the group information of device registration IDs.

For example, FIG. 17 is a sequence diagram for explaining another example of the flow of operations performed in the system according to the first modification example. In FIG. 17 is illustrated an exemplary flow of the procedure related to the allocation of frequency bands to devices or users by the frequency management database 500. In the example illustrated in FIG. 17, the wireless communication device 100 directly issues a request to the frequency management database 500 about device registration, as explained earlier about the scenario with reference to FIG. 7. That is, for example, the procedure illustrated in FIG. 17 can be performed after the procedure illustrated in FIG. 15.

As illustrated in FIG. 17, the wireless communication device 100 (the communication control unit 151) generates information for requesting the frequency management database 500 to let use frequency bands (hereinafter, also called a "frequency usage request") (S221). Then, the wireless communication device 100 (the notifying unit 155) associates the device registration ID, which corresponds to the target for allocation of a frequency band, to the generated frequency usage request; and sends the frequency usage request to the frequency management database 500 (S223).

Upon receiving the frequency usage request from the wireless communication device 100, according to the device registration ID associated to the frequency usage request, the frequency management database 500 (the control unit 555) allocates a frequency band and decides on operation parameters related to the wireless communication in which the allocated frequency band would be used. At that time, if the concerned device registration ID is allocated to a group based on previously-obtained group information of device registration IDs, then the frequency management database 500 can allocate the frequency band and decide on the operation parameters based on the concerned group information (S225).

Then, the frequency management database 500 notifies the wireless communication device 100, which is the source of the frequency usage request, about the information related to the result of allocation of the frequency band and the result of decision on the operation parameters (S227). As a result, the wireless communication device 100 becomes able to recognize the frequency band allocated by the frequency management database 500, and recognize the operation parameters related to the wireless communication in which that frequency band would be used. That is, after the notification is received, the wireless communication device 100 becomes able to perform wireless communication using the frequency band allocated by the frequency management database 500.

Herein, regarding an example of allocation of frequency bands based on the group information of device registration IDs, the following explanation is given about each condition set for defining the group information of device registration IDs.

As a specific example, the case of "device registration IDs linking the users who share the same device" can be cited. In that case, for example, with respect to the users corresponding to the device registration IDs belonging to a group (hereinafter, simply called "users belonging to a group"), the frequency management database 500 becomes able to allocate mutually different frequency bands to the users belonging to that group.

As another example, the case can be cited in which the group information of device registration IDs is generated regarding the "device registration IDs related to the users who share the same device and share the same frequency". In that case, for example, the frequency management database 500 becomes able to allocate, to each user belonging to the group, the same frequency band while ensuring that the beams used by the users do not interfere with each other (i.e., ensuring that there is no self-interference in the device). Moreover, if it is estimated that the allocation of the same frequency band leads to interference among the users belonging to the group, the frequency management database 500 can also recommend at least some of the users belonging to the group to use some other frequency bands.

Moreover, as another example, the case can be cited in which the group information of device registration IDs is generated regarding the "device registration IDs related to the same user across different devices". In that case, for example, the frequency management database 500 becomes able to allocate the frequency band to a particular user in such a way that the frequency usage efficiency (for example, the network capacity) of that user is optimized. Furthermore, as another example, the frequency management database 500 becomes able to allocate the frequency band to a particular user in such a way that the network planning and cell design is achieved as per the demand of the user. Meanwhile, in that case, the information related to the conditions demanded by the user can be associated in advance to the group information.

Moreover, as another example, the case can be cited in which the group information of device registration IDs is generated regarding the "device registration IDs obtained by a single device from other frequency management databases". In that case, for example, the frequency management database 500 becomes able to allocate, to the target device, a different frequency band than the frequency bands allocated to that device by the other frequency management databases. Furthermore, as another example, the frequency management database 500 becomes able to allocate, to the target device, the same frequency band as the frequency band allocated to that device by the other frequency management databases. In that case, the frequency management database 500 can allocate, to the target device, a different beam than the beams allocated to that device by the other frequency management databases. Meanwhile, the information indicating whether the target device is to be allocated with different frequency bands or with the same frequency band across a plurality of frequency management databases can be associated to the group information in advance.

Meanwhile, if the group information of device registration IDs is not provided, the frequency management database 500 can allocate mutually different frequency bands or mutually different beams to different device registration IDs.

Given below is the explanation of the example illustrated in FIG. 18. FIG. 18 is a sequence diagram for explaining another example of the flow of operations performed in the system according to the first modification example. In FIG. 18 is illustrated an exemplary flow of the procedure related to the allocation of frequency bands to devices or users by the frequency management database 500. In the example illustrated in FIG. 18, the network manager 400 is installed that manages a plurality of wireless communication devices 100, as explained earlier about the scenario with reference to FIG. 8. That is, for example, the procedure illustrated in FIG. 18 can be performed after the procedure illustrated in FIG. 16.

As illustrated in FIG. 18, the network manager 400 (the communication control unit 451) generates, regarding the device under its management (i.e., the wireless communication device 100), a frequency usage request for requesting the frequency management database 500 to let the device use a frequency band (S241). Then, the network manager 400 (the notifying unit 455) associates a device registration ID, which corresponds to the target for frequency band allocation, to the frequency usage request; and sends the frequency usage request to the frequency management database 500 (S243).

The frequency management database (the control unit 555) receives the frequency usage request from the network manager 400 and, according to the device registration ID associated to the frequency usage request, allocates a frequency band and decides on operation parameters related to wireless communication in which the allocated frequency band is used. At that time, if the concerned device registration ID is allocated to a group based on previously-obtained group information of device registration IDs, then the frequency management database 500 can allocate the frequency band and decide on the operation parameters based on the concerned group information (S245).

Then, the frequency management database 500 (the notifying unit 557) notifies the network manager, which is the source of the frequency usage request, about the information related to the result of allocation of the frequency band and the result of decision on the operation parameters (S247). Moreover, the network manager 400 (the notifying unit 455) notifies the wireless communication device 100, which is to be allocated with a frequency band from among the wireless communication devices 100 being managed by the network manager 400, about the information related to the result of allocation of the frequency band and the result of decision on the operation parameters as notified from the frequency management database 500. As a result, the concerned wireless communication device 100 becomes able to recognize the frequency band allocated by the frequency management database 500, and recognize the operation parameters related to the wireless communication in which the frequency band would be used. That is, after the notification is received, the wireless communication device 100 becomes able to perform wireless communication using the frequency band allocated by the frequency management database 500.

Till now, with reference to FIGS. 17 and 18, the explanation was given about the exemplary flows of the procedures related to the allocation of frequency bands to devices or users by the frequency management database 500 using the group information of device registration IDs.

4.4.2. Second Modification Example: Collaboration Among Frequency Management Databases Given below is the explanation, as a second modification example, of an example in which a plurality of frequency management databases 500 operate in collaboration.

Figure 19:
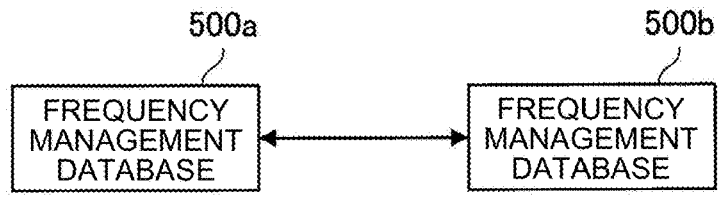
FIG. 19 is an explanatory diagram for explaining an overview of the system according to a second modification example.

For example, FIG. 19 is an explanatory diagram for explaining an overview of the system according to the second modification example. In the second modification example, for the purpose of convenience, the explanation is given for an example in which frequency management databases 500*a* and 500*b* operate in collaboration as illustrated in FIG. 19. In the CBRS, it is allowed to have different business operators operating a plurality of frequency management databases 500. Hence, for example, in the example illustrated in FIG. 19, it is possible to think that the frequency management databases 500*a* and 500*b* are operated by two different business operators.

Explained below with reference to a specific example are the collaborative operations performed among a plurality of frequency management databases 500. In a situation in which a plurality of frequency management databases 500 is operated, there are times when mutually different wireless communication devices 100 (i.e., base stations and access points) are managed in each frequency management database 500. In such a case, it is also possible to think of a situation in which the wireless communication devices 100 managed in each frequency management database 500 interfere with each other. Hence, there are times when a mechanism is required by which a plurality of frequency management databases 500 perform interference control in collaboration.

Figure 20:
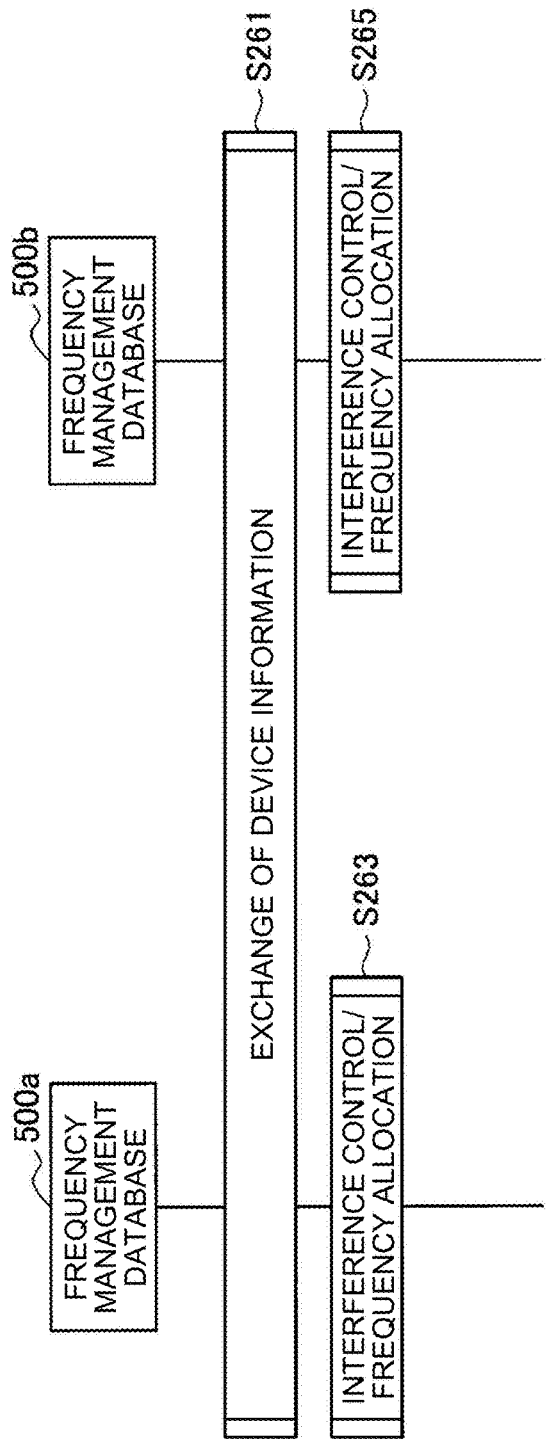
FIG. 20 is a sequence diagram for explaining an exemplary flow of a series of operations performed in the system according to the second modification example.

For example, FIG. 20 is a sequence diagram for explaining an exemplary flow of a series of operations performed in the system according to the second modification example. In FIG. 20 is illustrated an exemplary flow of the overall operations performed in the case in which the frequency management databases 500*a* and 500*b* perform interference control in collaboration.

As illustrated in FIG. 20, the frequency management databases 500*a* and 500*b* exchange information related to the devices managed therein (for example, device registration IDs and device installation position information), and thus each frequency management database 500 recognizes the information related to the devices managed in the other frequency management database 500 (S261). Then, according to the obtained information related to the devices managed (for example, the installation positions) in the frequency management database 500*b*, the frequency management database 500*a* can perform frequency band allocation and interference control with respect to the devices managed therein (S263). In an identical manner, according to the obtained information related to the devices managed (for example, the installation positions) in the frequency management database 500*a*, the frequency management database 500*b* can perform frequency band allocation and interference control with respect to the devices managed therein (S265).

Figure 21:
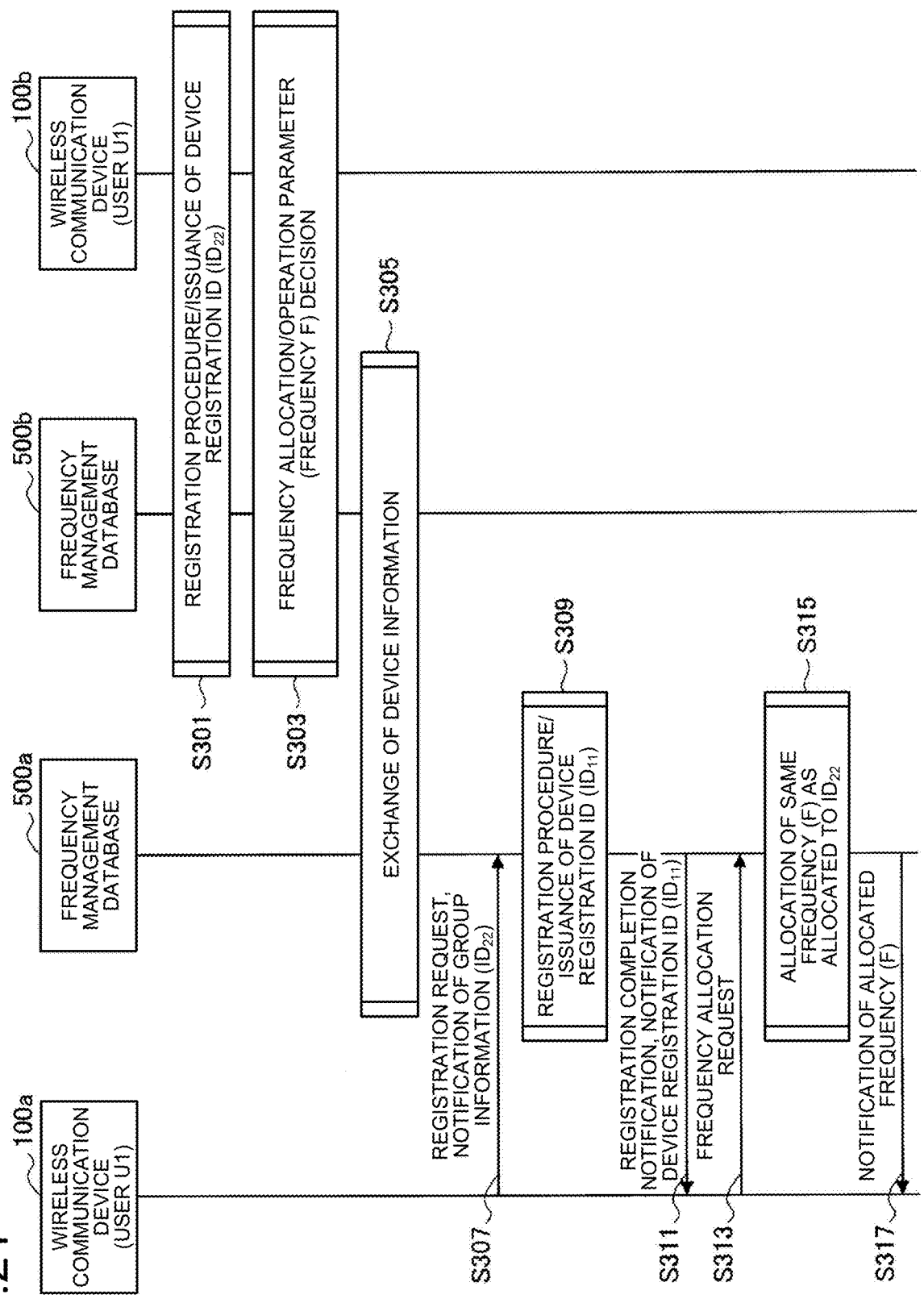
FIG. 21 is a sequence diagram for explaining an exemplary flow of a series of operations performed in the system according to the second modification example.
Figure 22:
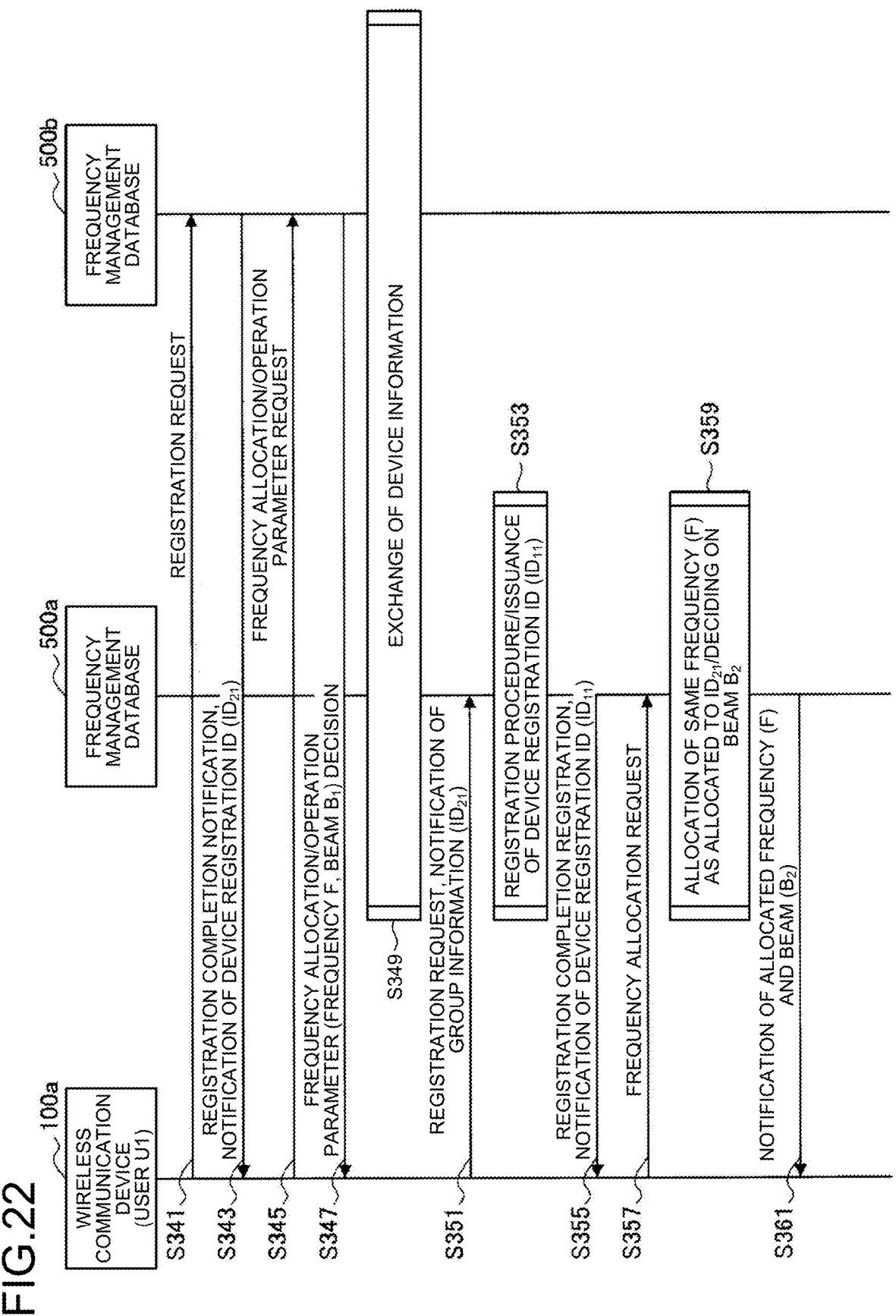
FIG. 22 is a sequence diagram for explaining another exemplary flow of a series of operations performed in the system according to the second modification example.
Figure 23:
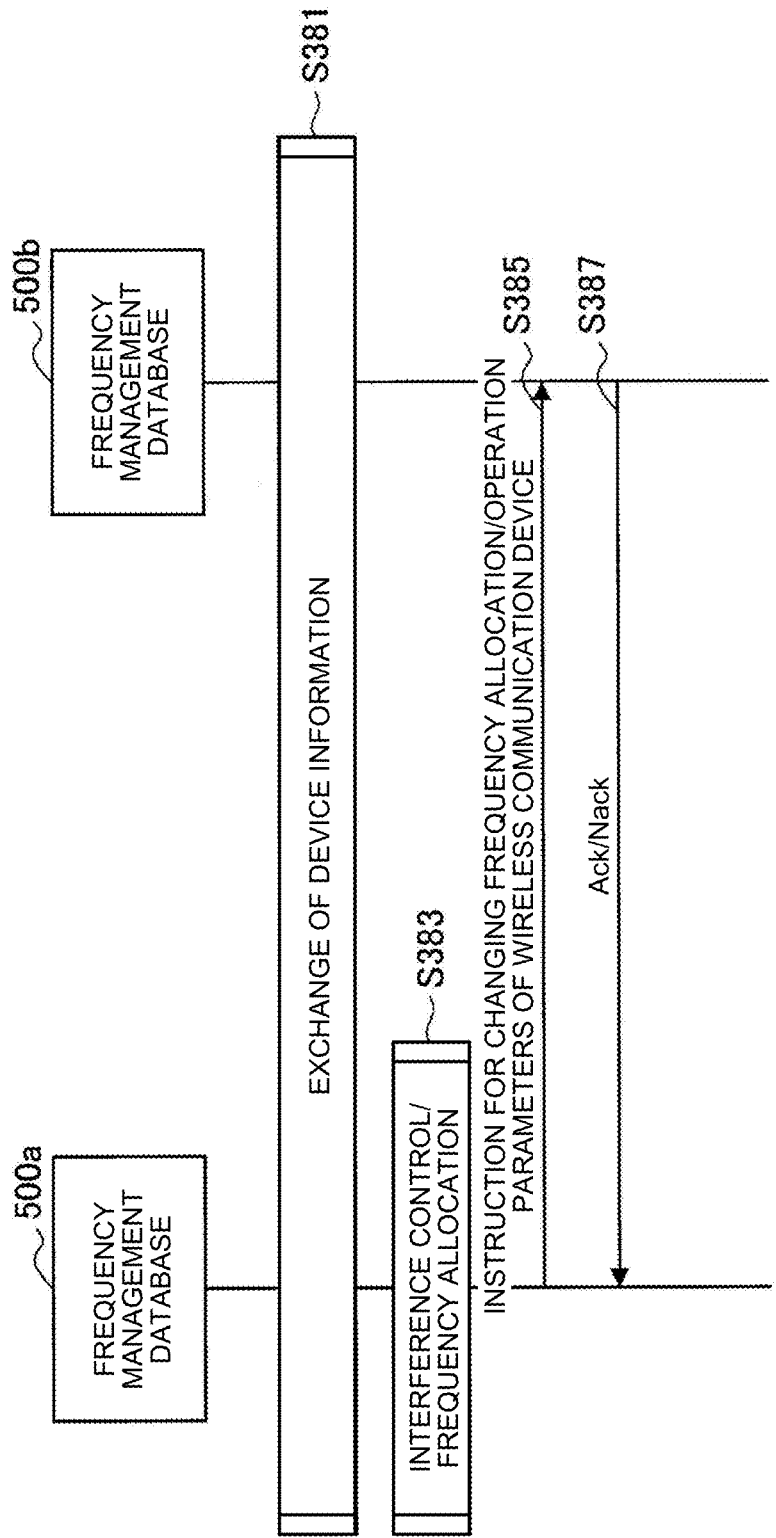
FIG. 23 is a sequence diagram for explaining another exemplary flow of a series of operations performed in the system according to the second modification example.

Given below with reference to FIGS. 21 to 23 is a more specific explanation of the example of collaborative operations performed among a plurality of frequency management databases 500.

Firstly, the explanation is given about the example illustrated in FIG. 21. FIG. 21 is a sequence diagram for explaining an exemplary flow of a series of operations performed in the system according to the second modification example. More particularly, in FIG. 21 is illustrated an exemplary flow of the procedure in the case in which, when the user U1 is using the devices managed separately by the frequency management databases 500*a* and 500*b* (i.e., using the wireless communication devices 100*a* and 100*b*), the devices are allocated with the same frequency band.

As illustrated in FIG. 21, firstly, in between the frequency management database 500*b* and the wireless communication device 100*b*, the procedure is performed regarding the registration of the information on the user U1 of the wireless communication device 100*b*, and a device registration ID is issued (S301). The issued device registration ID (in other words, the generated device registration ID) is also referred to as a "device registration ID ($ID_{22}$)" for the purpose of convenience. Then, in between the frequency management database 500*b* and the wireless communication device 100*b*, the procedure is performed regarding the allocation of the frequency band to the user U1 of the wireless communication device 100*b* and regarding the decision on the operation parameters related to the wireless communication in which the allocated frequency band would be used (S303). Herein, the procedures performed at S301 and S303 are practically identical to the procedures in the embodiment and the first modification example. Hence, the detailed explanation is not repeated.

Then, in between the frequency management databases 500*a* and 500*b*, information related to the devices managed therein is exchanged (S305). As a result, the frequency management database 500*a* becomes able to recognize the information related to the wireless communication device 100*b* and the user U1 (for example, the device registration ID ($ID_{22}$)) as registered in the frequency management database 500*b*.

Then, the wireless communication device 100*a* issues a request to the frequency management database 500*a* regarding the registration of the information on the user U1 of the wireless communication device 100*a* to whom the group information specifying the device registration ID ($ID_{22}$) is associated (S307). Thus, based on the information notified from the wireless communication device 100*a* (for example, the certification ID, the serial number, the user ID, and the beam identifier), the frequency management database 500*a* performs the procedure related to the registration of the information on the user U1 of the wireless communication device 100*a*, and issues a device registration ID (S309). The issued device registration ID (in other words, the generated device registration ID) is also referred to as a "device registration ID ($ID_{11}$)" for the purpose of convenience. Moreover, based on the group information obtained from the wireless communication device 100*a*, the frequency management database 500*a* manages the device registration IDs ($ID_{22}$) and ($ID_{11}$) as a group. Then, the frequency management database 500a notifies the wireless communication device 100a about the device registration ID ($ID_{11}$) (S311).

Then, the wireless communication device 100a issues a request to the frequency management database 500a about a request for allocating a frequency band to the user U1 (S313). In that case, based on the previously-obtained group information, the frequency management database 500a allocates the device registration ID ($ID_{11}$) of the user U1 with the same frequency band as the frequency band allocated to the device registration ID ($ID_{22}$) (S315). Subsequently, the frequency management database 500a notifies the wireless communication device 100a about the information on the frequency band allocated to the device registration ID ($ID_{11}$) (S317).

Meanwhile, at the time of allocating a frequency band to a user, the frequency management database 500 can also take into account the user demands about network planning and cell design. Such information related to the user demands can be associated to, for example, the group information of device registration IDs, so that it can be notified to the frequency management database 500.

Examples of the information related to the demands about network planning and cell design include "service area information", "operable frequency information", "transmission power information", and "antenna information". As the service area information, for example, it is possible to cite information such as the aggregation of position information indicating area edges, the center and the radius, the identifier indicating a particular area, and reference information defining area edges (the received power level of the radio waves of the wireless device). As the operable frequency information, for example, it is possible to cite information such as the band frequency, the set of upper limit and lower limit, the set of central frequency/bandwidth, the list of channel numbers, the 3GPP band number, and the IEEE 802.11 channel number. As the transmission power information, for example, it is possible to cite information such as the transmission power desirably having the minimum limit guarantee, the maximum transmission power (device acceptable value, certified value of a public institution), the spectrum mask, the transmission power step size, and the transmission power step value. As the antenna information, for example, it is possible to cite information such as the element count, the orientation, the height, and the beam pattern. Meanwhile, regarding the variety of information mentioned above, not all information needs to be notified at the time of registration in the frequency management database 500. Alternatively, for example, the information can be notified by associating it to some other requests such as a request for allocation of frequency bands.

Meanwhile, of the wireless communication devices 100a and 100b illustrated in the example in FIG. 21, one wireless communication device represents an example of a "first communication device" and the other wireless communication device represents an example of a "second communication device".

Given below is the explanation about the example illustrated in FIG. 22. FIG. 22 is a sequence diagram for explaining another exemplary flow of a series of operations performed in the system according to the second modification example. More particularly, in FIG. 22 is illustrated an exemplary flow of the procedure in the case in which a single user is using the same device (the wireless communication device 100) across a plurality of frequency management databases 500. Moreover, in FIG. 22 is illustrated an exemplary flow of the procedure in the case in which, when the wireless communication device 100a is being used by the user U1, it is allocated with the same frequency band by the frequency management databases 500a and 500b.

For example, as illustrated in FIG. 22, the wireless communication device 100a sends a request to the frequency management database 500b for registration of information of the user U1 who is using the wireless communication device 100a (S341). Thus, based on the information notified from the wireless communication device 100a (for example, the certification ID, the serial number, the user ID, and the beam identifier), the frequency management database 500b performs the procedure related to the registration of the information on the user U1 of the wireless communication device 100a, and issues a device registration ID. The issued device registration ID (in other words, the generated device registration ID) is also referred to as a "device registration ID ($ID_{21}$)" for the purpose of convenience. Then, the frequency management database 500b notifies the wireless communication device 100a about the device registration ID ($ID_{21}$) (S343).

Subsequently, the wireless communication device 100a specifies the device registration ID ($ID_{21}$) corresponding to the user U1 and requests the frequency management database 500b to allocate a frequency band and to set the operation parameters (S345). Upon receiving the request, the frequency management database 500b allocates a frequency band F and a beam $B_1$ to the device registration ID ($ID_{21}$), and notifies the wireless communication device 100a about the information on the frequency band F and the beam $B_1$ (S347).

Then, in between the frequency management databases 500a and 500b, information related to the devices managed therein is exchanged (S349). As a result, the frequency management database 500a becomes able to recognize the information related to the wireless communication device 100a and the user U1 (for example, the device registration ID ($ID_{21}$)) as registered in the frequency management database 500b.

Then, the wireless communication device 100a sends a request to the frequency management database 500a for registering the information which is about the user U1 of the wireless communication device 100a and which has the group information specifying the device registration ID ($ID_{21}$) associated thereto (S351). Thus, based on the information notified from the wireless communication device 100a (for example, the certification ID, the serial number, the user ID, and the beam identifier), the frequency management database 500a performs the procedure related to the registration of the information on the user U1 of the wireless communication device 100a, and issues a device registration ID (S309). The issued device registration ID (in other words, the generated device registration ID) is also referred to as the "device registration ID ($ID_{11}$)" for the purpose of convenience. Moreover, based on the group information obtained from the wireless communication device 100a, the frequency management database 500a manages the device registration IDs ($ID_{21}$) and ($ID_{11}$) as a group. Then, the frequency management database 500a notifies the wireless communication device 100a about the device registration ID ($ID_{11}$) (S355).

Subsequently, the wireless communication device 100a sends a request to the frequency management database 500a for allocating a frequency band to the user U1 and for setting the operation parameters (S357). In that case, based on the previously-obtained group information, the frequency management database 500a allocates, to the device registration ID ($ID_{11}$) corresponding to the user U1, the same frequency band F as the frequency band allocated to the device registration ID ($ID_{21}$). Moreover, the frequency management database 500a allocates, to the device registration ID ($ID_{11}$), a different beam $B_2$ than the beam $B_1$ allocated to the device registration ID ($ID_{21}$) (S359). Then, the frequency management database 500a notifies the wireless communication device 100a about the information related to the frequency band F and the beam $B_2$ allocated to the device registration ID ($ID_{11}$) (S361).

In the example illustrated in FIG. 22, the various requests issued to the frequency management database 500a (for example, a request related to the registration of information, a request related to the allocation of frequency bands and the setting of operation parameters) include, for example, "service area information", "operable frequency information", "transmission power information", "antenna information", and "beam information". As the service area information, for example, it is possible to cite information such as the aggregation of position information indicating area edges, the center and the radius, the identifier indicating a particular area, and reference information defining area edges (the received power level of the radio waves of the wireless device). As the operable frequency information, for example, it is possible to cite information such as the band frequency, the set of upper limit and lower limit, the set of central frequency/bandwidth, the list of channel numbers, the 3GPP band number, and The IEEE 802.11 channel number. As the transmission power information, for example, it is possible to cite information such as the transmission power desirably having the minimum limit guarantee, the maximum transmission power (device acceptable value, certified value of a public institution), the spectrum mask, the transmission power step size, and the transmission power step value. As the antenna information, for example, it is possible to cite information such as the element count, the orientation, the height, and the beam pattern. As the beam information, for example, it is possible to cite information such as analog beam capability, digital beam capability, beam motion range (elevation, horizontal), peak gain value, spatial multiplex maximum count, and pre-coder codebook information. Meanwhile, regarding the variety of information mentioned above, not all information needs to be notified at the time of registration in the frequency management database 500. Alternatively, for example, the information can be notified by associating it to some other requests such as a request for allocation of frequency bands.

In the operation related to frequency allocation or related to deciding on operation parameters, the frequency management database 500a can take into account the beam information, and decide on whether or not to allocate the wireless communication device 100a with the same frequency band as allocated by the frequency management database 500b. As a specific example, based on the device information obtained from the frequency management database 500b (for example, applicable beam information includible in the frequency allocation information), the frequency management database 500a can determine whether or not beams can be allocated in such a way that co-channel interference does not occur with the beams used in the frequency management database 500b. For example, in the example illustrated in FIG. 22, the sequence is given for the case of allocating beams in such a way that co-channel interference does not occur. On the other hand, if it is difficult to allocate beams in such a way that co-channel interference does not occur, the frequency management database 500a can decline the request for allocating the frequency band as received from the wireless communication device 100a, or can recommend allocation of other frequency bands.

Meanwhile, in the example illustrated in FIG. 22, the wireless communication device 100a represents an example of a "third communication device".

Given below is the explanation of the example illustrated in FIG. 23. FIG. 23 is a sequence diagram for explaining another exemplary flow of a series of operations performed in the system according to the second modification example. More particularly, in FIG. 23 is illustrated an exemplary flow of the procedure in the case in which a single user is using the same device (the wireless communication device 100) across a plurality of frequency management databases 500, and the device does not have beam forming capability. Still more particularly, in FIG. 23 is illustrated an exemplary flow of the procedure in the case in which, when the wireless communication device 100 is used by a single user, it is allocated with mutually different frequency bands by the frequency management databases 500a and 500b. In the example illustrated in FIG. 23, the frequency management database 500a operates as the master, and the frequency management database 500b operates as a slave.

As illustrated in FIG. 23, the frequency management databases 500a and 500b exchange the information related to the devices managed therein (for example, exchange the device installation position information), and thus recognize the information related to the devices managed in the other frequency management database (S381).

Then, according to the information related to the devices managed in the frequency management database 500b (for example, according to the installation positions), the frequency management database 500a performs frequency band allocation and interference control with respect to the wireless communication devices 100 managed therein (S383). Then, according to the result of frequency band allocation and interference control, the frequency management database 500a instructs the frequency management database 500b to change the frequency band allocation and change the operation parameters with respect to those wireless communication devices 100 (S385).

According to the instruction from the frequency management database 500a, the frequency management database 500b determines whether or not to allocate frequency bands and to set operation parameters for the wireless communication devices 100. Then, according to the determination result, the frequency management database 500b sends an Ack or an Nack to the frequency management database 500a (S387). Meanwhile, in the case of following the instruction from the frequency management database 500a, the frequency management database 500b allocates frequency bands and sets operation parameters for the wireless communication devices 100 based on that instruction.

The explanation above is given for an example in which the wireless communication device 100 does not have the beam forming capability. On the other hand, even if the wireless communication device 100 has the beam forming capability, in response to a request from the user or the wireless communication device 100, the frequency management database 500 can allocate the wireless communication device 100 with a different frequency band than the frequency band allocated by the other frequency management databases 500, as illustrated in FIG. 23. Moreover, in the example illustrated in FIG. 23, the explanation is given for the case in which the frequency management database 500a operates as the master. Alternatively, as illustrated in the example in FIG. 20, the frequency management databases 500 can individually perform a variety of control based on the device information exchanged among them.

4.4.3. Third Modification Example: Example of Control Using Device Registration IDs Given below is the explanation, as a third modification example, of an example of the control that can be performed using the device registration ID of the wireless communication device 100 after the wireless communication device 100 has notified the device registration ID to other devices, such as the terminal devices 200 and the other wireless communication devices 100.

Figure 24:
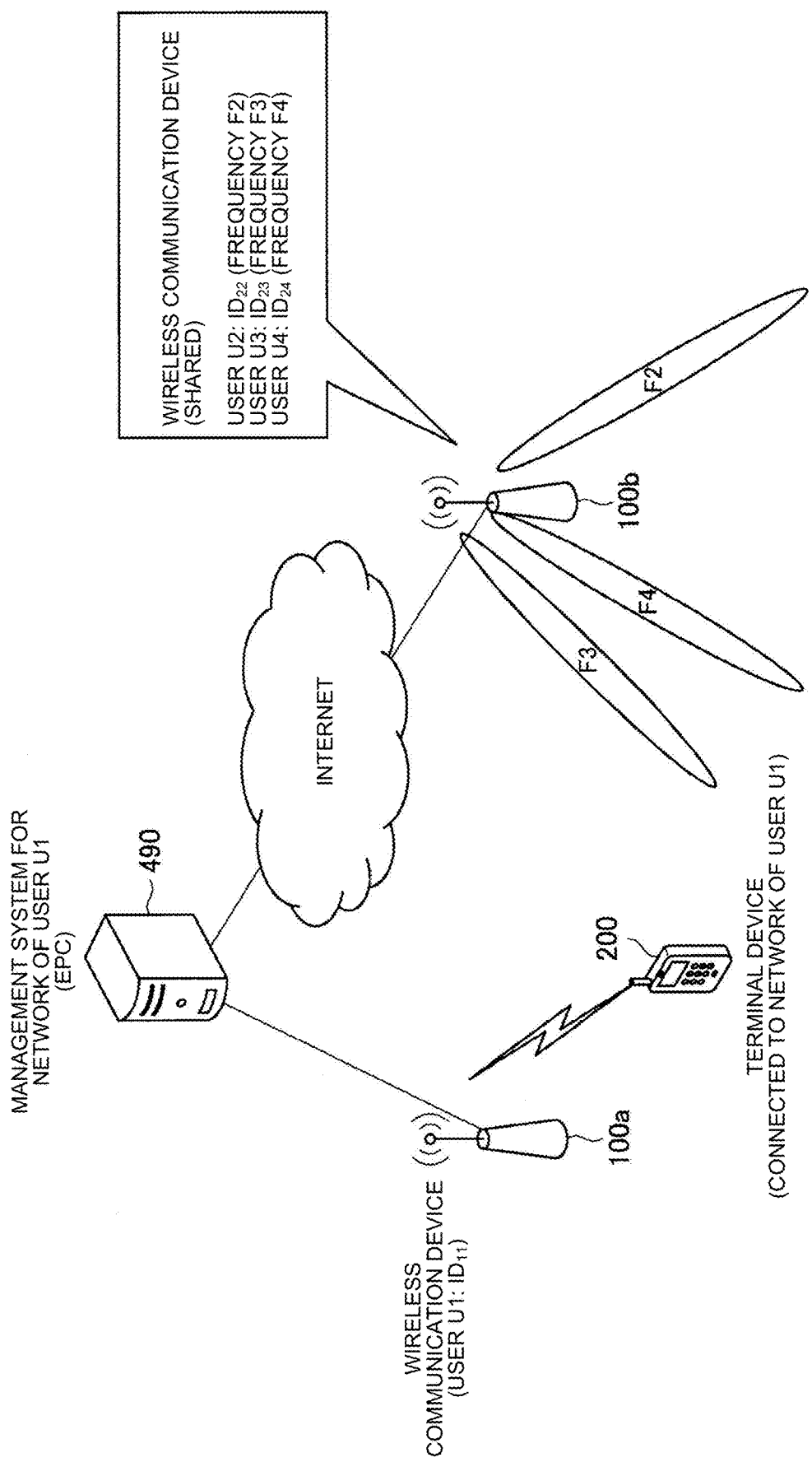
FIG. 24 is an explanatory diagram for explaining about an overview of the system according to a third modification example.

Firstly, explained below with reference to FIG. 24 is a scenario believed to occur in the system according to the third modification example. FIG. 24 is an explanatory diagram for explaining about an overview of the system according to the third modification example.

In the example illustrated in FIG. 24, the terminal device 200 is connected to a network via an access point (hereinafter, assumed to be the "wireless communication device 100a") operated by the user U1. The wireless communication device 100a can be under the management of a management system 490 such as EPC. Moreover, around the terminal device 200, an access point (hereinafter, assumed to be the "wireless communication device 100b") is present that is shared by a plurality of users; and users U2, U3, and U4 have set up service areas of wireless communication with the use of the wireless communication device 100b. Under that premise, for example, it is assumed that the user U1 has established a predetermined partnership, such as a roaming agreement, with at least one of the users U2, U3, and U4.

In the example illustrated in FIG. 24, for example, the wireless communication device 100a can associate, to the group information of device registration IDs, the device registration ID of the user U1 and the device registration IDs of the other users having a partnership with the user U1; and can notify the terminal device 200 about the group information. As a result, the terminal device 200 becomes able to use the device registration IDs associated to the group information and, for example, can establish connection with the networks of the other users having a partnership with the user U1.

As a more specific example, it is possible to think of a case in which the wireless communication device 100b covers, as the service area, such area which is not covered by the network of the user U1. In such a case, the terminal device 200 uses the device registrations IDs associated to the notified group information, and can be expected to be able to smoothly access the wireless communication device 100b. If the terminal device 200 is an information processing terminal such as a smartphone; then, for example, a message can be presented on the screen for prompting establishment of connection with the networks of the other users having a partnership with the user U1, so that the user of the terminal device 200 can be entrusted with the selection of the destination network.

Figure 25:
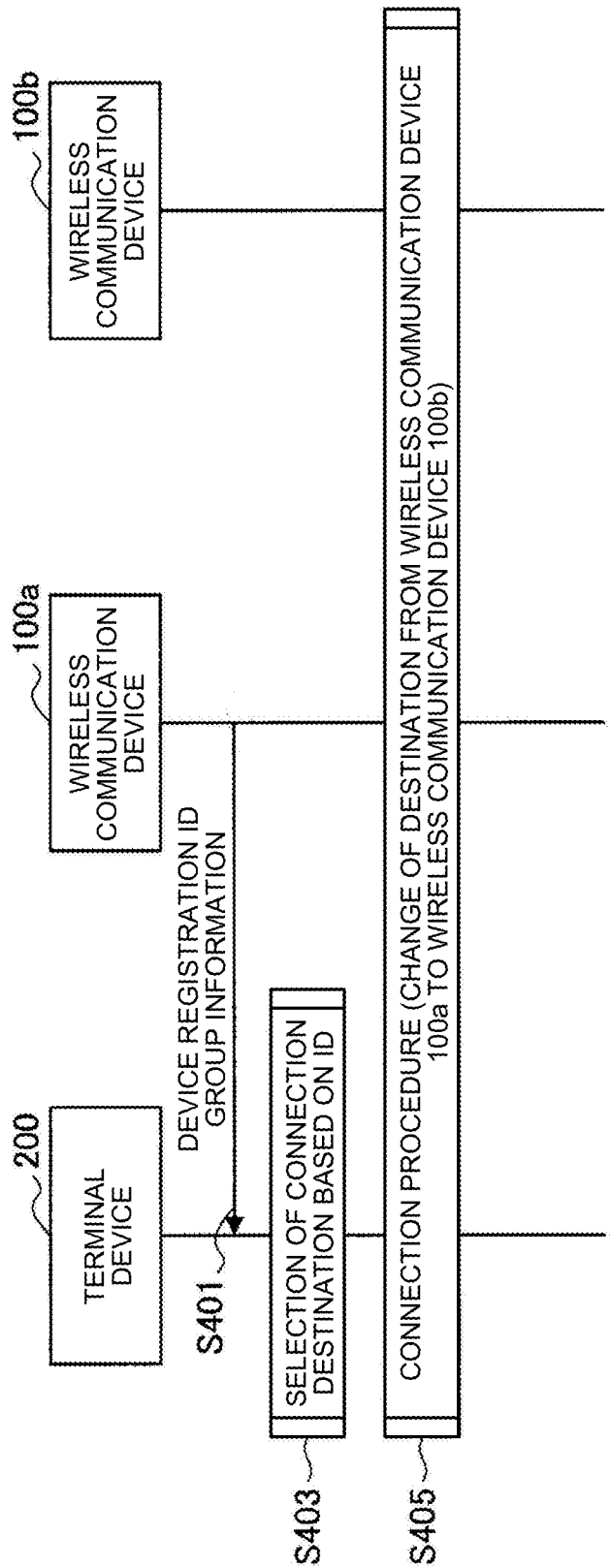
FIG. 25 is a sequence diagram for explaining an exemplary flow of a series of operations performed in the system according to the third modification example.

For example, FIG. 25 is a sequence diagram for explaining an exemplary flow of a series of operations performed in the system according to the third modification example. In FIG. 25 is illustrated an exemplary flow of the procedure related to changing the connection destination of the terminal device 200 using the device registration IDs. In the example illustrated in FIG. 25, in an identical manner to the example explained with reference to FIG. 24, the terminal device 200 that is connected to the wireless communication device 100a changes the connection destination to the wireless communication device 100b based on the group information of device registration IDs as notified from the wireless communication device 100a.

More particularly, as illustrated in FIG. 25, the wireless communication device 100a associates, to the group information of device registration IDs, the device registration IDs of the user U1 and the other users having a partnership with the user U1; and notifies the terminal device 200 about the group information (S401). Based on the device registration IDs associated to the group information that is notified from the wireless communication device 100a, the terminal device 200 selects a network as the new connection destination from among the networks of the other users that have a partnership with the user U1 and that use the wireless communication device 100b (S403). Then, the terminal device 200 uses the device registration ID corresponding to the network representing the new connection destination (i.e., the device registration ID corresponding to the other user who is operating the concerned network), and establishes connection with the wireless communication device 100b (S405). As a result, the terminal device 200 becomes able to change the connection destination from the wireless communication device 100a to the wireless communication device 100b.

In this case, for example, based on the position information of the terminal device 200, the device registration IDs of the users of the wireless communication devices 100 (for example, base stations and access points) positioned around the terminal device 200 can be associated to the group information of the device registration IDs.

Figure 26:
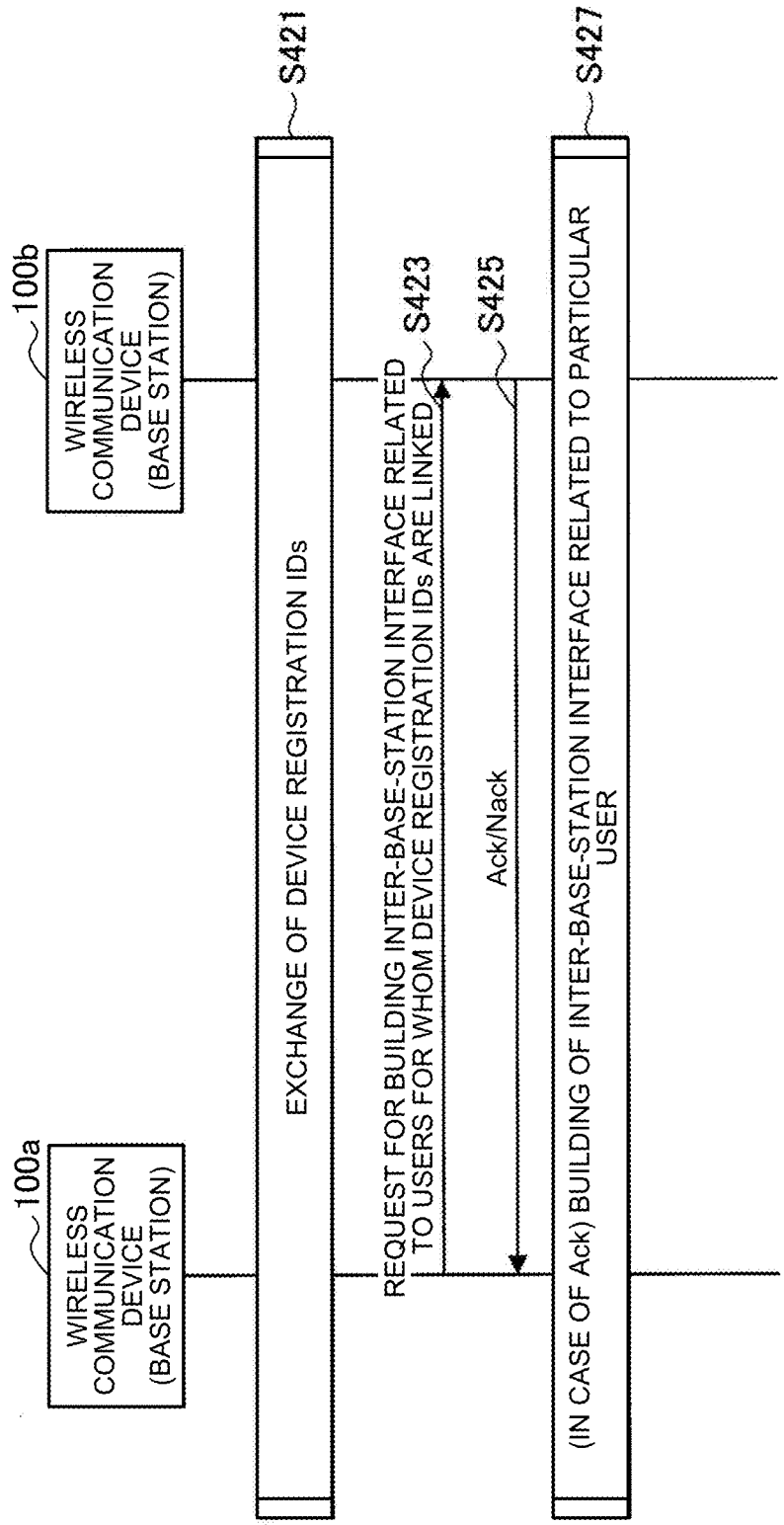
FIG. 26 is a sequence diagram for explaining another exemplary flow of a series of operations performed in the system according to the third modification example.

Explained below with reference to FIG. 26 is an example of the procedure performed in the case in which, as a result of using a device registration ID, an interface among a plurality of wireless communication devices 100 is dynamically formed in regard to the user corresponding to that device registration ID. FIG. 26 is a sequence diagram for explaining another exemplary flow of a series of operations of the system according to the third modification example. In FIG. 26 is illustrated an exemplary flow of the procedure related to the formation of an interface among a plurality of wireless communication devices 100 as a result of using a device registration ID.

For example, in a small cell, based on the SON (Self Organized Network) technology, there are times when self-configuration of operation parameters is performed. It is desirable to have functional enhancement such as expanding the SON technology in frequency sharing, dynamically forming an interface such as the X2 interface among the base stations, and being prepared for the overheads of the terminal device 200.

As a specific example, in the example illustrated in FIG. 26, a scenario is assumed in which a single device such as a single small cell base station is used by a plurality of business operators (i.e., users). Hence, in the example illustrated in FIG. 26, each of a plurality of wireless communication devices 100 (i.e., the wireless communication devices 100a and 100b) is configured as a base station. In such a scenario, for example, it is desirable that the interface among a plurality of base stations (for example, between the wireless communication devices 100a and 100b) is logically separated among a plurality of business operators. In view of such a situation, in the example explained with reference to FIG. 26, the explanation is given for an exemplary mechanism in which, using the device registration IDs, an interface among a plurality of base stations is dynamically formed for each business operator (user).

More particularly, as illustrated in FIG. 26, firstly, the wireless communication devices 100a and 100b exchange the respective device registration IDs (S421). There is no particular restriction on the method for exchanging the device registration IDs between the wireless communication devices 100a and 100b. For example, the wireless communication devices 100a and 100b can exchange the device registration IDs using the inter-base-station interface such as the X2 interface. Meanwhile, the interface used at that time need not be the interface set on a user-by-user basis.

Then, the wireless communication device 100a compares the device registration ID held therein with the device registration ID obtained from the wireless communication device 100b, and associates device registration IDs corresponding to the users who are common between the wireless communication devices 100a and 100b. Subsequently, regarding the common users for whom the device registration IDs are associated between the wireless communication devices 100a and 100b, the wireless communication device 100a requests the wireless communication device 100b to build an inter-base-station interface (S423). Upon receiving the request from the wireless communication device 100a, the wireless communication device 100b determines whether or not to build an inter-base-station interface with the wireless communication device 100a, and replies an Ack or an Nack to the wireless communication device 100a according to the result of determination (S425).

If the wireless communication device 100b sends an Ack to the wireless communication device 100a; then, based on the device registration ID corresponding to the common user, an inter-base-station interface specific to that user gets built in between the wireless communication devices 100a and 100b (S427).

Till now, with reference to FIG. 26, the explanation was given about an example of the procedure performed in the case in which, using the device registration IDs, an interface among a plurality of wireless communication devices 100 is dynamically formed for the users corresponding to the device registration IDs. Meanwhile, the procedure illustrated in FIG. 26 can be performed as part of the network slicing technology.

4.5. Supplementary Information

In the application concerned, the explanation is given using terminology such as the frequency management database, the network manager, the base station, the access point, and the terminal device. However, at the time of implementation, the constituent elements are not limited to these examples.

For example, it is not necessary to limit to the frequency ranges for performing frequency sharing. In that case, the network manager can be equipped with the functions of the frequency management database according to the application concerned. The network manager can be a centralized BBU (Base Band unit) of a network configuration called centralized RAN, or can be a device including a centralized BBU. Alternatively, the base stations and the access points can be equipped with the functions of the network manager according to the application concerned. Moreover, although an example related to the terminal device is also explained, it can alternatively be a base station or an access point requiring wireless backhauling.

Generally, in frequency sharing, the existing system using the target band is sometimes called a primary system, and the secondary user is sometimes called a secondary system. At the time of implementing the technology according to the embodiment of the application concerned, the implementation can be done using different terminology. For example, micro cells in HetNet can be treated as the primary system, and small cells and relay stations can be treated as the secondary system. Alternatively, base stations can be treated as the primary system, and relay UEs and vehicle UEs that implement D2D and V2X within the coverage of the base stations can be treated as the secondary system. Meanwhile, base stations are not limited to the stationary type, and can be of the portable/mobile type.

5. Application Examples

The technology according to the application concerned is applicable in various products. For example, the application server 60, the network manager 400, and the frequency management database 500 can be implemented as some type of servers such as tower servers, rack servers, or blade servers. Alternatively, at least some of the constituent elements of the application server 60, the network manager 400, and the frequency management database 500 can be implemented in a module installed in a server (for example, integrated circuit modules configured using a single die, or a card or a blade to be inserted in a slot of a blade server).

Moreover, for example, the base station 100 can be implemented as any type of eNB (evolved Node B) such as a macro eNB or a small eNB. A small eNB can be an eNB such as a pico eNB, a micro eNB, or a home (femto) eNB that covers smaller cells than macro cells. Alternatively, the base station 100 can be implemented as some other type of base station such as a NodeB or a BTS (Base Transceiver Station). The base station 100 can include a main body (also called a base station device) that controls wireless communication, and one or more RRHs (Remote Radio Heads) that are arranged at different locations than the main body. Alternatively, various types of terminals described later can implement base station functions temporarily or permanently, and can operate as the base station 100.

Meanwhile, for example, each terminal device 200 can be implemented as a mobile device such as a smartphone, a tablet PC (Personal Computer), a note PC, a portable game terminal, a portable-type/dongle-type mobile router, or a digital camera; or can be implemented as an in-vehicle terminal such as a car navigation device. Alternatively, the terminal devices 200 can be implemented as terminals performing M2M (Machine To Machine) communication (also called MTC (Machine Type Communication) terminals) in security cameras, or gateway terminals of various sensor devices, or vehicles such as cars, buses, trains, or airplanes. Still alternatively, at least some constituent elements of the terminal devices 200 can be implemented as modules (for example, integrated circuit modules configured using a single die) installed on such terminals.

5.1. Application Example Related to Server

Figure 27:
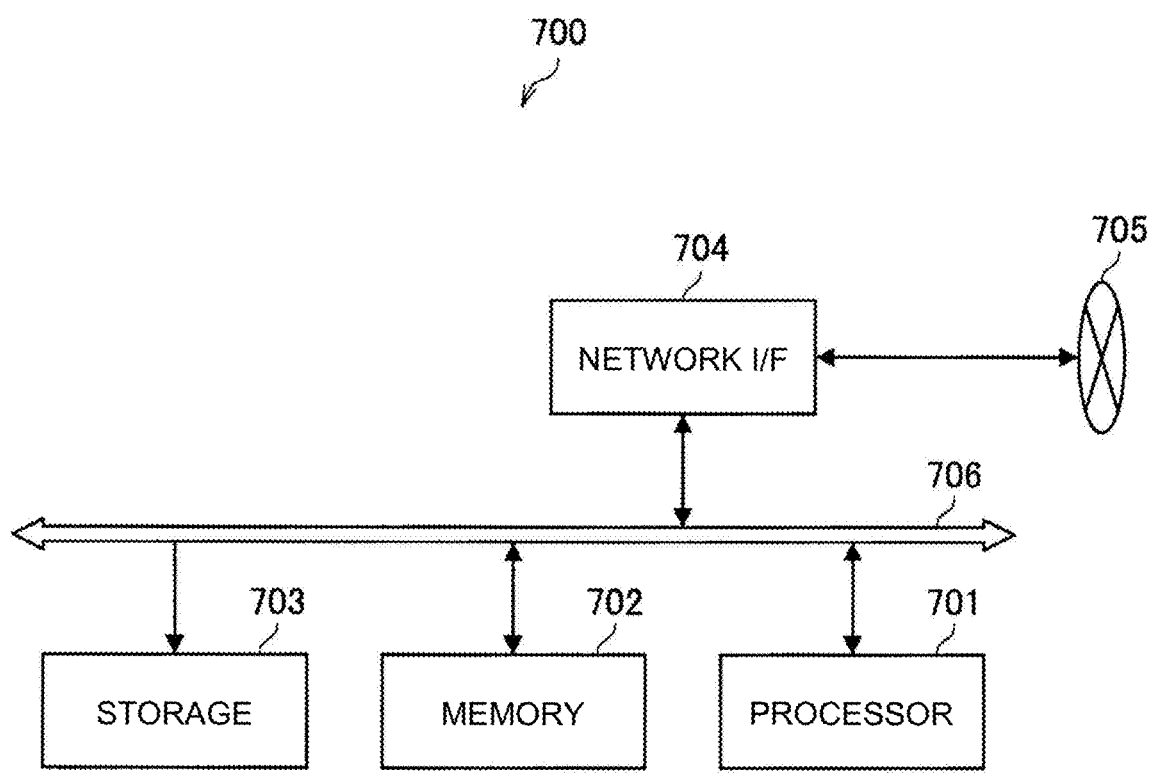
FIG. 27 is a block diagram illustrating an exemplary schematic configuration of a server.

FIG. 27 is a block diagram illustrating an exemplary schematic configuration of a server 700 in which the technology disclosed in the application concerned is applicable. The server 700 includes a processor 701, a memory 702, a storage 703, a network interface 704, and a bus 706.

The processor 701 can be, for example, a CPU (Central Processing Unit) or a DSP (Digital Signal Processor), and controls various functions of the server 700. The memory 702 includes a RAM (Random Access Memory) or a ROM (Read Only Memory), and is used to store programs executed by the processor 701 and to store data. The storage 703 can include a memory medium such as a semiconductor memory or a hard disk.

The network interface 704 is a wired communication interface meant for connecting the server 700 to a wired communication network 705. The wired communication network 705 can be a core network such as the EPC (Evolved Packet Core), or can be a PDN (Packet Data Network) such as the Internet.

The bus 706 connects the processor 701, the memory 702, the storage 703, and the network interface 704 to each other. The bus 706 can include two or more buses having different speeds (for example, a high-speed bus and a low-speed bus).

In the server 700 illustrated in FIG. 27, one or more constituent elements of the network manager 400 explained with reference to FIG. 10 (i.e., the communication control unit 451, the information obtaining unit 453, and/or the notifying unit 455) can be implemented in the processor 701. As an example, a program meant for making a processor function as the abovementioned one or more constituent elements (in other words, a program meant for executing the operations of the abovementioned one or more constituent elements in a processor) can be installed in the server 700, and the processor 701 can execute that program. As another example, the server 700 can have a module including the processor 701 and the memory 702 installed therein, and the abovementioned one or more constituent elements can be implemented in that module. In that case, in the module, a program meant for making a processor function as the abovementioned one or more constituent elements can be stored in the memory 702, and the processor 701 can execute that program. As described above, the server 700 or the module can be provided as the device including the abovementioned one or more constituent elements; or a program meant for making a processor function as the abovementioned one or more constituent elements can be provided. Alternatively, a readable recording medium in which the program is recorded can be provided.

In the server 700 illustrated in FIG. 27, one or more constituent elements of the frequency management database 500 explained with reference to FIG. 9 (i.e., the information obtaining unit 551, the registration processing unit 553, the control unit 555, and/or the notifying unit 557) can be implemented in the processor 701. As an example, a program meant for making a processor function as the abovementioned one or more constituent elements (in other words, a program meant for making a processor perform operations of the abovementioned one or more constituent elements) can be installed in the server 700, and the processor 701 can execute that program. As another example, the server 700 can have a module including the processor 701 and the memory 702 installed therein, and the abovementioned one or more constituent elements can be implemented in that module. In that case, in the module, a program meant for making a processor function as the abovementioned one or more constituent elements can be stored in the memory 702, and the processor 701 can execute that program. As described above, the server 700 or the module can be provided as the device including the abovementioned one or more constituent elements; or a program meant for making a processor function as the abovementioned one or more constituent elements can be provided. Alternatively, a readable recording medium in which the program is recorded can be provided.

5.2. Application Examples Related to Base Station

First Application Example

Figure 28:
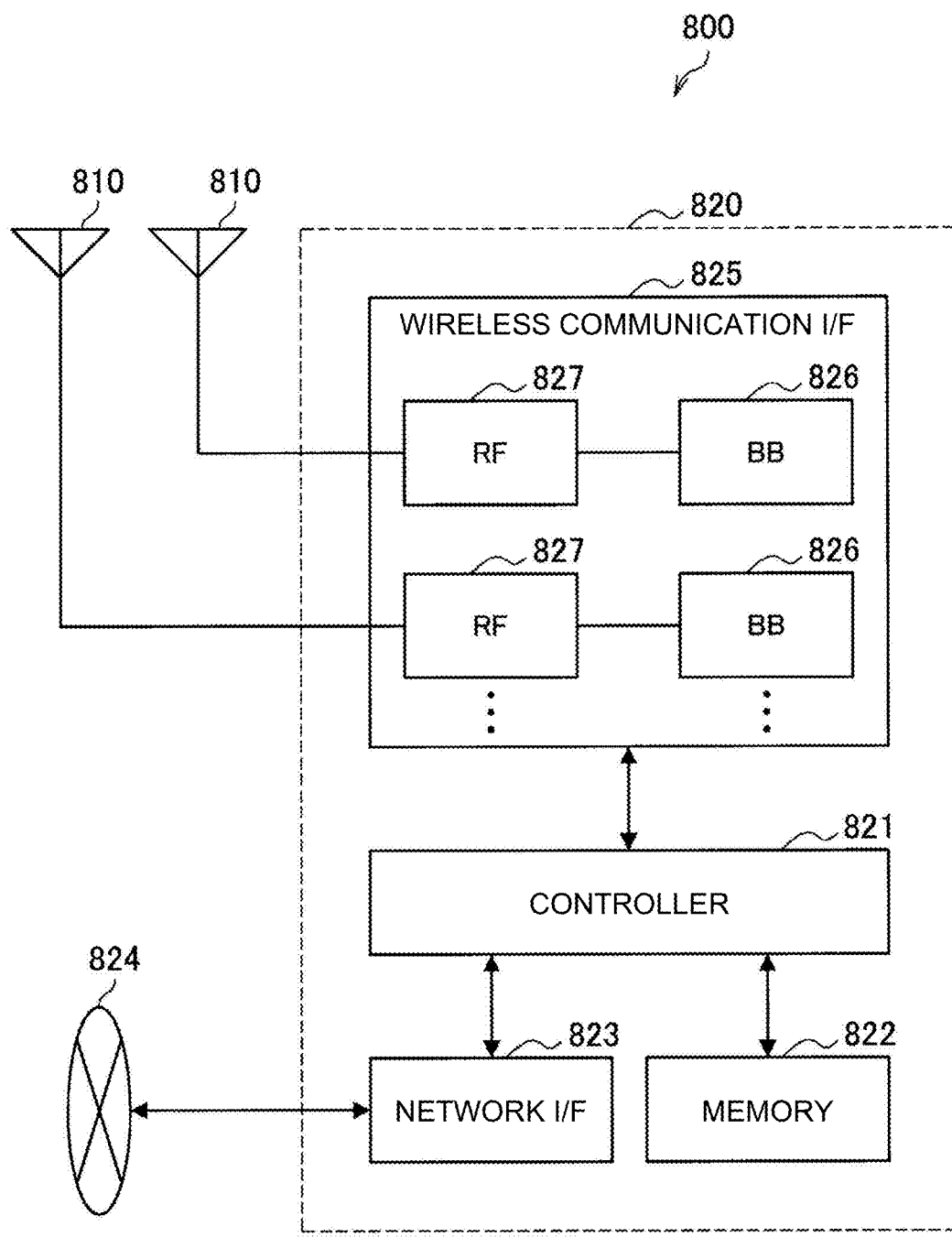
FIG. 28 is a block diagram illustrating a first example of a schematic configuration of an eNB.

FIG. 28 is a block diagram illustrating a first example of a schematic configuration of the eNB in which the technology disclosed in the application concerned is applicable. An eNB 800 includes one or more antennas 810 and a base station device 820. The antennas 810 can be connected to the base station device 820 by RF cables.

Each antenna 810 includes one or more antenna elements (for example, a plurality of antenna elements constituting a MIMO antenna), and is used by the base station device 820 in transmitting and receiving radio signals. The eNB 800 includes a plurality of antennas 810 as illustrated in FIG. 28, and each antenna 810 corresponds to, for example, one of a plurality of frequency bands used by the eNB 800. Meanwhile, in the example illustrated in FIG. 28, although the eNB 800 includes a plurality of antennas 810, it can alternatively include only a single antenna 810.

The base station device 820 includes a controller 821, a memory 822, a network interface 823, and a wireless communication interface 825.

The controller 821 can be, for example, a CPU or a DSP, and implements various functions of the upper layer of the base station device 820. For example, the controller 821 generates data packets from the data present in the signals processed by the wireless communication interface 825, and transfers the generated data packets via the network interface 823. Moreover, the controller 821 can generate bundled packets by bundling the data received from a plurality of baseband processors, and transfer the bundled packets. Furthermore, the controller 821 can have logical functions for performing control such as radio resource control, radio bearer control, mobility management, admission control, and scheduling. That control can be performed in coordination with the surrounding eNBs or core network nodes. The memory 822 includes a RAM and a ROM, and is used to store programs executed by the controller 821 and to store a variety of control data (such as a terminal list, transmission power data, and scheduling data).

The network interface 823 is a communication interface for connecting the base station device 820 to a core network 824. The controller 821 can communicate with core network nodes and the other eNBs via the network interface 823. In that case, the eNB 800 can be connected to the core network nodes and the other eNBs by a logical interface (such as the S1 interface or the X2 interface). The network interface 823 can be a wired communication interface, or can be a wireless communication interface for wireless backhauling. When the network interface 823 is a wireless communication interface, it can perform wireless communication using higher frequency bands than the frequency bands used by the wireless communication interface 825.

The wireless communication interface 825 supports any one cellular communication method such as the LTE (Long Term Evolution) or the LTE-Advanced, and provides wireless connection via the antennas 810 to the terminals located inside the cell of the eNB 800. Typically, the wireless communication interface 825 can include a baseband (BB) processor 826 and an RF circuit 827. The BB processor 826 can perform, for example, encoding/decoding, modulation/demodulation, and multiplexing/inverse multiplexing; and performs a variety of signal processing for each layer (for example, L1, MAC (Medium Access Control), RLC (Radio Link Control), and PDCP (Packet Data Convergence Protocol)). The BB processor 826 can include, in place of the controller 821, some or all of the logical functions mentioned earlier. The BB processor 826 can be a module including a memory for storing a communication control program, a processor for executing that program, and related circuits; and the functions of the BB processor 826 can be changed by updating the communication control program. Alternatively, the module can be a card or a blade that is inserted in a slot of the base station device 820, or can be a chip installed on the card or the blade. The RF circuit 827 can include a mixer, a filter, and an amplifier; and transmits and receives radio signals via the antennas 810.

The wireless communication interface 825 includes a plurality of BB processors 826 as illustrated in FIG. 28, and each BB processor 826 can correspond to, for example, one of a plurality of frequency bands used by the eNB 800. Moreover, the wireless communication interface 825 includes a plurality of RF circuits 827 as illustrated in FIG. 28, and each RF circuit 827 can correspond to, for example, one of a plurality of antenna elements. In FIG. 28 is illustrated the example in which the wireless communication interface 825 includes a plurality of BB processors 826 and a plurality of RF circuits 827. However, alternatively, the wireless communication interface 825 can include only a single BB processor 826 or only a single RF circuit 827.

In the eNB 800 illustrated in FIG. 28, one or more constituent elements of the processing unit 150 explained with reference to FIG. 2 (i.e., at least one of the communication control unit 151, the information obtaining unit 153, and the notifying unit 155) can be implemented in the wireless communication interface 825. Alternatively, at least some of the constituent elements can be installed in the controller 821. As an example, in the eNB 800, a module including either some part of the wireless communication interface 825 (for example, the BB processor 826) or the entire wireless communication interface 825 and/or the controller 821 can be installed, and the abovementioned one or more constituent elements can be implemented in that module. In that case, the module can store therein a program meant for making a processor function as the abovementioned one or more constituent elements (in other words, a program meant for executing the operations of the abovementioned one or more constituent elements in a processor), and can execute that program. As another example, the program meant for making a processor function as the abovementioned one or more constituent elements can be installed in the eNB 800, and the wireless communication interface 825 (for example, the BB processor 826) and/or the controller 821 can execute that program. As described above, the eNB 800, or the base station device 820, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 800 illustrated in FIG. 28, the wireless communication unit 120 that is explained with reference to FIG. 2 can be implemented in the wireless communication interface 825 (for example, the RF circuit 827). Furthermore, the antenna unit 110 can be implemented in the antenna 810. Moreover, the network communication unit 130 can be implemented in the controller 821 and/or the network interface 823. Furthermore, the memory unit 140 can be implemented in the memory 822.

Second Application Example

Figure 29:
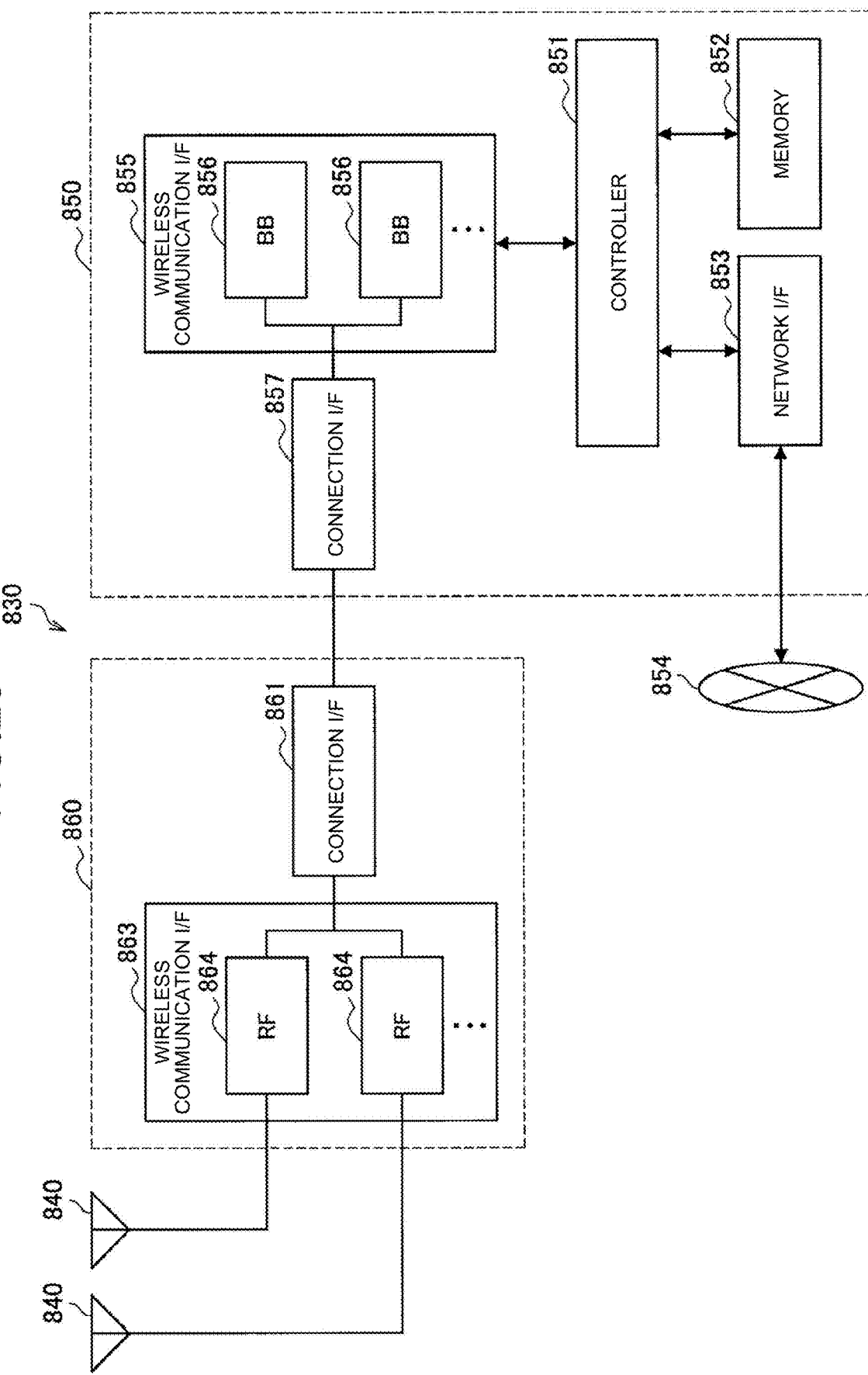
FIG. 29 is a block diagram illustrating a second example of a schematic configuration of an eNB.

FIG. 29 is a block diagram illustrating a second example of a schematic configuration of the eNB in which the technology disclosed in the application concerned is applicable. An eNB 830 includes one or more antennas 840, a base station device 850, and an RRH 860. Each antenna 840 is connected to the RRH 860 by an RF cable. Moreover, the base station device 850 and the RRH 860 can be connected to each other by a high-speed line such as an optical fiber cable.

Each antenna 840 includes one or more antenna elements (for example, a plurality of antenna elements constituting a MIMO antenna), and is used by the RRH 860 in transmitting and receiving radio signals. The eNB 830 includes a plurality of antennas 840 as illustrated in FIG. 29, and each antenna 840 corresponds to, for example, one of a plurality of frequency bands used by the eNB 830. Meanwhile, in the example illustrated in FIG. 29, although the eNB 830 includes a plurality of antennas 840, it can alternatively include only a single antenna 840.

The base station device 850 includes a controller 851, a memory 852, a network interface 853, a wireless communication interface 855, and a connection interface 857. The controller 851, the memory 852, and the network interface 853 are identical to the controller 821, the memory 822, and the network interface 823, respectively, explained with reference to FIG. 28.

The wireless communication interface 855 supports any one cellular communication method such as the LTE or the LTE-Advanced, and provides wireless connection via the RRH 860 and the antennas 840 to the terminals located inside the sector corresponding to the RRH 860. Typically, the wireless communication interface 855 can include a BB processor 856. The BB processor 856 is identical to the BB processor 826 explained with reference to FIG. 28, except for the fact that the BB processor 856 is connected to an RF circuit 864 of the RRH 860 via the connection interface 857. The wireless communication interface 855 includes a plurality of BB processors 856 as illustrated in FIG. 29, and each BB processor 856 can correspond to, for example, one of a plurality of frequency bands used by the eNB 830. Meanwhile, in the example illustrated in FIG. 29, although the wireless communication interface 855 includes a plurality of BB processors 856, it can alternatively include only a single BB processor 856.

The connection interface 857 is meant for connecting the base station device 850 (the wireless communication interface 855) to the RRH 860. The connection interface 857 can be a communication module for enabling communication in the abovementioned high-speed line connecting the base station device 850 (the wireless communication interface 855) and the RRH 860.

The RRH 860 includes a connection interface 861 and a wireless communication interface 863.

The connection interface 861 is an interface for connecting the RRH 860 (the wireless communication interface 863) to the base station device 850. The connection interface 861 can be a communication module enabling communication in the high-speed line.

The wireless communication interface 863 transmits and receives radio signals via the antenna 840. Typically, the wireless communication interface 863 can include the RF circuit 864. The RF circuit 864 can include a mixer, a filter, and an amplifier; and transmits and receives radio signals via the antennas 840. The wireless communication interface 863 includes a plurality of RF circuits 864 as illustrated in FIG. 29, and each RF circuit 864 can correspond to, for example, one of a plurality of antenna elements. Meanwhile, in the example illustrated in FIG. 29, although the wireless communication interface 863 includes a plurality of RF circuits 864, it can alternatively include only a single RF circuit 864.

In the eNB 830 illustrated in FIG. 29, one or more constituent elements included in the processing unit 150 explained with reference to FIG. 2 (i.e., at least one of the communication control unit 151, the information obtaining unit 153, and the notifying unit 155) can be implemented in the wireless communication interface 855 and/or the wireless communication interface 863. Alternatively, at least some of the constituent elements can be installed in the controller 851. As an example, in the eNB 830, a module including either some part of the wireless communication interface 855 (for example, the BB processor 856) or the entire wireless communication interface 855 and/or the controller 851 can be installed, and the abovementioned one or more constituent elements can be implemented in that module. In that case, the module can store therein a program meant for making a processor function as the abovementioned one or more constituent elements (in other words, a program meant for executing the operations of the abovementioned one or more constituent elements in a processor), and can execute that program. As another example, the program meant for making a processor function as the abovementioned one or more constituent elements can be installed in the eNB 830, and the wireless communication interface 855 (for example, the BB processor 856) and/or the controller 851 can execute that program. As described above, the eNB 830, the base station device 850, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 830 illustrated in FIG. 29, the wireless communication unit 120 that is explained with reference to FIG. 2 can be implemented in the wireless communication interface 863 (for example, the RF circuit 864). Furthermore, the antenna unit 110 can be implemented in the antenna 840. Moreover, the network communication unit 130 can be implemented in the controller 851 and/or the network interface 853. Furthermore, the memory unit 140 can be implemented in the memory 852.

5.3. Application Examples Related to Terminal Device

First Application Example

Figure 30:
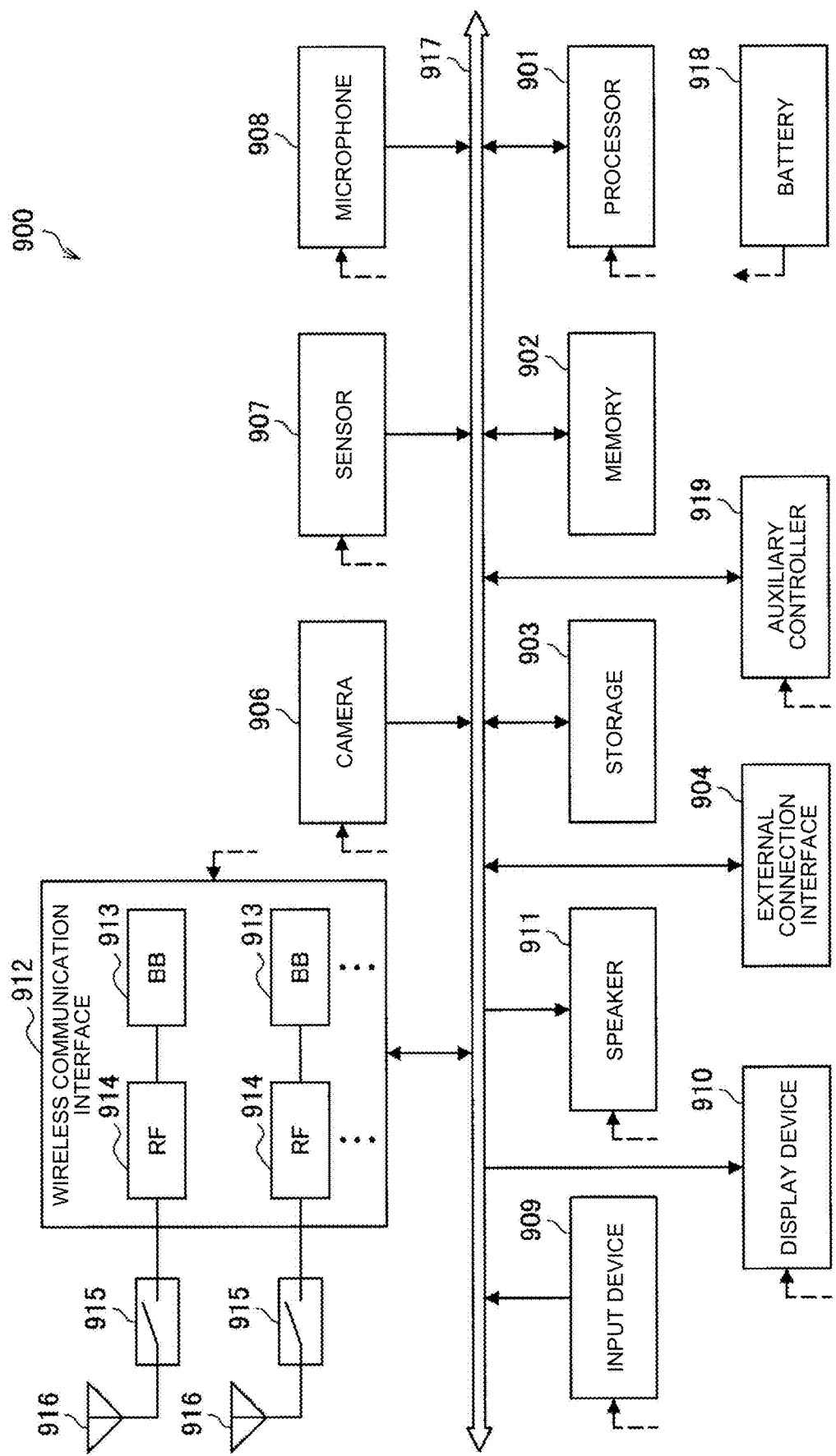
FIG. 30 is a block diagram illustrating an example of a schematic configuration of a smartphone.

FIG. 30 is a block diagram illustrating an example of a schematic configuration of a smartphone 900 in which the technology disclosed in the application concerned is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 can be, for example, a CPU or an SoC (System on Chip), and controls the functions of the application layer and the other layers of the smartphone 900. The memory 902 includes a RAM and a ROM, and is used to store the programs executed by the processor 901 and to store data. The storage 903 can include a memory medium such as a semiconductor memory or a hard disk. The external connection interface 904 is an interface for connecting an external device, such as a memory card or a USB (Universal Serial Bus) device, to the smartphone 900.

The camera 906 includes an imaging device such as a CCD (Charge Coupled Device) or a CMOS (Complementary Metal Oxide Semiconductor), and generates captured images. The sensor 907 can include a group of sensors such as a positioning sensor, a gyro sensor, a geomagnetic sensor, and an acceleration sensor. The microphone 908 converts the sound input to the smartphone 900 into sound signals. The input device 909 includes, for example, a touch sensor for detecting a touch on the screen of the display device 910, or a keypad, or a keyboard, or buttons or switches; and receives operations and information input from the user. The display device 910 has a screen such as a liquid crystal display (LCD) or an organic light emitting diode (OLED) display, and displays output images of the smartphone 900. The speaker 911 converts the sound signals, which are output from the smartphone 900, into sound.

The wireless communication interface 912 supports any one cellular communication method such as the LTE or the LTE-Advanced, and implements wireless communication. Typically, the wireless communication interface 912 can include a BB processor 913 and an RF circuit 914. The BB processor 913 can perform, for example, encoding/decoding, modulation/demodulation, and multiplexing/inverse multiplexing; and performs a variety of signal processing for wireless communication. The RF circuit 914 can include a mixer, a filter, and an amplifier; and transmits and receives radio signals via the antennas 916. Meanwhile, the wireless communication interface 912 can be a one-chip module in which the BB processor 913 and the RF circuit 914 are integrated. Moreover, the wireless communication interface 912 can include a plurality of BB processors 913 and a plurality of RF circuits 914 as illustrated in FIG. 30. Meanwhile, in the example illustrated in FIG. 30, although the wireless communication interface 912 includes a plurality of BB processors 913 and a plurality of RF circuits 914, it can alternatively include only a single BB processor 913 or only a single RF circuit 914.

Moreover, in addition to supporting the cellular communication method, the wireless communication interface 912 can also support other types of wireless communication methods such as the near field communication method, the proximity wireless communication method, and the wireless LAN (Local Area Network) method. In that case, the wireless communication interface 912 can include the BB processors 913 and the RF circuits 914 separately for each wireless communication method.

Each antenna switch 915 switches the connection destinations of the antennas 916 among a plurality of circuits included in the wireless communication interface 912 (for example, the circuits meant for different wireless communication methods).

Each antenna 916 includes one or more antenna elements (for example, a plurality of antenna elements constituting a MIMO antenna), and is used by the wireless communication interface 912 in transmitting and receiving radio signals. The smartphone 900 can include a plurality of antennas 916 as illustrated in FIG. 30. Meanwhile, in the example illustrated in FIG. 30, although the smartphone 900 includes a plurality of antennas 916, it can alternatively include only a single antenna 916.

Moreover, the smartphone 900 can include the antennas 916 separately for each wireless communication method. In that case, the antenna switch 915 can be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electrical power to each block of the smartphone 900, which is illustrated in FIG. 30, via a power supply line that is partially illustrated in FIG. 30 using dashed lines. The auxiliary controller 919 implements the minimum required functions of the smartphone 900 in, for example, the sleep mode.

In the smartphone 900 illustrated in FIG. 30, one or more constituent elements included in the processing unit 240 explained with reference to FIG. 3 (i.e., at least one of the communication control unit 241, the information obtaining unit 243, the measuring unit, and the notifying unit 247) can be implemented in the wireless communication interface 912. Alternatively, at least some of the constituent elements can be installed in the processor 901 or the auxiliary controller 919. As an example, in the smartphone 900, a module including either some part of the wireless communication interface 912 (for example, the BB processor 913) or the entire wireless communication interface 912, the processor 901, and/or the auxiliary controller 919 can be installed; and the abovementioned one or more constituent elements can be implemented in that module. In that case, the module can store therein a program meant for making a processor function as the abovementioned one or more constituent elements (in other words, a program meant for executing the operations of the abovementioned one or more constituent elements in a processor), and can execute that program. As another example, the program meant for making a processor function as the abovementioned one or more constituent elements can be installed in the smartphone 900; and the wireless communication interface 912 (for example, the BB processor 913), the processor 901, and/or the auxiliary controller 919 can execute that program. As described above, the smartphone 900 or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the smartphone 900 illustrated in FIG. 30, the wireless communication unit 220 that is explained with reference to FIG. 3 can be implemented in the wireless communication interface 912 (for example, the RF circuit 914). Furthermore, the antenna unit 210 can be implemented in the antenna 916. Moreover, the memory unit 230 can be implemented in the memory 902.

Second Application Example

FIG. 31 is a block diagram illustrating an example of a schematic configuration of a car navigation device 920 in which the technology disclosed in the application concerned is applicable. The car navigation device 920 includes a processor 921, a memory 922, a GPS (Global Positioning System) module 924, a sensor 925, a data interface 926, a content player 927, a memory medium interface 928, an input device 929, a display device 930, a speaker 931, a wireless communication interface 933, one or more antenna switches 936, one or more antennas 937, and a battery 938.

The processor 921 can be, for example, a CPU or an SoC, and controls the navigation function and the other functions of the car navigation device 920. The memory 922 includes a RAM and a ROM, and is used to store the programs executed by the processor 921 and to store data.

The GPS module 924 uses GPS signals received from GPS satellites, and measures the location (for example, the latitude, the longitude, and the altitude) of the car navigation device 920. The sensor 925 can include a group of sensors such as a gyro sensor, a geomagnetic sensor, and a pressure sensor. The data interface 926 is connected to, for example, an in-vehicle network 941 via a terminal (not illustrated), and obtains data such as vehicle speed data generated in the vehicle.

The content player 927 reproduces the contents stored in a memory medium (such as a CD or a DVD) that is inserted in the memory medium interface 928. The input device 929 includes a touch sensor for detecting a touch on the screen of the display device 930, or includes buttons, or includes switches; and receives operations and information input from the user. The display device 930 has a screen such as an LCD or an OLED display, and displays the navigation functions or images of the reproduced contents. The speaker 931 outputs the sounds of the navigation functions or the sounds of the reproduced contents.

The wireless communication interface 933 supports any one cellular communication method such as the LTE or the LTE-Advanced, and implements wireless communication. Typically, the wireless communication interface 933 can include a BB processor 934 and an RF circuit 935. The BB processor 934 can perform, for example, encoding/decoding, modulation/demodulation, and multiplexing/inverse multiplexing; and performs a variety of signal processing for wireless communication. The RF circuit 935 can include a mixer, a filter, and an amplifier; and transmits and receives radio signals via the antennas 937. Meanwhile, the wireless communication interface 933 can be a one-chip module in which the BB processor 934 and the RF circuit 935 are integrated. Moreover, the wireless communication interface 933 can include a plurality of BB processors 934 and a plurality of RF circuits 935 as illustrated in FIG. 31. Meanwhile, in the example illustrated in FIG. 31, although the wireless communication interface 933 includes a plurality of BB processors 934 and a plurality of RF circuits 935, it can alternatively include only a single BB processor 934 or only a single RF circuit 935.

Moreover, in addition to supporting the cellular communication method, the wireless communication interface 933 can also support other types of wireless communication methods such as the near field communication method, the proximity wireless communication method, and the wireless LAN method. In that case, the wireless communication interface 933 can include the BB processors 934 and the RF circuits 935 separately for each wireless communication method.

Each antenna switch 936 switches the connection destinations of the antennas 937 among a plurality of circuits included in the wireless communication interface 933 (for example, the circuits meant for different wireless communication methods).

Each antenna 937 includes one or more antenna elements (for example, a plurality of antenna elements constituting a MIMO antenna), and is used by the wireless communication interface 933 in transmitting and receiving radio signals. The car navigation device 920 can include a plurality of antennas 937 as illustrated in FIG. 31. Meanwhile, in the example illustrated in FIG. 31, although the car navigation device 920 includes a plurality of antennas 937, it can alternatively include only a single antenna 937.

Moreover, the car navigation device 920 can include the antennas 937 separately for each wireless communication method. In that case, the antenna switch 936 can be omitted from the configuration of the car navigation device 920.

The battery 938 supplies electrical power to each block of the car navigation device 920, which is illustrated in FIG. 31, via a power supply line that is partially illustrated in FIG. 31 using dashed lines. Moreover, the battery 938 stores the electrical power supplied from the vehicle.

In the car navigation device 920 illustrated in FIG. 31, one or more constituent elements included in the processing unit 240 explained with reference to FIG. 3 (i.e., at least one of the communication control unit 241, the information obtaining unit 243, the measuring unit 245, and the notifying unit 247) can be implemented in the wireless communication interface 933. Alternatively, at least some of the constituent elements can be installed in the processor 921. As an example, in the car navigation device 920, a module including either some part of the wireless communication interface 933 (for example, the BB processor 934) or the entire wireless communication interface 933 and/or the processor 921 can be installed; and the abovementioned one or more constituent elements can be implemented in that module. In that case, the module can store therein a program meant for making a processor function as the abovementioned one or more constituent elements (in other words, a program meant for executing the operations of the abovementioned one or more constituent elements in a processor), and can execute that program. As another example, the program meant for making a processor function as the abovementioned one or more constituent elements can be installed in the car navigation device 920; and the wireless communication interface 933 (for example, the BB processor 934) and/or the processor 921 can execute that program. As described above, the car navigation device 920 or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the car navigation device 920 illustrated in FIG. 31, the wireless communication unit 220 that is explained with reference to FIG. 3 can be implemented in the wireless communication interface 933 (for example, the RF circuit 935). Furthermore, the antenna unit 210 can be implemented in the antenna 937. Moreover, the memory unit 230 can be implemented in the memory 922.

Meanwhile, the technology disclosed in the application concerned can be implemented as an in-vehicle system (or a vehicle) 940 that includes one or more blocks of the car navigation device 920; the in-vehicle network 941; and a vehicle-side module 942. That is, the in-vehicle system (or the vehicle) 940 can be provided as a device including at least one of the communication control unit 241, the information obtaining unit 243, the measuring unit 245, and the notifying unit 247. The vehicle-side module 942 generates vehicle data such as the vehicle speed, the engine rotation count, and breakdown information; and outputs the generated data to the in-vehicle network 941.

6. Summary

As explained above, in the system according to the embodiment of the application concerned, a management device (for example, the frequency management database 500) obtains, from a communication control device (for example, the wireless communication device 100 or the network manager 400), first-type identification information that is specific to each wireless communication device and second-type identification information that is specific to the user who is the target for allocation of a frequency band which is available for secondary use in the wireless communication. Moreover, the management device generates third-type identification information (for example, device registration ID) specific to the combination of the first-type identification information and the second-type identification information meant for allocating a frequency band to at least either the wireless communication device or the user. Then, the management device notifies the communication control device about the third-type identification information. Based on the third-type identification information obtained from the management device, the communication control device controls the setting related to wireless communication between the wireless communication device corresponding to the third-type identification information and one or more terminal devices.

With such a configuration, in the system according to the embodiment of the application concerned, the allocation of the frequency bands can be controlled in the units of users of wireless communication devices. As a result, for example, in a situation in which a wireless communication device is shared by a plurality of users; even if the information related to the frequency bands in use needs to be updated for only some of the users, destruction and disabling of the information accompanying the updating can be limited only to those users. That is in the system according to the present embodiment, RAN sharing as well as frequency sharing can be achieved in a more preferred from (for example, in a more user-friendly manner), and network resources can be used with more flexibility.

Although the application concerned is described above in detail in the form of an embodiment with reference to the accompanying drawings; the technical scope of the application concerned is not limited to the embodiment described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

A management device comprising:

an obtaining unit that obtains, from a communication control device, first-type identification information which is specific to each communication device that performs wireless communication with one or more terminal devices, and second-type identification information which is specific to user who is target for allocation of frequency band that is available for secondary use in the wireless communication;

a generating unit that generates third-type identification information which is specific to combination of the obtained first-type identification information and the obtained second-type identification information and which is meant for allocating the frequency band to at least either the communication device or the user; and a notifying unit that notifies the communication control device about the generated third-type identification information.

(2)

The management device according to (1), further comprising a control unit that, in response to a request from the communication control device, controls, based on the third-type identification information, setting related to the wireless communication between the communication device, which used the frequency band available for secondary use, and the one or more of terminal devices.

(3)

The management device according to (2), wherein the control unit controls allocation of the frequency band, which is available for secondary use, in units of the third-type identification information.

(4)

The management device according to (3), wherein the control unit controls change in allocation of the frequency band, which is available for secondary use, in units of the third-type identification information.

(5)

The management device according to any one of (2) to (4), wherein, based on the third-type identification information, the control unit allocates, to each of a plurality of the user of the communication device, mutually different frequency bands from among the frequency bands available for secondary use.

(6)

The management device according to any one of (2) to (5), wherein, when the communication device is able to use a plurality of beams in the wireless communication with the terminal devices, the generating unit generates the third-type identification information which is specific to combination of the first-type identification information, the second-type identification information, and fourth-type identification information that is specific to each of the plurality of beams.

(7)

The management device according to (6), wherein, based on the third-type identification information, the control unit allocates, to each of a plurality of the user of the communication device, mutually different beams from among the plurality of beams.

(8)

The management device according to any one of (2) to (7), wherein the obtaining unit obtains, from the communication control device, group information having a plurality of sets of identification information, from among at least either the first-type identification information or the second-type identification information, associated thereto, and based on the group information, the control unit controls setting related to the wireless communication between the communication device, which used the frequency band available for secondary use, and the one or more terminal devices.

(9)

The management device according to (8), wherein the group information has the second-type identification information, which corresponds to each of a plurality of the user sharing the communication device, associated thereto.

(10)

The management device according to (8), wherein the group information has the first-type identification information, which corresponds to each of a plurality of the communication device used by one or more of the user, associated thereto.

(11)

The management device according to any one of (2) to (10), wherein the obtaining unit obtains, from other management device, information related to communication device managed by the other management device, and based on information related to communication device managed by the other management device as obtained from the other management device, the control unit controls setting related to the wireless communication between the communication device being managed and the one or more terminal devices.

(12)

The management device according to (11), wherein the obtaining unit obtains, as information related to communication device managed by the other management device, information related to a second communication device that is different than a first communication device which is used by the user corresponding to the third-type identification information and which corresponds to the third-type identification information, and based on information related to the second communication device as obtained from the other management device, the control unit controls setting related to the wireless communication between the first communication device and the one or more terminal devices.

(13)

The management device according to (12), wherein the control unit controls the frequency band, which is to be allocated to the user of the first communication device, according to the frequency band that has been allocated to the user by the other management device for purpose of using the second communication device under management of the other management device.

(14)

The management device according to (11), wherein the obtaining unit obtains, as information related to the communication device managed by the other management device, information related to a third communication device being managed, and based on information related to the third communication device as obtained from the other management device, the control unit controls setting related to the wireless communication between the third communication and the one or more terminal devices.

(15)

The management device according to (14), wherein the control unit controls the frequency band, which is to be allocated to the user of the third communication device, according to the frequency band that has been allocated to the user by the other management device for purpose of using the third communication device under management of the other management device.

(16)

The management device according to any one of (11) to (15), wherein the notifying unit notifies the other management device about information related to the communication device being managed.

(17)

The management device according to any one of (11) to (16), wherein information related to the communication device contains at least one of information related to service area of the communication device, information related to frequency band usable by the communication device, information related to transmission power of the communication device, information related to antenna usable by the communication device, and information related to beam usable in the wireless communication by the communication device.

(18)

The management device according to any one of (11) to (17), wherein the first-type identification information contains identification information specific to predetermined certification authority.

(19)

A communication control device comprising:

a notifying unit that notifies a management device about first-type identification information which is specific to each communication device that performs wireless communication with one or more terminal devices, and second-type identification information which is specific to user who is target for allocation of frequency band that is available for secondary use in the wireless communication;

an obtaining unit that obtains, from the management device, third-type identification information which is specific to combination of the first-type identification information and the second-type identification information and which is meant for allocating the frequency band to at least either the communication device or the user; and a control unit that, based on the obtained third-type identification information, controls setting related to the wireless communication between the communication device corresponding to the third-type identification information and the one or more of terminal devices.

(20)

The communication control device according to (19), wherein based on the obtained third-type identification information, the notifying unit notifies the management device about a request related to allocation of the frequency band for enabling the user corresponding to the third-type identification information to use the communication device corresponding to the third-type identification information, and according to the frequency band allocated from the management device, the control unit controls setting related to the wireless communication between the communication device and the one or more terminal devices.

(21)

The communication control device according to (19) or (20), wherein the notifying unit notifies the management device about fourth-type identification information that is specific to each of a plurality of beams usable by the communication device in the wireless communication with the one or more terminal devices, about the first-type identification information, and about the second-type identification information, and the obtaining unit obtains the third-type identification information that is specific to combination of the first-type identification information, the second-type identification information, and the fourth-type identification information.

(22)

The communication control device according to (21), wherein based on the obtained third-type identification information, the notifying unit notifies management device about a request related to allocation of the beam for enabling the user corresponding to the third-type identification information to use the communication device corresponding to the third-type identification information, and according to the beam allocated from the management device, the control unit controls setting related to the wireless communication between the communication device and the one or more terminal devices.

(23)

The communication control device according to any one of (19) to (22), wherein the notifying unit notifies the communication device corresponding to the third-type identification information about the obtained third-type identification information.

(24)

The communication control device according to any one of (19) to (22), wherein the communication control device is the communication device that includes a communication unit for performing the wireless communication with the one or more terminal devices, and based on the third-type identification information obtained from the management device, the control unit controls the wireless communication with the one or more terminal devices.

(25)

The communication control device according to (24), wherein the obtaining unit obtains, from other communication device, other third-type identification information which corresponds to the user corresponding to the third-type identification information and which corresponds to the other communication device, and based on the obtained other third-type identification information, the control unit controls the wireless communication with the one or more terminal devices.

(26)

The communication control device according to (25), wherein the notifying unit notifies the other communication device about the third-type identification information obtained from the management device.

(27)

A control method implemented by a computer, including:

obtaining, from a communication control device, first-type identification information which is specific to each communication device that performs wireless communication with one or more terminal devices, and second-type identification information which is specific to user who is target for allocation of frequency band that is available for secondary use in the wireless communication;

generating third-type identification information which is specific to combination of the obtained first-type identification information and the obtained second-type identification information and which is meant for allocating the frequency band to at least either the communication device or the user; and notifying the communication control device about the generated third-type identification information.

(28)

A control method implemented by a computer, including:

notifying a management device about first-type identification information which is specific to each communication device that performs wireless communication with one or more terminal devices, and second-type identification information which is specific to user who is target for allocation of frequency band that is available for secondary use in the wireless communication;

obtaining, from the management device, third-type identification information which is specific to combination of the first-type identification information and the second-type identification information and which is meant for allocating the frequency band to at least either the communication device or the user; and controlling, based on the obtained third-type identification information, setting related to the wireless communication between the communication device corresponding to the third-type identification information and the one or more of terminal devices.

(29)

A program that causes a computer to execute:

obtaining, from a communication control device, first-type identification information which is specific to each communication device that performs wireless communication with one or more terminal devices, and second-type identification information which is specific to user who is target for allocation of frequency band that is available for secondary use in the wireless communication;

generating third-type identification information which is specific to combination of the obtained first-type identification information and the obtained second-type identification information and which is meant for allocating the frequency band to at least either the communication device or the user; and notifying the communication control device about the generated third-type identification information.

(30)

A program that causes a computer to execute:

notifying a management device about first-type identification information which is specific to each communication device that performs wireless communication with one or more terminal devices, and second-type identification information which is specific to user who is target for allocation of frequency band that is available for secondary use in the wireless communication;

obtaining, from the management device, third-type identification information which is specific to combination of the first-type identification information and the second-type identification information and which is meant for allocating the frequency band to at least either the communication device or the user; and controlling, based on the obtained third-type identification information, setting related to the wireless communication between the communication device corresponding to the third-type identification information and the one or more of terminal devices.

REFERENCE SIGNS LIST 1 system
10 cell
40 core network
50 packet data network
60 application server
100 wireless communication device
110 antenna unit
120 wireless communication unit
130 network communication unit
140 memory unit
150 processing unit
151 communication control unit
153 information obtaining unit
155 notifying unit
200 terminal device
400 network manager
410 network communication unit
430 memory unit
450 processing unit
451 communication control unit
453 information obtaining unit
455 notifying unit
500 frequency management database
510 network communication unit
530 memory unit
550 processing unit
551 information obtaining unit
553 registration processing unit
555 control unit
557 notifying unit

The invention claimed is:

1. A management device comprising:
an obtaining unit that obtains, from a communication control device,
first-type identification information which is specific to each communication device that performs wireless communication with one or more terminal devices, and
second-type identification information which is specific to user who is target for allocation of frequency band that is available for secondary use in the wireless communication;
a generating unit that generates third-type identification information which is specific to combination of the obtained first-type identification information and the obtained second-type identification information and which is meant for allocating the frequency band to at least either the communication device or the user; and
a notifying unit that notifies the communication control device about the generated third-type identification information.

2. The management device according to claim 1, further comprising a control unit that, in response to a request from the communication control device, controls, based on the third-type identification information, setting related to the wireless communication between the communication device, which used the frequency band available for secondary use, and the one or more of terminal devices.

3. The management device according to claim 2, wherein the control unit controls allocation of the frequency band, which is available for secondary use, in units of the third-type identification information.

4. The management device according to claim 3, wherein the control unit controls change in allocation of the frequency band, which is available for secondary use, in units of the third-type identification information.

5. The management device according to claim 2, wherein, based on the third-type identification information, the control unit allocates, to each of a plurality of the user of the communication device, mutually different frequency bands from among the frequency bands available for secondary use.

6. The management device according to claim 2, wherein, when the communication device is able to use a plurality of beams in the wireless communication with the terminal devices, the generating unit generates the third-type identification information which is specific to combination of the first-type identification information, the second-type identification information, and fourth-type identification information that is specific to each of the plurality of beams.

7. The management device according to claim 6, wherein, based on the third-type identification information, the control unit allocates, to each of a plurality of the user of the communication device, mutually different beams from among the plurality of beams.

8. The management device according to claim 2, wherein
the obtaining unit obtains, from the communication control device, group information having a plurality of sets of identification information, from among at least either the first-type identification information or the second-type identification information, associated thereto, and
based on the group information, the control unit controls setting related to the wireless communication between the communication device, which used the frequency band available for secondary use, and the one or more terminal devices.

9. The management device according to claim 8, wherein the group information has the second-type identification information, which corresponds to each of a plurality of the user sharing the communication device, associated thereto.

10. The management device according to claim 8, wherein the group information has the first-type identification information, which corresponds to each of a plurality of the communication device used by one or more of the user, associated thereto.

11. The management device according to claim 2, wherein
the obtaining unit obtains, from other management device, information related to communication device managed by the other management device, and
based on information related to communication device managed by the other management device as obtained from the other management device, the control unit controls setting related to the wireless communication between the communication device being managed and the one or more terminal devices.

12. The management device according to claim 11, wherein
the obtaining unit obtains, as information related to communication device managed by the other management device, information related to a second communication device that is different than a first communication device which is used by the user corresponding to the third-type identification information and which corresponds to the third-type identification information, and
based on information related to the second communication device as obtained from the other management device, the control unit controls setting related to the wireless communication between the first communication device and the one or more terminal devices.

13. The management device according to claim 12, wherein the control unit controls the frequency band, which is to be allocated to the user of the first communication device, according to the frequency band that has been allocated to the user by the other management device for purpose of using the second communication device under management of the other management device.

14. The management device according to claim 11, wherein
the obtaining unit obtains, as information related to the communication device managed by the other management device, information related to a third communication device being managed, and
based on information related to the third communication device as obtained from the other management device, the control unit controls setting related to the wireless communication between the third communication and the one or more terminal devices.

15. The management device according to claim 14, wherein the control unit controls the frequency band, which is to be allocated to the user of the third communication device, according to the frequency band that has been allocated to the user by the other management device for purpose of using the third communication device under management of the other management device.

16. The management device according to claim 11, wherein the notifying unit notifies the other management device about information related to the communication device being managed.

17. The management device according to claim 11, wherein information related to the communication device contains at least one of
information related to service area of the communication device,
information related to frequency band usable by the communication device,
information related to transmission power of the communication device,
information related to antenna usable by the communication device, and
information related to beam usable in the wireless communication by the communication device.

18. The management device according to claim 1, wherein the first-type identification information contains identification information specific to predetermined certification authority.

19. A communication control device comprising:
a notifying unit that notifies a management device about
first-type identification information which is specific to each communication device that performs wireless communication with one or more terminal devices, and
second-type identification information which is specific to user who is target for allocation of frequency band that is available for secondary use in the wireless communication;
an obtaining unit that obtains, from the management device, third-type identification information which is specific to combination of the first-type identification information and the second-type identification information and which is meant for allocating the frequency band to at least either the communication device or the user; and
a control unit that, based on the obtained third-type identification information, controls setting related to the wireless communication between the communication device corresponding to the third-type identification information and the one or more of terminal devices.

20. The communication control device according to claim 19, wherein
based on the obtained third-type identification information, the notifying unit notifies the management device about a request related to allocation of the frequency band for enabling the user corresponding to the third-type identification information to use the communication device corresponding to the third-type identification information, and according to the frequency band allocated from the management device, the control unit controls setting related to the wireless communication between the communication device and the one or more terminal devices.

21. The communication control device according to claim 19, wherein
the notifying unit notifies the management device
about fourth-type identification information that is specific to each of a plurality of beams usable by the communication device in the wireless communication with the one or more terminal devices,
about the first-type identification information, and
about the second-type identification information, and
the obtaining unit obtains the third-type identification information that is specific to combination of the first-type identification information, the second-type identification information, and the fourth-type identification information.

22. The communication control device according to claim 21, wherein
based on the obtained third-type identification information, the notifying unit notifies management device about a request related to allocation of the beam for enabling the user corresponding to the third-type identification information to use the communication device corresponding to the third-type identification information, and
according to the beam allocated from the management device, the control unit controls setting related to the wireless communication between the communication device and the one or more terminal devices.

23. The communication control device according to claim 19, wherein the notifying unit notifies the communication device corresponding to the third-type identification information about the obtained third-type identification information.

24. The communication control device according to claim 19, wherein
the communication control device is the communication device that includes a communication unit for performing the wireless communication with the one or more terminal devices, and
based on the third-type identification information obtained from the management device, the control unit controls the wireless communication with the one or more terminal devices.

25. The communication control device according to claim 24, wherein
the obtaining unit obtains, from other communication device, other third-type identification information which corresponds to the user corresponding to the third-type identification information and which corresponds to the other communication device, and
based on the obtained other third-type identification information, the control unit controls the wireless communication with the one or more terminal devices.

26. The communication control device according to claim 25, wherein the notifying unit notifies the other communication device about the third-type identification information obtained from the management device.

\* \* \* \* \*